US010882606B2

(12) United States Patent
Bertoldi et al.

(10) Patent No.: US 10,882,606 B2
(45) Date of Patent: Jan. 5, 2021

(54) AERODYNAMIC DEVICES FOR ENHANCING LIFT AND REDUCING DRAG

(71) Applicants: President and Fellows of Harvard College, Cambridge, MA (US); University of South Carolina, Columbia, SC (US)

(72) Inventors: Katia Bertoldi, Cambridge, MA (US); August G. Domel, Sleepy Hollow, IL (US); George V. Lauder, Lexington, MA (US); Mehdi Saadat, Cambridge, MA (US); Hossein Haj-Hariri, Columbia, SC (US)

(73) Assignees: President and Fellows of Harvard College, Cambridge, MA (US); University of South Carolina, Columbia, SC (US)

( * ) Notice: Subject to any disclaimer, the term of this patent is extended or adjusted under 35 U.S.C. 154(b) by 290 days.

(21) Appl. No.: 15/986,477

(22) Filed: May 22, 2018

(65) Prior Publication Data

US 2018/0265183 A1 Sep. 20, 2018

Related U.S. Application Data

(63) Continuation-in-part of application No. PCT/US2018/021363, filed on Mar. 7, 2018.
(Continued)

(51) Int. Cl.
*B64C 23/06* (2006.01)

(52) U.S. Cl.
CPC .......... *B64C 23/06* (2013.01); *B64C 2230/20* (2013.01); *B64C 2230/26* (2013.01); *Y02T 50/10* (2013.01); *Y02T 70/10* (2013.01)

(58) Field of Classification Search
CPC . B64C 23/06; B64C 2230/26; B64C 2230/20; Y02T 50/166; Y02T 50/162; Y02T 70/121
See application file for complete search history.

(56) References Cited

U.S. PATENT DOCUMENTS 2,730,313 A 1/1956 Ringham
5,833,389 A 11/1998 Sirovich et al.
(Continued)

FOREIGN PATENT DOCUMENTS

EP 2250087 7/2013

OTHER PUBLICATIONS

Amitay M., "Aerodynamic Flow Control Using Synthetic Jet Technology," 36th AIAA Aerospace Sciences Meeting and Exhibit doi:10.2514/6.1998-208.
(Continued)

*Primary Examiner* — Brian M O'Hara
*Assistant Examiner* — Keith L Dixon
(74) *Attorney, Agent, or Firm* — Greenberg Traurig, LLP; David J. Dykeman; Todd C. Basile

(57) ABSTRACT

An aerodynamic device for enhancing lift and reducing drag on a body, comprising a plurality of raised members, each having a symmetric profile and including a central portion having an elongated profile, and first and second outer portions having elongated profiles and arranged substantially parallel to and on opposing sides of the central portion, wherein the plurality of raised members are situated adjacent one another to form a continuous structure on or defining at least a portion of a surface of the body and oriented such that the raised members are substantially aligned with a direction of localized flow on the body. An aerodynamic device for enhancing lift and reducing drag of a flying disc, wherein the plurality of raised members are situated adjacent one another
(Continued)

to form a continuous structure and the raised members are oriented in a substantially circumferential direction on the surface of the flying disc.

20 Claims, 46 Drawing Sheets

Related U.S. Application Data

(60) Provisional application No. 62/468,311, filed on Mar. 7, 2017, provisional application No. 62/563,308, filed on Sep. 26, 2017.

(56) References Cited

U.S. PATENT DOCUMENTS

| | | | |
|---|---|---|---|
| 6,131,853 A | 10/2000 | Bauer et al. | |
| 7,118,071 B2 | 3/2006 | Bogue | |
| 7,318,619 B2 | 1/2008 | Munro et al. | |
| 8,113,469 B2* | 2/2012 | Lang | B64C 21/10 244/198 |
| 8,794,574 B2* | 8/2014 | Lang | B63B 1/36 244/200.1 |
| 10,071,798 B2* | 9/2018 | Zhong | F15D 1/08 |
| 2007/0194178 A1* | 8/2007 | Lang | F15D 1/12 244/130 |
| 2008/0061192 A1 | 3/2008 | Sullivan | |
| 2009/0001222 A1* | 1/2009 | McKeon | B64C 21/10 244/204 |
| 2009/0020652 A1* | 1/2009 | Rincker | B64C 23/06 244/204 |
| 2009/0065650 A1* | 3/2009 | McKeon | F15D 1/12 244/204 |
| 2010/0159204 A1* | 6/2010 | Van Merksteijn | F15D 1/12 428/169 |
| 2010/0187361 A1* | 7/2010 | Rawlings | B32B 15/08 244/130 |
| 2015/0017385 A1 | 1/2015 | Lang | |
| 2015/0329200 A1* | 11/2015 | Barrett | G03G 13/283 244/200.1 |
| 2015/0336659 A1 | 11/2015 | Zhong et al. | |
| 2018/0162521 A1* | 6/2018 | Langenbacher | F15D 1/12 |

OTHER PUBLICATIONS

Amitay M., "Aerodynamic flow control over an unconventional airfoil using synthetic jet actuators," AIAA Journal, vol. 39, No. 3, pp. 361-370, Mar. 2001.
Amitay M., "Aerodynamic Flow Control Using Synthetic Jet Actuators." In: Koumoutsakos P., Mezic I. (eds) Control of Fluid Flow. Lecture Notes in Control and Information Sciences, vol. 330. Springer, Berlin, Heidelberg 2006.
Ashill P., "Research at DERA on Sub Boundary Layer Vortex Generators (SBVGs)," 39th AIAA Aerospace Sciences Meeting & Exhibit Jan. 2001.
Ashill P., "Studies of flows induced by Sub Boundary Layer Vortex Generators (SBVGs)," 40th AIAA Aerospace Sciences Meeting & Exhibit, 2002 doi:10.2514/6.2002-968.
Baskaran V., "A turbulent flow over a curved hill Part 1. Growth of an internal boundary layer," Journal of Fluid Mechanics 1, vol. 82, pp. 47-83, Sep. 1987.
Burgmann S., "Time-resolved and volumetric PIV measurements of a transitional separation bubble on an SID7003 foil." Experiments in Fluids 44(4), pp. 609-622, 2007.
Fu, Y. F., Marine drag reduction of shark skin inspired riblet surfaces. Biosurface and Biotribology 3.1, pp. 11-24, 2017.
Guerrero JE, "Biomimetic spiroid winglets for lift and drag control," Comptes Rendus Mécanique 340, 67-80, 2012.
Kerho M, "Vortex generators used to control laminar separation bubbles." Journal of Aircraft 30(3), pp. 315-319, 1993.

Kiedaisch J, "Active Flow Control Applied to High-Lift Airfoils Utilizing Simple Flaps," 3rd AIAA Flow Control Conference doi:10.2514/6.2006-2856, 2006.
Kiedaisch J, "Active Flow Control for High Lift Airfoils: Dynamic Flap Actuation," 45th AIAA Aerospace Sciences Meeting and Exhibit doi:10.2514/6.2007-1120, 2007.
Kuchemann D. "The Aerodynamic Design of Aircraft: A Detailed Introduction to the Current Aerodynamic Knowledge and Practical Guide to the Solution of Aircraft Design Problems" Pergamon Press, 1978.
Lin J. "Small submerged vortex generators for turbulent flow separation control." J Spacecraft Rockets 27(5), pp. 503-507, 1990.
Lin, J. "Separation control on high-lift airfoils via micro-vortex generators." Journal of Aircraft, 31(6), pp. 1317-1323, 1994.
Lin J. "Control of turbulent boundary-layer separation using micro-vortex generators." 30th Fluid Dynamics Conference (American Institute of Aeronautics and Astronautics, Reston, Virginia), pp. 1-16, 1999.
Lin J. "Review of research on low-profile vortex generators to control boundary-layer separation," Progress in Aerospace Sciences 38(4-5), pp. 389-420, 2002.
Luo, Y. et al., "Water Repellent/Wetting Characteristics of Various Bio-Inspired Morphologies and Fluid Drag Reduction Testing Research", Micron, vol. 82, pp. 9-16, Mar. 2016.
Martin S, "Fluid Flow Analysis of a Shark-Inspired Microstructure." Journal of Fluid Mechanics vol. 756, pp. 5-29, 2014.
McAuliffe B. "Separation-Bubble-Transition Measurements on a Low-Re Airfoil Using Particle Image Velocimetry." American Society of Mechanical Engineers, vol. 3, Parts A and B, pp. 1029-1038, 2005.
Mehta U. "Starting vortex, separation bubbles and stall: a numerical study of laminar unsteady flow around an airfoil." Journal of Fluid Mechanics, 67(2), pp. 227-256, 1975.
Mueller T. "Experimental Studies of Separation on a Two-Dimensional Foil at Low Reynolds Numbers." AIAA Journal 20(4), pp. 457-463, 1982.
Mueller-Vahl H. "Vortex Generators for Wind Turbine Blades: A Combined Wind Tunnel and Wind Turbine Parametric Study" In vol. 6: Oil and Gas Applications; Concentrating Solar Power Plants; Steam Turbines; Wind Energy, (doi:10.1115/gt2012-69197) 2012.
Myose R. "Gurney Flap Experiments on Airfoils, Wings, and Reflection Plane Model,". Journal of Aircraft, vol. 35, No. 2, pp. 206-211, Mar. 1998.
Pack L, "Active Control of Flow Separation from the Slat Shoulder of a Supercritical Airfoil," 1st Flow Control Conference doi:10.20514/6.2002-3156, 2002.
Patek, S.N. "Biomimetics and Evolution,". Science, vol. 345, Issue 6203, pp. 1448-1449, Sep. 19, 2004.
Roberts, W. "Calculation of laminar separation bubbles and their effect on foil performance." AIAA Journal, vol. 18, No. 1, pp. 25-31, Jan. 1980.
Sareen, A., et al. "Kiedaisch J, "Active Flow Control for High Lift Airfoils: Dynamic Flap Actuation," 45th AIAA Aerospace Sciences Meeting and Exhibit doi:10.2514/6.2007-1120, 2007.," Journal of Solar Energy Engineering 136.2, 021007. 2014.
Shehata, A., "Passive Flow Control for Aerodynamic Performance Enhancement of Airfoil with its Application in Wells Turbine— Under Oscillating Flow Condition," Ocean Engineering, vol. 136, pp. 31-53, May 2017.
Storms, B. et al., "Lilt enhancement of an airfoil using a Gurney flap and vortex generators", Journal of Aircraft, vol. 31, No. 3, pp. 542-547, May 1994.
Tai T. "Effect of micro-vortex generators on V-22 aircraft forward-flight aerodynamics." 40th AIAA Aerospace Sciences Meeting & Exhibit, 2002.
Tani I. "Low-speed flows involving bubble separations." Progress in Aerospace Sciences, 5, pp. 70-103, 1964.
Tank J, On the possibility (or lack thereof) of agreement between experiment and computation of flows over wings at moderate Reynolds number. Interface Focus 7:20160076. 2016.
Walsh, M. "Riblets as a Viscous Drag Reduction Technique." AIAA Journal 21(4), pp. 485-486, 1983.

(56) References Cited

OTHER PUBLICATIONS

Whitcomb, R. "A Design Approach and Selected Wind-tunnel Results at High Subsonic Speeds for Wing-tip Mounted Winglets," NASA Technical Note D-8260, Jul. 1976.

Bechert, D.W. et al., "Experiments with three-dimensional riblets as an idealized model of shark skin", Experiments in Fluids, vol. 28 Issue 5, pp. 403-412, May 2000.

Dean B., et al. "Shark-skin surfaces for fluid-drag reduction in turbulent flow: a review" Philosophical Transactions of the Royal Society A, vol. 368(1929), pp. 4775-4806, Sep. 20, 2010.

Deshpande, V. et al., "Computational Study of Supersonic Flow Over a Flat Plate with Protrusion." Journal of Aerospace Sciences & Technologies, vol. 63(4), pp. 1-15, Jan. 2011.

Fish. F.E et al., "The tubercles on humpback whales' flippers: application of bio-inspired technology." Integrative and Comparative Biology vol. 51(1), pp. 203-213, Jul. 2011.

Ghosh, S. et al., "Numerical Simulations of Effects of Micro Vortex Generators Using Immersed-Boundary Methods" AIAA Journal vol. 48, No. 1, pp. 92-103, Jan. 2010.

Kumar, D. et al., "Boundary Layer Suppression using Bump Surface in Airfoil." Journal of Basic and Applied Engineering Research, vol. 1, No. 5, pp. 7-12, Oct. 2014.

Lauder G. et al., "Structure, biomimetics, and fluid dynamics of fish skin surfaces." Physical Review Fluids, vol. 1, No. 6, pp. 060502-1-060502-18, Oct. 18, 2016.

Lee, S. et al., "Normal Shock Boundary Layer Control with Various Vortex Generator Geometries" Computers & Fluids vol. 49, Issue 1, pp. 233-246, Oct. 2011.

McCormick, D.C., "Shock/Boundary-Layer Interaction Control with Vortex Generators and Passive Cavity", AIAA Journal, vol. 31, No. 1, Jan. 1993.

Menter, F. "Zonal Two Equation k-ω Turbulence Models for Aerodynamic Flows" 23rd Fluid Dynamics, Plasmadynamics, and Lasers Conference, AIAA Paper 93, 2906, Jul. 1993.

Milholen et al. "On the Application of Contour Bumps for Transonic Drag Reduction," AIAA-2005-0462, pp. 1-19, Jan. 1, 2005.

Nati, A. et al., "Dynamic pitching effect on a laminar separation bubble." Experiments in Fluids vol. 56, Issue 9, Article 172, Sep. 2015.

Nithya, S. et al., "Design and Performance of Bump Surface in an Airfoil." International Journal of Innovative Research and Development, vol. 2, Issue 11, pp. 343-352, Nov. 2013.

Oeffner, J. et al., "The hydrodynamic function of shark skin and two biomimetic applications." Journal of Experimental Biology, vol. 215 (Pt 5), pp. 785-795, 2012.

Van Bokhorst E, de Kat R, Elsinga G, Lentink D. "Feather roughness reduces flow separation during low Reynolds number glides of swifts." Journal of Experimental Biology 218(Pt 20), pp. 3179-3191, 2015.

Viswanath, P. "Aircraft viscous drag reduction using riblets." Progress in Aerospace Sciences 38, pp. 571-600, 2002.

Volino, R. "Passive Flow Control on Low-Pressure Turbine Airfoils." Journal of Turbomachinery 125(4), pp. 754-764, Oct. 2003.

Wang J, Li YC, Li Y, Choi K-S. "Gurney flap—Lift enhancement, mechanisms and applications." Progress in Aerospace Sciences 44(1), pp. 22-47, 2008.

Wen L, Weaver J, Lauder G. "Biomimetic shark skin: design, fabrication and hydrodynamic function." Journal of Experimental Biology 217(10), pp. 1656-1666, 2014.

Yao C, Lin J, Allen B. "Flowfield Measurement of Device-Induced Embedded Streamwise Vortex on a Flat Plate." 1st AIAA Flow Control Conference, St. Louis, MO, Jun. 24-27, 2002.

PCT International Search Report in PCT/US2018/021363 dated May 15, 2018.

* cited by examiner

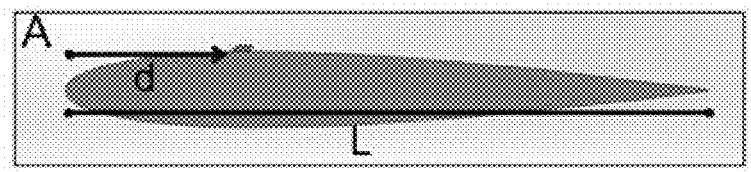
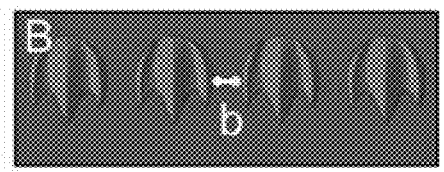
FIG. 13A          FIG. 13B
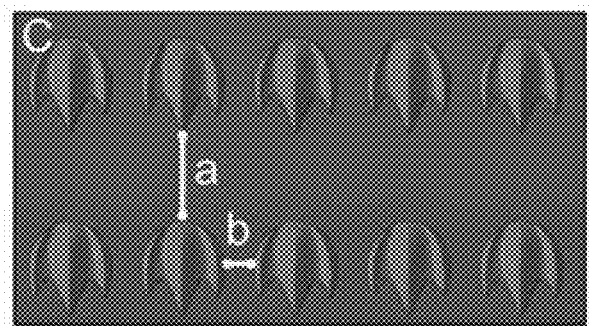
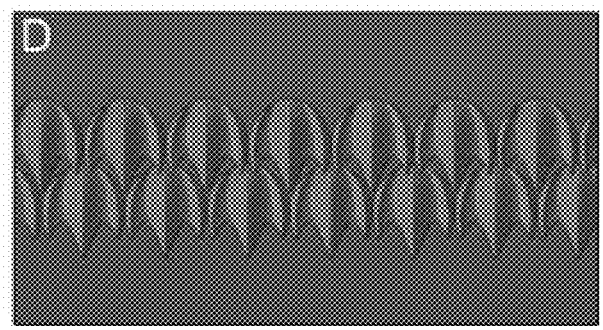
FIG. 13C          FIG. 13D

AERODYNAMIC DEVICES FOR ENHANCING LIFT AND REDUCING DRAG

CROSS-REFERENCE TO RELATED APPLICATIONS

This application is a Continuation-in-Part application of PCT International Application No. PCT/US2018/021363, filed Mar. 7, 2018, which claims priority to and benefit of U.S. Provisional Patent Application No. 62/468,311, filed Mar. 7, 2017, and U.S. Provisional Patent Application No. 62/563,308, filed Sep. 26, 2017, and the entirety of all these applications are hereby incorporated by reference for all purposes.

BACKGROUND

Numerous aerodynamic structures exist for improving the aerodynamic performance. Many such structures may do so by increasing lift or reducing drag. For example, bumps or other protrusions on aerodynamic surface are often utilized to increase lift, but typically suffer drag penalties, particularly at high angles of attack. Vortex generators are often utilized to reduce drag on a body by energizing the boundary layer or to increase lift by creating a local suction zone along the associated aerodynamic surface, depending on the particular design; however, most do not accomplish the benefit of both enhanced lift and reduced drag. Many aerodynamic surfaces, such as those of wings, rotors (e.g., rotorcraft blades, wind turbine blades, turbine engine blades), propellers, and spoilers, amongst others, would benefit significantly from improved aerodynamic performance, in particular, improved lift to drag ratios. Therefore, there is aerodynamic devices and systems for improving aerodynamic performance.

SUMMARY

The present disclosure is directed to an aerodynamic device for enhancing lift and reducing drag on a body. The aerodynamic device may include a plurality of raised members, each having a symmetric profile and including: a central portion having an elongated profile, and a first outer portion and a second outer portion arranged substantially parallel to and on opposing sides of the central portion, each of the first and second outer portions having an elongated profile. The plurality of raised members may be situated adjacent one another to form a continuous structure on or defining at least a portion of a surface of the body, and the continuous structure of raised members may be oriented such that the raised members are substantially aligned with a direction of localized flow on the body.

An overall height dimension of at least one of the raised members, in various embodiments, may be less than or equal to a height of a boundary layer of the flow along the surface of the body at a corresponding location. The first outer portion and the second outer portion, in various embodiments, may each have a narrower spanwise dimension than the central portion. In various embodiments, the first outer portion and the second outer portion may each have a shorter height dimension than the central portion. The first outer portion and the second outer portion, in various embodiments, may each have a shorter chordwise dimension than the central portion.

The central portion, the first outer portion, and the second outer portion, in various embodiments, may be connected so as to form a continuous structure. The curvature of the aerodynamic device, in various embodiments, may define a first valley between the central portion and the first outer portion and a second valley between the central portion and the second outer portion. A curvature of the continuous structure of raised members may be configured to generate a pressure gradient in flow along the surface of the body, the pressure gradient acting to constrain a separation bubble formed downstream of the continuous structure of raised members from expanding further downstream and bursting when the body is oriented at a high angle of attack.

The aerodynamic device, in some embodiments, may be configured to be coupled to the surface of the body. In some embodiments, the aerodynamic device may form a corresponding portion of the surface of the body.

In another aspect, the present disclosure is directed to an aerodynamic device for enhancing lift and reducing drag of a flying disc. The aerodynamic device may include a plurality of raised members, each having a symmetric profile and including: a central portion having an elongated profile, and a first outer portion and a second outer portion arranged substantially parallel to and on opposing sides of the central portion, each of the first and second outer portions having an elongated profile. The plurality of raised members may be situated adjacent one another to form a continuous structure on a surface of the flying disc, and the plurality of raised members may be oriented in a substantially circumferential direction on the surface of the flying disc. The flying disc, in various embodiments, may be a sporting disc or a disc golf disc.

The continuous structure of raised members, in various embodiments, may extend in a substantially radial direction on or defining at least a portion of an upper surface of the flying disc. In some embodiments, the continuous structure of raised members may be dimensioned and positioned to span at least a radius of the upper surface of the flying disc. The continuous structure of raised members, in some embodiments, may be dimensioned and positioned to span about 10% to about 25% of an outer portion of a radius of the upper surface of the flying disc.

The aerodynamic device, in various embodiments, may further include an additional one or more of the continuous structures of raised members, each of the additional one or more continuous structures of raised members extending in a substantially radial direction on or defining at least a portion of the upper surface of the flying disc. The continuous structures of raised members, in some embodiments, may be spaced substantially equally apart from one another in a circumferential direction.

The continuous structure of raised members, in various embodiments, may be located on or defines at least a portion of a surface of a rim of the flying disc.

An overall height dimension of at least one of the raised members, in various embodiments, may be less than or equal to a height of a boundary layer of the flow along the surface of the flying disc at a corresponding location. A curvature of the continuous structure of raised members, in various embodiments, may be configured to generate a pressure gradient in flow along the surface of the flying disc, the pressure gradient acting to constrain a separation bubble formed downstream of the continuous structure of raised members from expanding further downstream and bursting when the flying disc is oriented at a high angle of attack

BRIEF DESCRIPTION OF DRAWINGS

FIG. 1A depicts an environmental scanning electron microscope (ESEM) image of denticles from the shortfin Mako shark (scale bar: 200 m);

FIG. 1B depicts a parametric 3D model of an aerodynamic device inspired by the image of FIG. 1A, according to an embodiment of the present disclosure;

FIG. 1C and FIG. 1D depict arrangements of aerodynamic devices arranged in a various configurations on the suction side of a NACA0012 airfoil, according to an embodiment of the present disclosure;

FIG. 12A depicts a side view comparison of an embodiment of an aerodynamic device and a 2D bump profile (red line), according to an embodiment of the present disclosure;

FIG. 12B depicts a side view of the 2D bump profile and corresponding geometric parameters;

FIG. 13A depicts a side view of an airfoil showing the chordwise placement of an aerodynamic device on its suction side, according to an embodiment of the present disclosure;

FIG. 13B depicts a top view of airfoils #1-#13 of FIGS. 3A-3M arranged in a single row with a spanwise separation b, according to embodiments of the present disclosure;

FIG. 13C and FIG. 13D depict a top view of airfoils #14-#20 of FIGS. 3N-3T arranged in multiple rows in a linear or staggered patterns, respectively, according to embodiments of the present disclosure;

DETAILED DESCRIPTION

There have been significant efforts recently aimed at improving the aerodynamic performance of airfoils through the modification of their surfaces. Inspired by the drag reducing properties of shark skin, we describe here investigations into the aerodynamic effects of novel designs inspired by the tooth-like denticles that cover the skin of a shark and which we placed on the suction side of an airfoil 10. Through parametric modeling to query a wide range of different designs, we developed a set of denticle-inspired aerodynamic devices 100, 200 that achieve simultaneous drag reduction and lift generation on an airfoil 10, resulting in lift-to-drag ratio improvements comparable to the best-reported for traditional low-profile vortex generators and even outperforming these existing designs at low angles of attack with improvements of up to 323%. Such behavior is enabled by two concurrent mechanisms: (i) a separation bubble in the aerodynamic device's wake altering the flow pressure distribution of the airfoil 10 to enhance suction and (ii) streamwise vortices that replenish momentum loss in the boundary layer due to skin friction. Our findings not only open new avenues for improved aerodynamic design, but also provide new perspective on the role of the complex and potentially multifunctional morphology of shark denticles for increased swimming efficiency.

Systems that move suspended within a fluid, such as airplanes, wind turbines, drones, helicopters, hydrofoils, sporting discs (e.g., Frisbees® or disc golf discs), balls, toy rockets, aerial toys, amongst others, all benefit from increased lift-to-drag ratios since this results in lower energy consumption. Motivated by this need, two main strategies have been proposed to maximize the lift and minimize the drag. On one hand, several active flow control methods, which involve the addition of auxiliary power into the system, have been demonstrated for both drag reduction and lift augmentation. On the other end, it has also been shown that passive flow control strategies based on geometric modifications are capable of altering lift and drag. These include vortex generators, Gurney flaps, and winglets, which reduce drag and increase lift by passively altering the flow to favorably affect the pressure gradients along the airfoil 10. Although active methods typically yield better results than the passive ones, they require the supply of external energy and in fully automated systems rely on complex sensor technology and algorithm development. By contrast, passive techniques are easy to implement and free from any kind of external energy requirements.

Figure 1E:
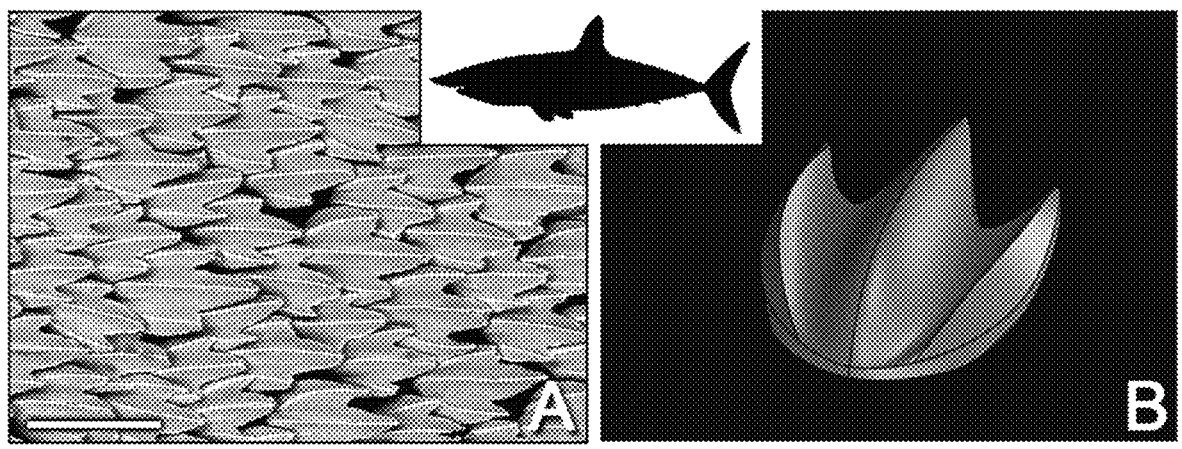
FIG. 1E schematically depicts testing of an airfoil equipped with an aerodynamic device in fluid flow to evaluate the effect of the aerodynamic device on lift and drag, according to an embodiment of the present disclosure.
Figure 1E:
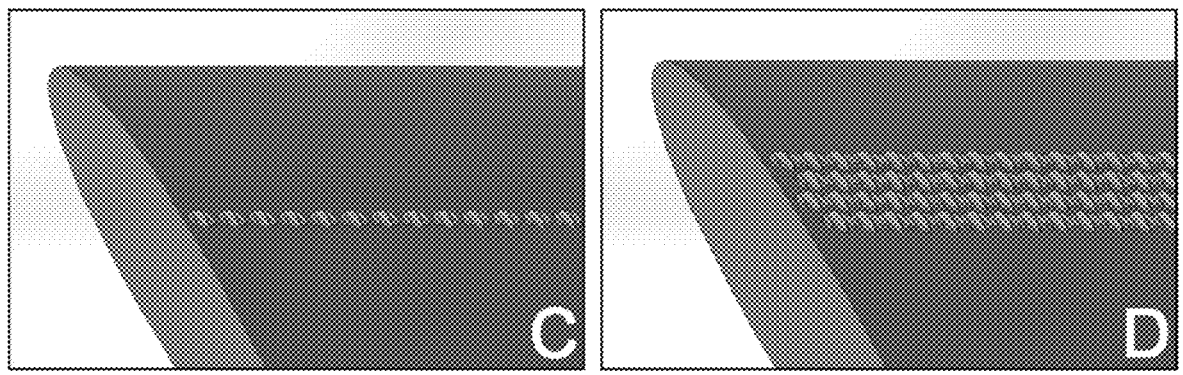
Figure 1E:
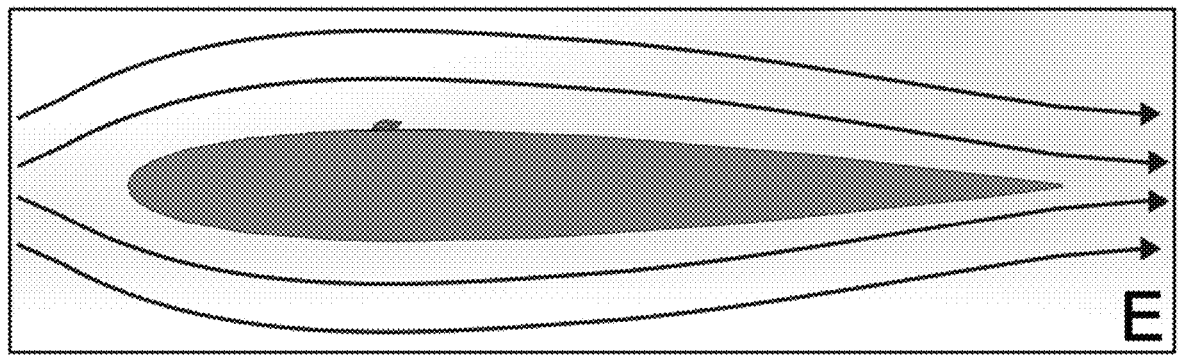

Nature, through the course of evolution, has arrived at structures and materials, whose traits often offer inspiration for the design of synthetic systems with unique properties. Specifically, biological systems have evolved a wide range of drag reducing mechanisms that have inspired the design of synthetic surfaces. Shark skin is one such example and is covered with rigid bony denticles (or scales) that exhibit a plate-like upper section with ridges, which narrows to a thin neck that anchors into the skin (see FIG. 1A). These intricate structures have inspired the development of several drag reducing aerodynamic devices 100, 200, including complex 3D printed models that emulate the structural complexities of individual denticles and also simplified ridge-like geometries without these complexities. These denticle-inspired aerodynamic devices 100, 200 have resulted in a drag reduction of 10% compared to corresponding smooth control surfaces.

Here, e focus on airfoils and study experimentally how 3D models of aerodynamic devices 100, 200 arranged on their suction side can passively alter fluid flow. While previous studies have mostly only focused on the effect of shark denticles on drag reduction, here we demonstrate that denticle-inspired aerodynamic devices 100, 200 can simultaneously enhance lift and reduce drag, resulting in large lift-to-drag ratios. We study the mechanisms leading to this behavior and find that the aerodynamic devices 100, 200 generate both a recirculation zone (in the form of a short separation bubble in the wake of the aerodynamic devices 100, 200) that alters the pressure distribution of the airfoil 10 to enhance suction, as well as streamwise vortices that reduce drag by replenishing momentum to the flow which would otherwise be lost to skin friction. Guided by these observations, we developed a continuous streamlined geometric perturbation that utilizes these two mechanisms in a way that further enhances the lift-to-drag ratio.

It should be recognized that the term "airfoil," as used throughout the present disclosure, refers to 2-D airfoils as well as 3-D bodies having an airfoil-shaped cross sections. One of ordinary skill in the art will recognize which is being referred to at any given time. For clarity, representative embodiments of 3-D bodies having an airfoil-shaped cross section may include wings, spoilers, fins, sails, rotors (e.g., rotorcraft blades, wind turbine blades, turbine engine blades), propellers, flying discs (e.g., sporting discs, Frisbees®, disc golf discs), and the like. The term "airfoil-shaped" is thus broadly defined, and in various embodiments includes any shape suitable for manipulating a fluid flow (regardless of whether the "flow" is the result of the fluid moving, the 3-D body moving, or a combination thereof) to produce one or more forces, such as lift and drag, on the 3-D body.

Consequently, and as previously noted, aerodynamic devices 100, 200 of the present disclosure may, in various embodiments, be applied to a surface of any 3-D body that may benefit from the enhanced lift and reduced drag properties afforded by aerodynamic devices 100, 200, whether or not the associated 3-D body has a "traditional" airfoil-like cross sectional shape. Such surfaces may be referred to as aerodynamic surfaces herein. Representative aerodynamic surfaces of 3-D bodies that may do not have a "traditional" airfoil-like cross section may include, for example, portions of an aircraft fuselage, an automobile, a watercraft or submarine hull, the outer surface of various balls (e.g., spherical balls such as soccer balls, baseballs, tennis balls; ovular balls such as footballs; and balls of any other suitable shape), aerial or aquatic toys, boards (e.g., surfboards, wakeboards, snowboards, snow or water skis), and the like.

Throughout the present disclosure, aerodynamic devices 100, 200 may be described in the context as being positioned on or forming part of a surface 16 of an airfoil 10. This simplification is merely for ease of description, and thus it should be recognized that aerodynamic devices 100, 200 may be utilized on any suitable surface of any suitable body to enhance lift and reduce drag on said body.

Aerodynamic Device 100

Referring now to FIG. 1A, FIG. 1B, FIG. 1C, FIG. 1D, and FIG. 1E, we focused on a smooth airfoil 10, arrayed representative models of aerodynamic device 100 on its suction side (upper surface), and investigated their effect on the aerodynamic performance of the system. More specifically, we considered a symmetric NACA0012 airfoil 10 with aspect ratio W/L=2.8 (L=68 mm being the chord length and W denoting the span length, as later described in more detail). We arranged on its suction side 3D representative models of aerodynamic device 100 based on micro-computed tomography (micro-CT) scans of denticles from Isurus oxyrinchus.

In FIG. 2A, FIG. 2B, FIG. 2C, and FIG. 2D we show different views of aerodynamic device 100 of the present disclosure. Aerodynamic device 100, in various embodiments, may generally include a central portion 110, a first outer portion 120, and a second outer portion 130, each of which being raised above a suction surface 16 of airfoil 10 (or formed as raised portions of surface 16 itself when aerodynamic device 100 is integrally formed as part of surface 16. In various embodiments, aerodynamic device 100 may be oriented on airfoil 10 such that central portion 110, first outer portion 120, and second outer portion 130 are oriented in a substantially chordwise direction as shown.

Figure 2A:
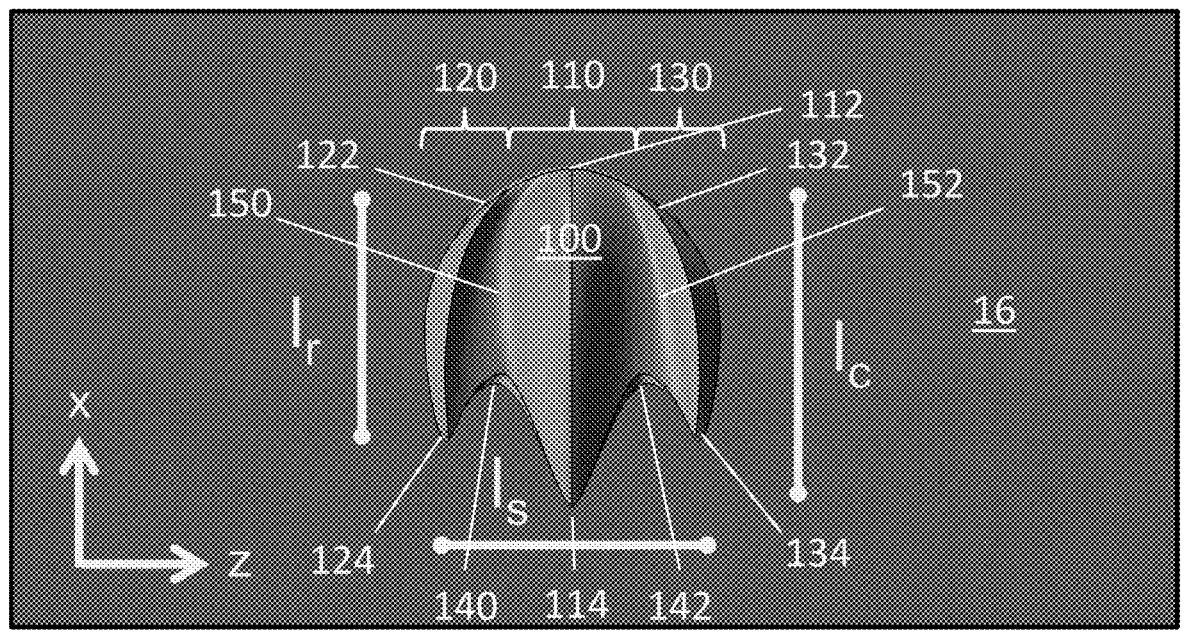
FIG. 2A, FIG. 2B, and FIG. 2C depict top, side, isometric views a representative model of an aerodynamic device along with corresponding geometric parameters, according to an embodiment of the present disclosure.
Figure 2B:
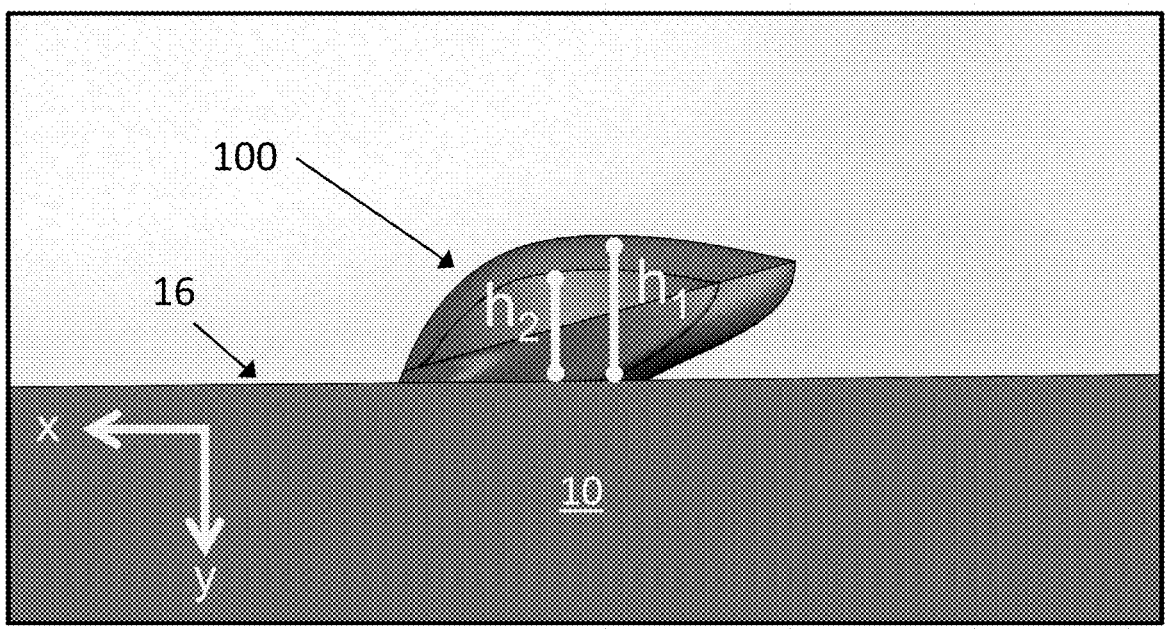
Figure 2C:
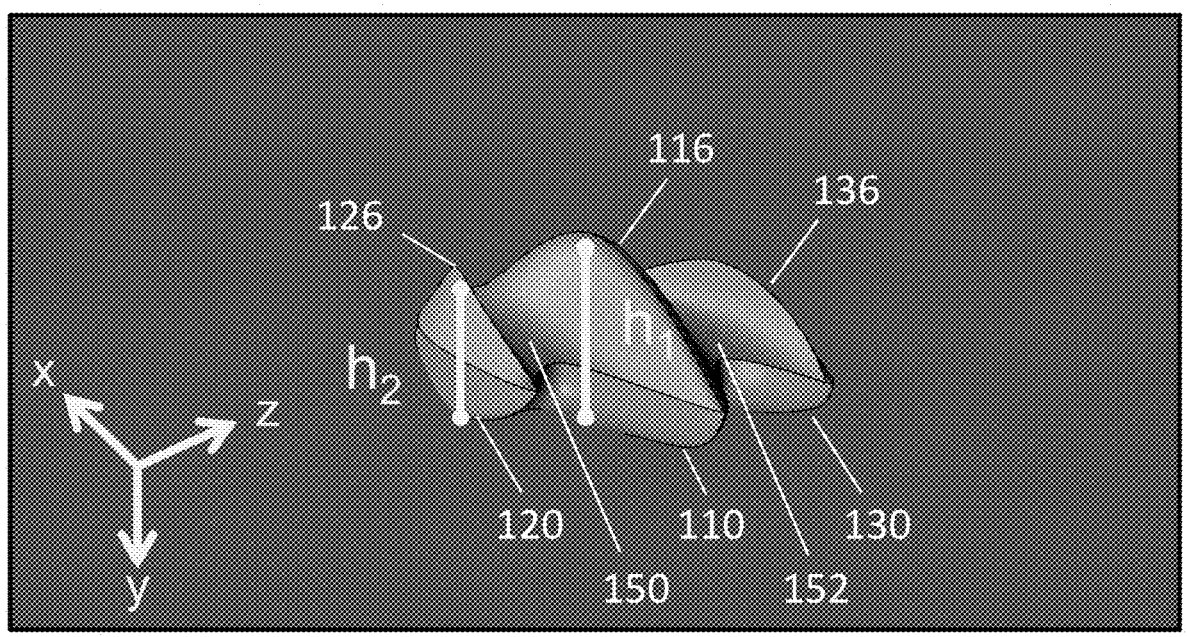
Figure 2D:
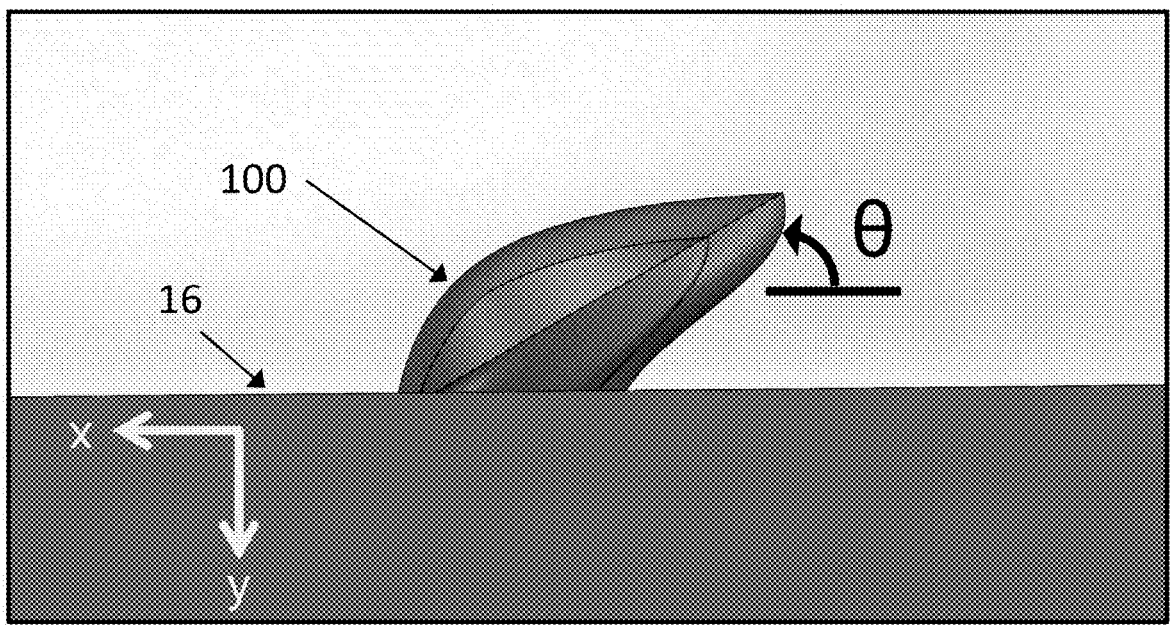
FIG. 2D depicts the aerodynamic device of FIGS. 2A-2C oriented at a tilt angle of 15° above the surface of the airfoil, according to an embodiment of the present disclosure.

Central portion 110, in various embodiments, may be substantially ovular in shape as best shown in FIG. 2A and FIG. 2C. A leading edge 112 of central portion 110, in an embodiment, may be rounded off and a trailing edge 114 of central portion 110, in an embodiment, may be tapered as shown. Central portion 110, in an embodiment, may slope upwards towards its longitudinal centerline, in some cases forming a ridge 116 running from leading edge 112 to trailing edge 114. These features (or variations thereof, as noted below) combine to define a curvature of central portion 110 itself, as well as a portion of a curvature of overall aerodynamic device 100. This overall curvature interacts with streamwise flow over airfoil 10 to generate fluid dynamic effects serving to improve the aerodynamic performance of airfoil 10, as later described in more detail.

It should be recognized that the above-referenced features of central portion 110 are merely representative of the preferred embodiment shown in FIGS. 2A-2D, and that various perturbations may be made one or more features of central portion 110 without necessarily imparting significant changes to the overall effect on the flow over airfoil 10. For example, in some embodiments, both leading edge 112 and trailing edge 114 of central portion 110 may be tapered or rounded so long as the overall effect on the flow over airfoil 10 retains similar properties and aerodynamic performance benefits as those described herein. Likewise, in another example, central portion 110 may slope upwards as described above, but may converge with a smooth transition rather than forming ridge 116. In some embodiments, central portion 110 may even be less elongated so as to take on a more circular shape than ovular. One of ordinary skill in the art will recognize suitable perturbations to features of central portion 110 in light of the teachings of the present disclosure without undue experimentation.

Outer portions 120, 130, in various embodiments, may have elongated profiles and may be arranged substantially parallel to and on opposing sides of central portion 110, as best shown in FIG. 2A and FIG. 2B. Leading edges 122, 132 and trailing edges 124, 134 of outer portions 120, 130, respectively, in various embodiments, may be tapered as shown. Leading edges 122, 132 of outer portions 120, 130, in an embodiment, may be curved toward and blend into leading edge 112 of central portion 110 so as to give aerodynamic device 100 a relatively rounded leading edge defined by leading edges 112, 122, 132 in combination, as shown. Conversely, trailing edges 124, 134 of outer portions 120, 130, an embodiment, may sweep away from trailing edge 114 of central portion 110 to form a v-shaped junctures 140, 142 on opposing sides of central portion 110. These v-shaped trailing edge junctures 140, 142, in an embodiment, may align with valleys 150, 152 created between raised outer portions 120, 130 and raised central portion 110. In some embodiments, central portion 110 and outer portions 120, 130 may be connected at these valleys 150, 152 so as to form a continuous structure, as shown, while in other embodiments central portion 110 and outer portions 120, 130 may be partially or completely separated from one another within a given aerodynamic device 100. Like central portion 110, in an embodiment outer portions 120, 130 may slope upwards toward a longitudinal centerline, perhaps forming ridges 126, 136. These features (or variations thereof, as noted below) combine to define a curvature of each outer portion 120, 130, as well as a portion of a curvature of overall aerodynamic device 100. This overall curvature interacts with streamwise flow over airfoil 10 to generate fluid dynamic effects serving to improve the aerodynamic performance of airfoil 10, as later described in more detail.

It should be recognized that the above-referenced features of outer portions 120, 130 are merely representative of the preferred embodiment shown in FIGS. 2A-2D, and that various perturbations may be made one or more features of outer portions 120, 130 without necessarily imparting significant changes to the overall effect on the flow over airfoil 10. For example, in some embodiments, the surfaces of outer portions 120, 130 may slope upwards from spanwise outer and inner bases as described above, but may converge with a smooth transition rather than forming ridges 126, 136. One of ordinary skill in the art will recognize suitable perturbations to features of outer portions 120, 130 in light of the teachings of the present disclosure without undue experimentation.

Aerodynamic device 100 and its constituent components 110, 120, 130 described above may be assigned lengthwise (chordwise) dimensions, widthwise (spanwise) dimensions, and height dimensions as shown in FIGS. 2A-2D. More specifically, as shown in FIG. 2A, aerodynamic device 100 may have an overall length $l_c$ (denoting chordwise length) and each component 110, 120, 130 may have a respective length $l_r$ (denoting ridge length) measured along its longest chordwise dimension, which in many cases may be along ridges 116, 126, 136 if present. Aerodynamic device 100 may have an overall width $l_s$ (denoting spanwise width) and each component may have respective heights $h_1$ (denoting height of central portion 110) and $h_2$ (denoting the heights of outer portions 120, 130). Aerodynamic device 100 may be coupled to or formed integrally with surface 16 of airfoil 10 at a tilt angle (θ) as shown.

Generally speaking, in the preferred embodiment shown, outer portions 120, 130 may be narrower spanwise than central portion 110, central portion 110 may be taller than outer portions 120, 130, and central portion 110 may be longer than outer portions 120, 130. However, as previously noted, one of ordinary skill in the art will recognize suitable perturbations to the relative dimensions of central portion 110 and outer portions 120, 130 in light of the teachings of the present disclosure without undue experimentation.

Aerodynamic device 100, in various embodiments, may feature an $l_c/l_s$ between about 0.25 to about 5. In the embodiment tested, $l_c/l_s$ was about 1.37. Likewise, aerodynamic device 100, in various embodiments, may feature an $l_c/l_r$ between about 0.25 to about 5. In the embodiment tested, $l_c/l_s$ was about 1.25. Similarly, aerodynamic device 100, in various embodiments, may feature an $h_1/h_2$ between about 0.25 to about 5. In the embodiment tested, $l_c/l_s$ was about 1.4.

In various embodiments, a ratio of overall chordwise length of aerodynamic device 100 ($l_c$) to the chord of airfoil 10 may be between about 0.003 and about 0.3. In a preferred embodiment, this ratio may be between about 0.005 and about 0.15. In the embodiment tested (airfoil #1), this ratio was about 0.03.

In various embodiments, the overall height of aerodynamic device 100 may be less than or equal to the height of the boundary layer of the corresponding airfoil 10 on which it is positioned. Stated otherwise, in such embodiments, aerodynamic device 100 may be fully or substantially submerged within the boundary layer. In other embodiments, the overall height of aerodynamic device 100 may be greater than the height of the boundary layer. In some such cases, only a small portion of aerodynamic device 100 may extend above the boundary layer, such as the trailing end of central portion 110, and in more pronounced cases, the trailing ends of outer portions 120, 130. Accordingly, in various embodiments, $h_1/h_2$ of aerodynamic device 100 may be between about 0.01 to about 2. One of ordinary skill in the art will recognize a suitable overall height of aerodynamic device 100 relative to the boundary layer for a given application without undue experimentation in light of the teachings of the present disclosure.

In various embodiments, the spacing between two adjacent aerodynamic devices 100 on airfoil 10 may be between about 0.1 times and about 10 times the height of central portion 110 of the adjacent aerodynamic devices 100.

Without wishing to be bound by theory, it is thought that the curvature of central portion 110 may contribute to the formation of a separation bubble immediately downstream of central portion 110 that creates enhanced local suction on the airfoil 10 for enhancing lift properties. Again not wishing to be bound by theory, it is thought that the curvature of outer portions 120, 130 may contribute to the formation of first and second streamwise vortices immediately downstream of outer portions 120, 130, respectively, that pull higher energy flow into the boundary layer which, in turn, minimizes local separation similar to the way a vortex generator does, but additionally acting to contain the separation bubble from expanding downstream and bursting at high angles of attack. Of course, one of ordinary skill in the art will recognize that while it is tempting to deconstruct the overall fluid dynamic effects created by aerodynamic device 100 into constituent parts (e.g., a separation bubble, and first and second streamwise vortices), as well as to attribute these constituent parts to individual portions of aerodynamic device 100 (e.g., separation bubble to central portion 110 and vortices to outer portions 120, 130, respectively), this may be an oversimplification, as the aerodynamic effect produced may include additional interactions attributable to the overall curvature of aerodynamic device. Stated otherwise, the aerodynamic effect produced by the overall curvature of aerodynamic device 100 may include unique properties beyond any constituent parts thought to be theoretically identifiable in experimental and computational analysis. Regardless of flow theory, the experimental results showing improvements in both lift and drag are undeniable and have practical, real-world implications for developing innovative aerodynamic bodies.

In order to explore the parameter space as much as physically possible and to converge on a best design, we created 20 airfoils characterized by different arrangements (including either single or multiple rows of aerodynamic device 100), sizes, and tilt angles of these aerodynamic device 100, as later described in more detail in the context of FIGS. 3A-3T. Based on measurements of the shark denticles, we kept $l_c/l_s=1.37$, $l_c/l_r=1.25$, $h_1/h_2=1.40$, and $l_c/h_1=2.95$ constant for all airfoils. All airfoils were fabricated from a transparent photopolymer (RGD81-Stratasys Ltd, Eden Prairie, Minn., USA) using an Objet Connex500 3D printer. More details on the diversity of airfoil designs tested are later described in more detail.

Given the relevant Reynolds number ranges for aerodynamic applications (<10,000 to >1,000,000) and the dimensional limitations of the 3D printer used to fabricate our test models, these requirements necessitated the use of a water tank for measuring the performance metrics of our airfoils. Each airfoil's 10 performance was tested in steady state within a water tank (kinematic viscosity $v=1\times10-6$ m$^2$/s) in the laminar regime with a flow speed of U=0.58 m/s, which corresponds to a chord Reynolds number of $Re_c=UL/v\approx4\times10^4$. The airfoils were tested at angles of attack, α, from 0° to 24° (post-stall and within the limits of the experimental setup) in increments of Δα=2°. At each angle, the force experienced by the airfoils parallel to the flow, FD, and perpendicular to the flow, $F_L$, were recorded. From these measurements, the dimensionless coefficients of lift ($C_L$) and drag ($C_D$) were calculated as $$C_L = \frac{2F_L}{\rho A U^2}, \quad C_D = \frac{2F_D}{\rho A U^2} \quad \text{(Eq. 1)}$$

where A=W×L=12,920 mm$^2$ is the airfoil planform area (regardless of airfoil orientation) and $\rho\approx1000$ kg/m$^3$ is the density of water. Since at the moderate Reynolds number considered in this study the force measurements can be quite sensitive to the different parameters of the experiment, at least 6 trials were conducted for each of the 20 airfoils and each presented data point is the average of many tests (with standard error reported). For some airfoils discussed, Particle Image Velocimetry (PIV) was also conducted using this water tank. In order to carry this out, 10 g of neutrally-buoyant, silver-covered glass particles were added to the water tank, and a 10 W continuous-wave argon-ion laser (Innova 300, Coherent Laser Group, CA, USA) was focused at the mid-point of the airfoil 10. With this 1-2 mm thick laser sheet shining on the center of the airfoil 10, high speed videos at 2000 Hz and at a resolution of 1024 pixels by 1024 pixels were taken using a Photron mini-UX100 high-speed video camera. The videos were then finally post-processed using LaVision's DaVis software (v 7.3.1) to obtain the streamlines. Further details regarding experimental methods are later described.

Figure 4A:
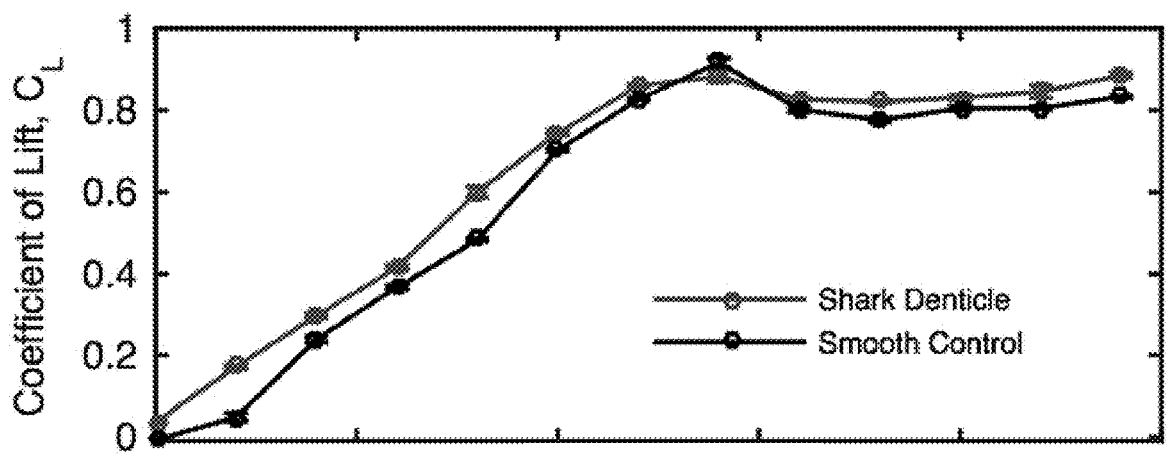
FIG. 4A, FIG. 4B, and FIG. 4C depict experimental results of lift coefficient, drag coefficient, and lift-to-drag ratio as a function of angle of attack for airfoil #1, compared with experimental results for a smooth control airfoil, according to an embodiment of the present disclosure.
Figure 4B:
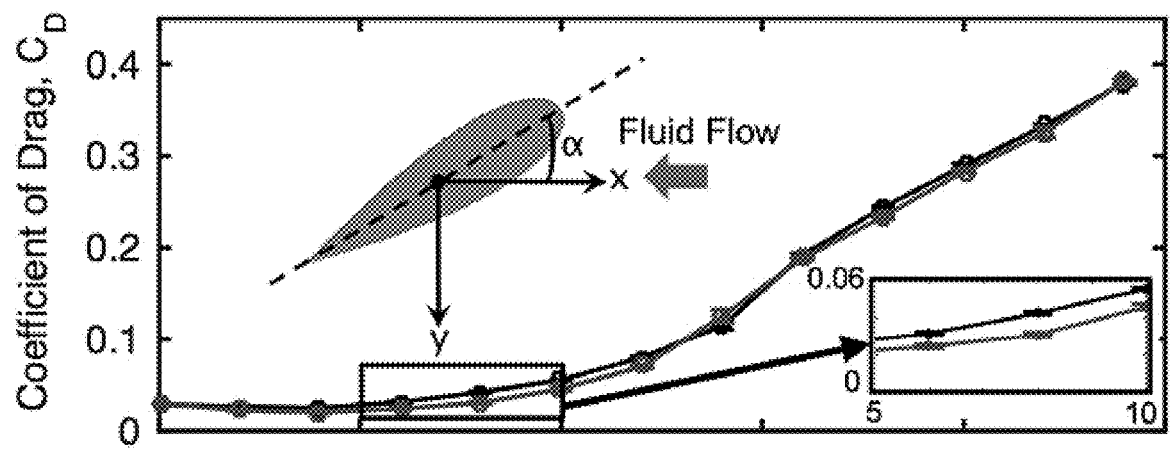
Figure 4C:
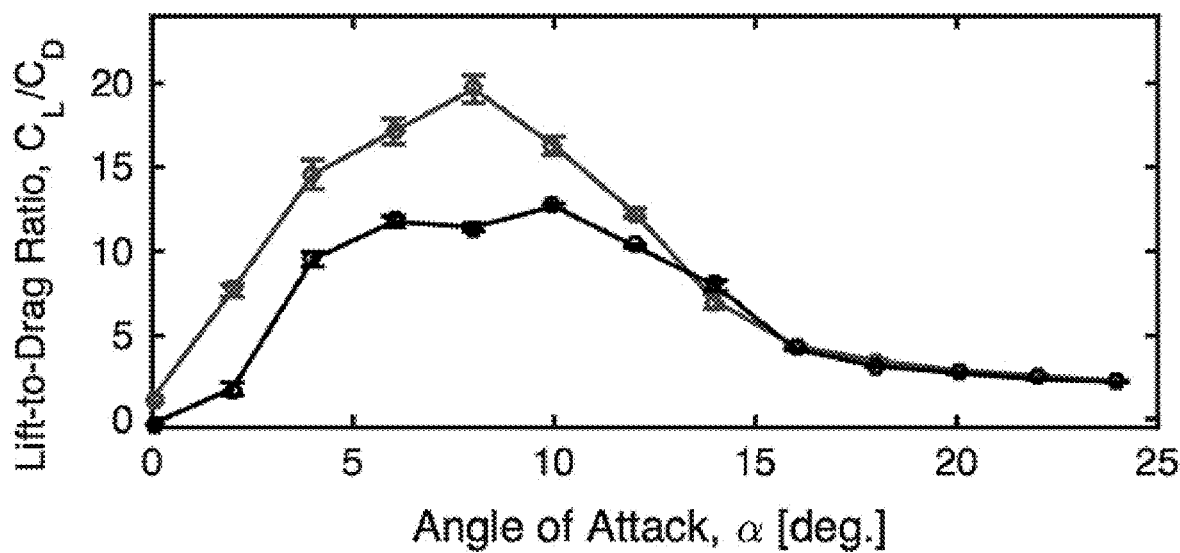

As previously shown in many studies focused on vortex generators, we find that both the geometry of aerodynamic devices 100 and its arrangement on an airfoil 10 have a profound effect on the aerodynamic response of the airfoils. While most airfoils behaved roughly similar to the smooth control, a few of them exhibited significantly enhanced performance, as later described in more detail. In FIG. 4A, FIG. 4B, and FIG. 4C we report results of the experiments for the best performing airfoil 10, which comprises a single row of aerodynamic devices 100 (each of which covers a footprint of roughly 2 mm by 2 mm and has a middle-ridge height of 0.7 mm) placed at 26% along the chord and with a spanwise separation of 1 mm (see FIG. 1C). Note that the 26% chordwise placement is consistent with previous work on NACA0012 airfoils, which has shown that the minimum pressure happens right after this location, making the flow susceptible to separation.

These results of FIG. 4A, FIG. 4B, and FIG. 4C for the best-performing arrangement of aerodynamic devices 100 show three key features. First, we observe an increase in lift at almost all angles of attack for the airfoil 10 with aerodynamic devices 100 compared to the corresponding smooth control (i.e. $C_L^{shark}/C_L^{control}$=3.55, 1.24, 1.13, 1.24, 1.06, 1.04, 0.96, 1.03, 1.06 at α=2°, 4°, 6°, 8°, 10°, 12°, 14°, 16°, 18°, respectively—see FIG. 4A). We even find that positive lift is generated at zero angle of attack for the airfoil 10 with aerodynamic devices 100 ($C_L^{shark}$=0.04 at α=0°), whereas, as expected, we see no lift being generated by the smooth, symmetric control airfoil 10 for α=0°. Second, the airfoil 10 with aerodynamic devices 100 reduces drag compared to the smooth control at almost all angles of attack smaller than the angle at which stall occurs ($C_D^{shark}/C_D^{control}$=1.06, 0.84, 0.81, 0.78, 0.72, 0.83, 0.87 at α=0°, 2°, 4°, 6°, 8°, 10°, 12°, respectively—see FIG. 4B) with drag reduction comparable to previously designed synthetic shark skin surfaces. Third, as shown in FIG. 4C, because of the two combined effects described above, we observe substantial enhancements in the lift-to-drag ratio ($C_{L/D}=C_L/C_D$). More specifically, we find that $C_{L/D}^{shark}/C_{L/D}^{control}$=4.23, 1.53, 1.46, 1.72, 1.28, and 1.19 at α=2°, 4°, 6°, 8°, 10°, and 12°, respectively. Such increases are comparable to those observed for the best-reported vane-type low-profile vortex generators for α≥4°. However, the aerodynamic devices 100 morphology outperforms the more traditional designs at low angles of attack (α<4°), a condition that is often experienced in use by many systems including drones, turbines, automobiles, and airplanes.

The experimental results shown in FIG. 4A, FIG. 4B, and FIG. 4C indicate that there are two driving forces behind the improved lift-to-drag ratio found for the best airfoil 10 with aerodynamic devices 100: (i) the enhanced lift, and (ii) the drag reduction at angles of attack prior to stall (i.e. 2°<α<12°). By looking at the response of all 20 airfoils tested, as later described in more detail in the context of FIGS. 14-31, we find that all of them except two (airfoils #8 and #20) display lift enhancement at low angles of attack (with airfoils #11, #14, and #16 showing only very small improvements). This suggests that such benefit is rather robust, only marginally affected by the location and morphology of the geometric perturbations added to the airfoils. In contrast, we find that the lift improvements at high angles of attack prior to stall, as well as the drag reduction, are sensitive to the morphology and location of the aerodynamic devices 100, as later described in more detail.

Figure 5A:
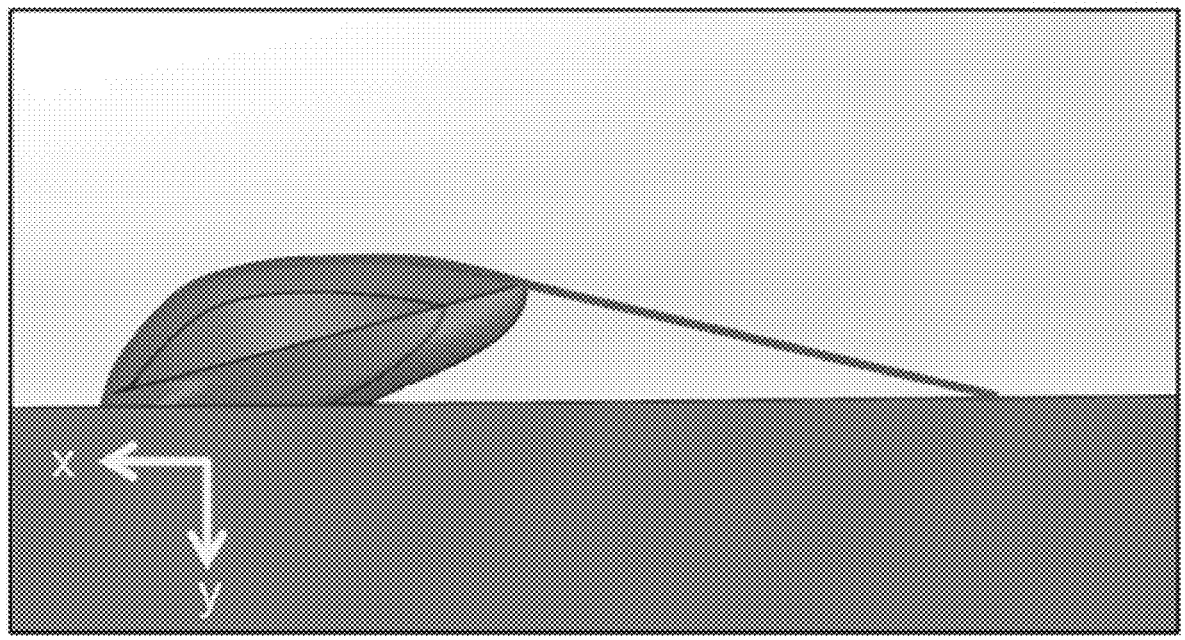
FIG. 5A depicts a side view comparison of an aerodynamic device and a 2D bump profile (red line), according to an embodiment of the present disclosure.
Figure 5B:
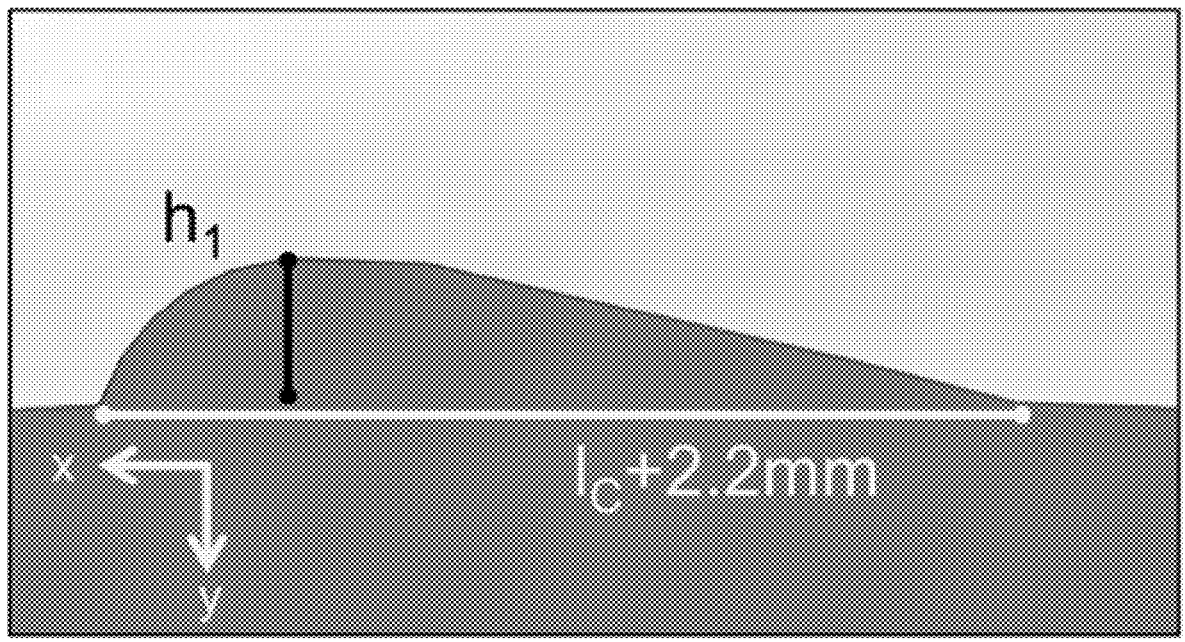
FIG. 5B depicts a side view of the 2D bump profile, and corresponding geometric parameters.

To further understand the effect of aerodynamic devices 100 on the aerodynamic performance of the airfoils, first we focused on the robust lift enhancement at low angles of attack. Guided by a previous numerical study that demonstrated that a simple 2D bump arranged on a flat plane can generate a negative pressure coefficient (30), we constructed a airfoil 10 in which the row of aerodynamic devices 100 was replaced with a simple 2D bump profile (with non-zero curvature only in the chordwise direction). This bump is arranged in the same chordwise location and has height and leading edge curvature that match those of aerodynamic devices 100. The morphology of this 2D bump airfoil 10 is shown in FIG. 5A and FIG. 5B, and is later described in more detail. Furthermore, the bump has a streamlined design on its downstream side to reduce its generated pressure drag.

Figure 6A:
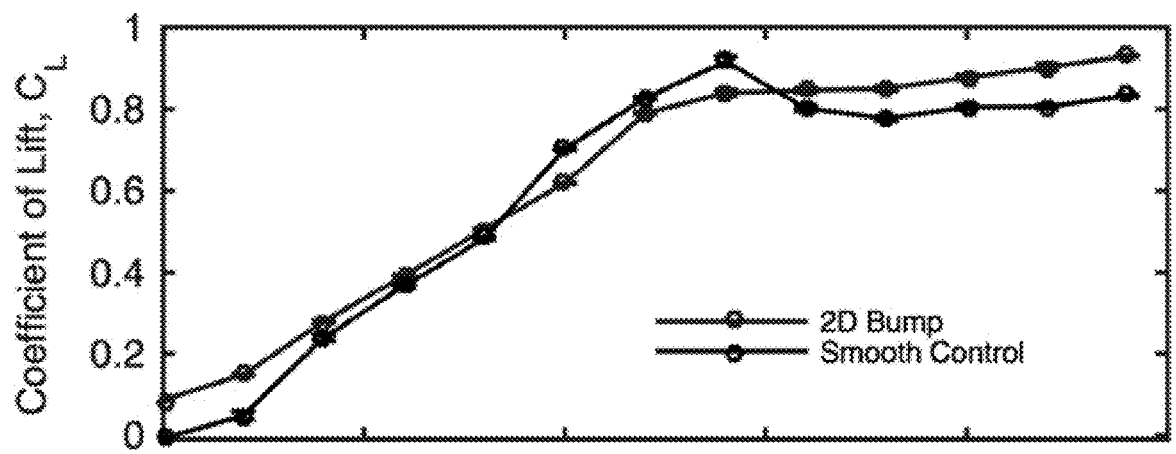
FIG. 6A, FIG. 6B, and FIG. 6C depict the experimental results of lift coefficient, drag coefficient, and lift-to-drag ratio as a function of angle of attack for the 2D bump profile of FIG. 5A and FIG. 5B, compared with experimental results for a smooth control airfoil.
Figure 6B:
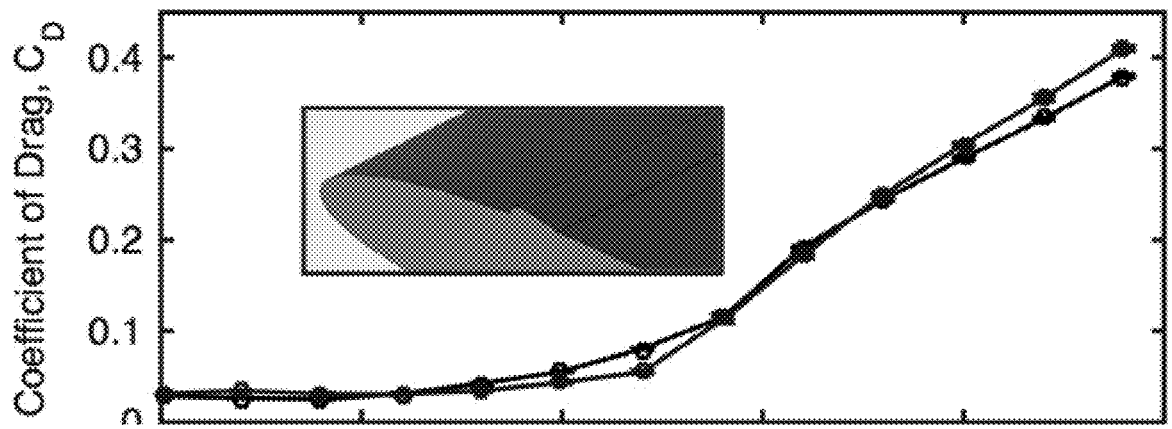
Figure 6C:
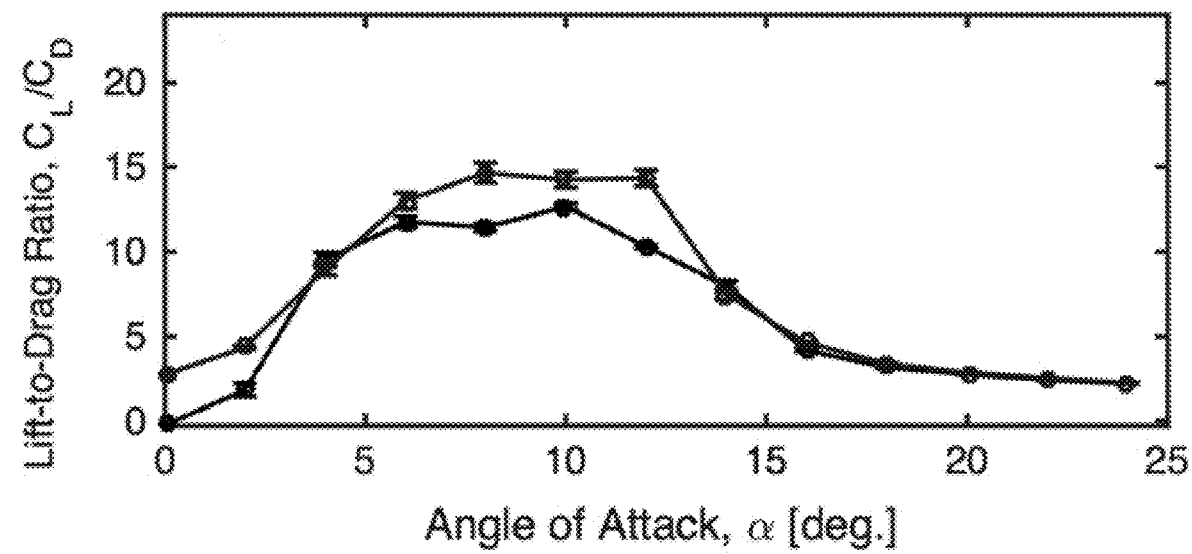

The experimental lift, drag, and lift-to-drag ratio for this 2D bump profile on a airfoil 10 are presented in FIG. 6A, FIG. 6B, and FIG. 6C. If we look specifically at the lift coefficient reported in FIG. 6A, we see that this simple 2D bump profile enhances lift at low angles of attack ($C_L^{2Dbump}/C_L^{control}$=3.08 and 1.17 at $\alpha$=2° and $\alpha$=4° respectively) and generates non-zero lift at $\alpha$=0° ($C_L^{2Dbump}$=0.09 at $\alpha$=0°). Interestingly, while at $\alpha$=2° and $\alpha$=4° the airfoil 10 with the 2D bump profile generates close to the same amount of lift as the one with aerodynamic devices 100 ($C_L^{2Dbump}/C_L^{shark}$=0.87 and 0.94 at $\alpha$=2° and 4°, respectively), it results in over twice the amount of lift at zero angle of attack ($C_L^{2Dbump}/C_L^{shark}$=2.41 at $\alpha$=0°). This confirms that the complex shape of the aerodynamic devices 100 arranged on the airfoil 10 is not necessarily crucial to achieve lift enhancement at low angles of attack, and suggests that a continuous chordwise curved profile can further enhance $C_L$. However, the results reported in FIG. 6A also demonstrate that the airfoil 10 with the simple 2D bump profile loses its lift benefits relative to the control at higher angles of attack unlike the airfoil 10 with aerodynamic devices 100 ($C_L^{2Dbump}/C_L^{control}$=0.88, 0.95, 0.91 at $\alpha$=10°, 12°, 14°, respectively). At these angles right before and at stall, it is actually producing less lift than the control. Moreover, we also note that the 2D bump profile does not alter the drag greatly compared to the smooth control (except at $\alpha$=10° and 12°—see FIG. 6B). Because of these two latter effects, and when compared to the best airfoil 10 with aerodynamic devices 100, we find that the 2D bump profile exhibits a significantly lower lift-to-drag ratio across nearly all measured angles of attack (see FIG. 6C).

Figure 7A:
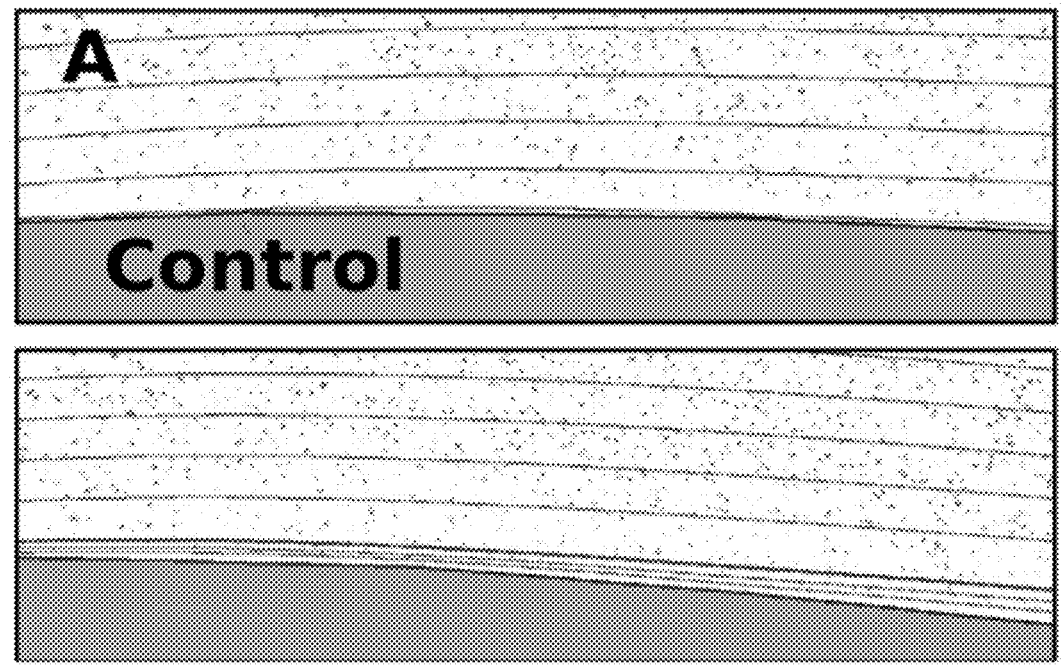
FIG. 7A, FIG. 7B, and FIG. 7C depict flow streamlines obtained via Particle Image Velocimetry (PIV) for the smooth control airfoil, 2D bump profile airfoil, and an embodiment of an aerodynamic device, at α=0° and 4°, respectively.
Figure 7B:
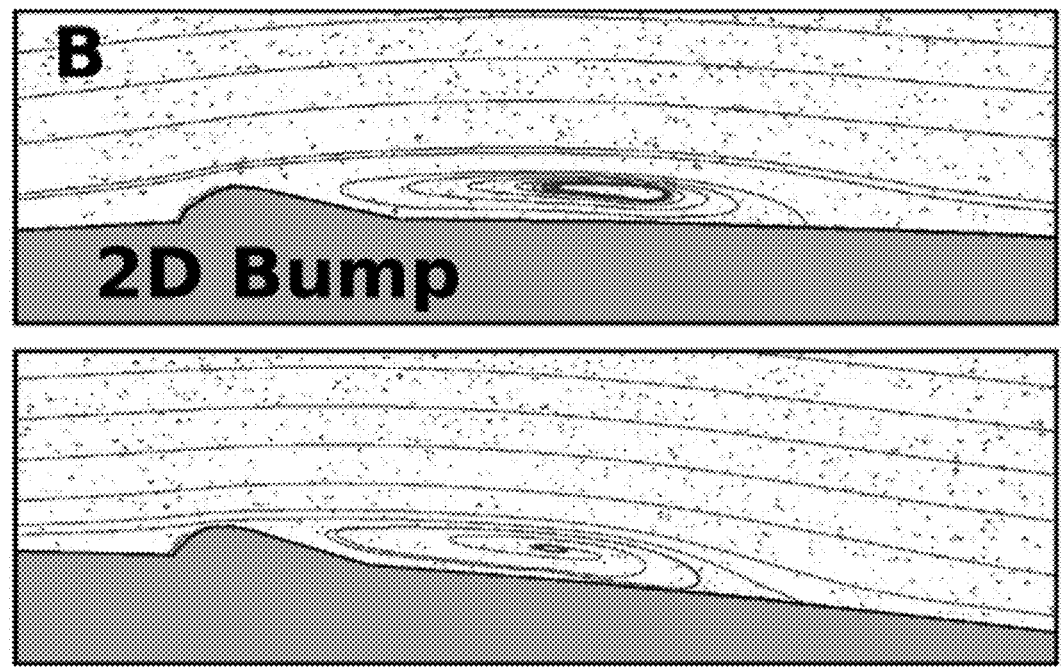
Figure 7C:
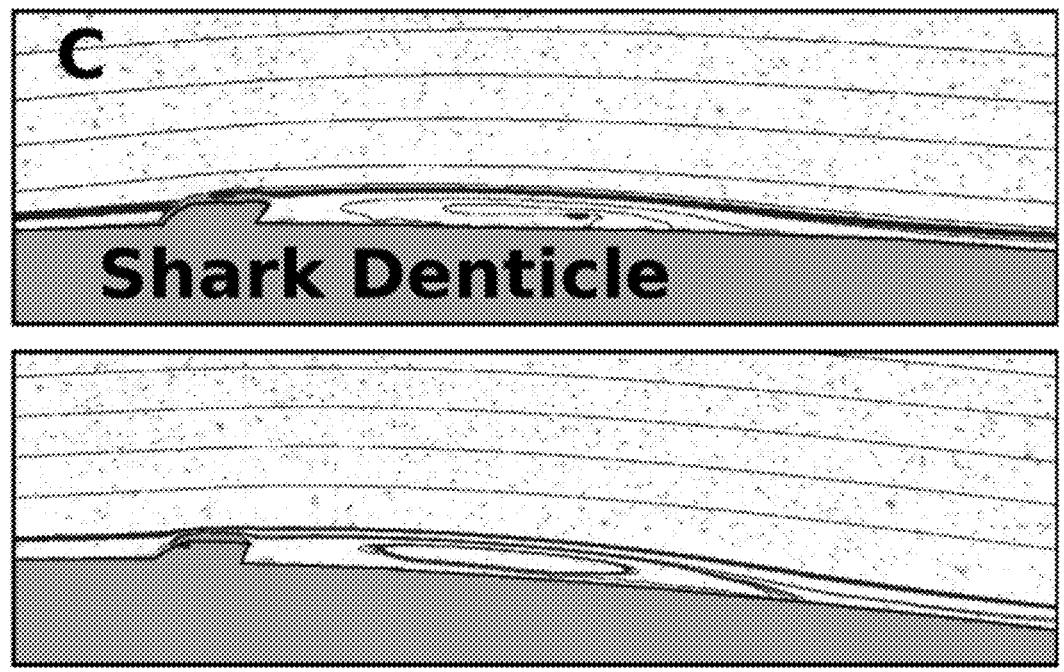

The reason behind the lift benefit at low angles of attack seen by both aerodynamic device 100 and 2D bump profile in comparison to the control can be further understood by inspecting the flow streamlines obtained via Particle Image Velocimetry (PIV). The streamlines at $\alpha$=0° and 4° shown in FIG. 7A, FIG. 7B, and FIG. 7C, reveal that, in the presence of both aerodynamic devices 100 and the 2D bump profile, a short separation bubble forms behind their trailing edge. While typically separation bubbles are thought to negatively affect the performance of an airfoil 10, it has also been shown that short separation bubbles (that fully reattach to the airfoil 10) can help to maintain a higher level of suction a bit further down the chord of the airfoil 10, providing a region over which the pressure distribution along the chord plateaus rather than dropping off further. As such, the short separation bubbles observed in our experiments likely provide additional suction that helps enhance lift.

Figure 8A:
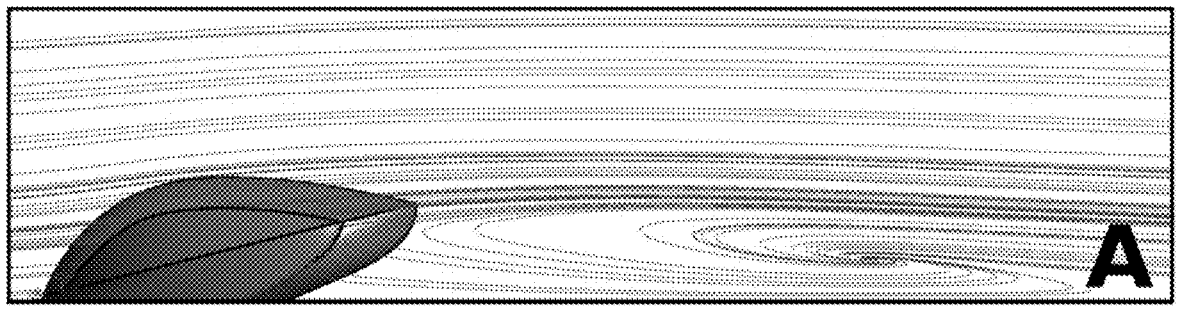
FIG. 8A and FIG. 8B illustrate CFD analyses of an embodiment of an aerodynamic device on a flat plate, according to an embodiment of the present disclosure.
Figure 8B:
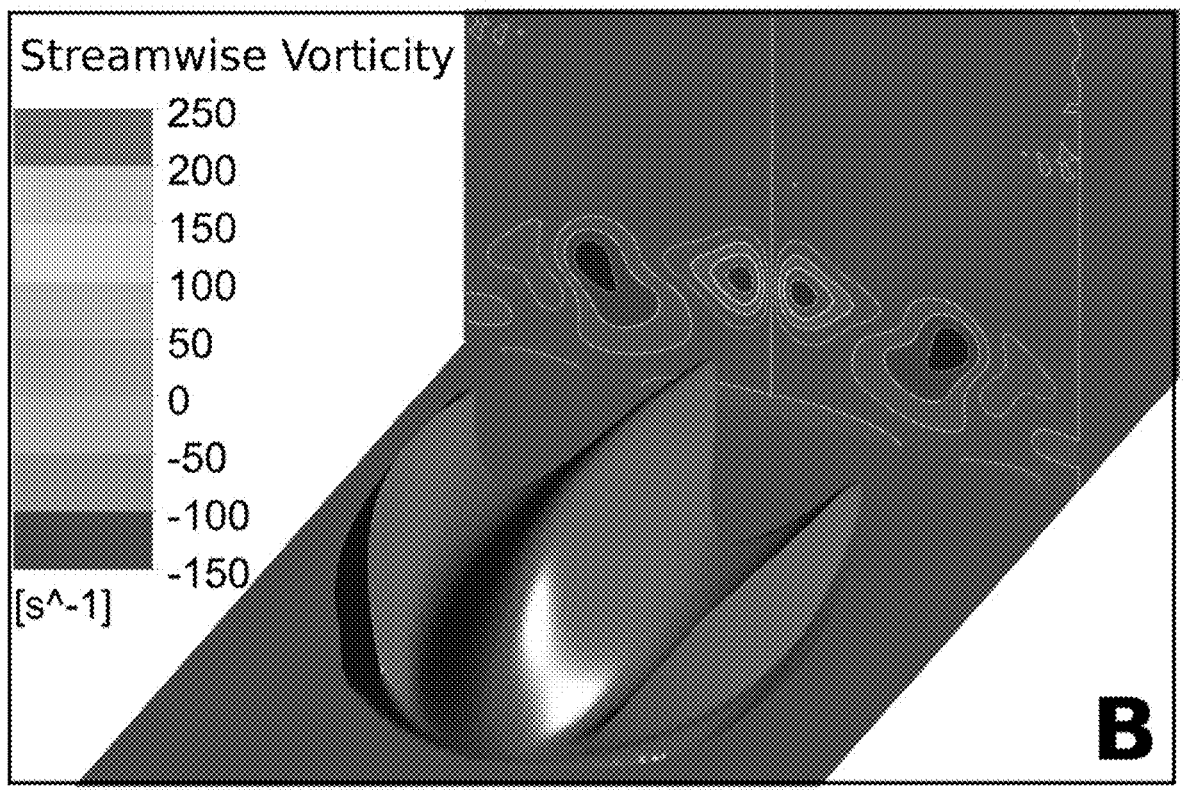

Having understood how the 2D bump profile and aerodynamic device 100 influence lift at low angles of attack, we now turn our attention to lift enhancement at higher angles of attack and drag reduction. The lack of drag reduction seen throughout the majority of angles of attack and loss of lift enhancement at $\alpha$>4° for the 2D bump airfoil suggests strongly that the spanwise curvature of aerodynamic device 100 may play an important role. More specifically, guided by previous studies that showed that geometric perturbations capable of producing streamwise vortices could reduce drag (and prevent losses of lift at higher angles of attack near stall), we hypothesized that the spanwise curvature of aerodynamic devices 100 results in the formation of streamwise vortices. In order to confirm this, since the visualization of such vortices via PIV proved challenging due to both the small-scale spatial resolution required and the orientation of the aerodynamic device's 100 grooves, we performed Computational Fluid Dynamics (CFD) analyses. The simulations were carried out with ANSYS® CFX, using a combination of a finite-volume and finite-element approach to discretize the Navier-Stokes equations, which were solved by an unsteady fully-implicit, fully-coupled multigrid solver with the Shear Stress Transport (SST) turbulence model. The numerical results reported in FIG. 8B for an individual aerodynamic device 100 on a flat plate not only confirm that the morphology of aerodynamic device 100 creates a short separation bubble in its wake (see FIG. 8A) as shown previously via PIV, but also confirm that aerodynamic devices 100 acts as a vortex generator, as shown clearly by the streamwise vortices forming in the wake of aerodynamic device 100 (see FIG. 8B).

These streamwise vortices are likely responsible for drag reduction and also likely help to maintain lift at higher angles of attack by bringing higher momentum fluid from the outer part of the boundary closer to the wall and thus help replenish the momentum in the boundary layer which would have been lost to skin friction. It is further known that the interaction among these vortices is crucial in determining their aerodynamic advantages. For instance, placing the vortex generators too close to each other in the spanwise direction can lead to destructive interference of the streamwise vortices, which ultimately reduces the performance of the airfoil 10. This observation helps explain the high sensitivity of the drag coefficient to the morphology and placement of aerodynamic devices 100 that we found in our experiments.

Experimental Setup

Figure 9A:
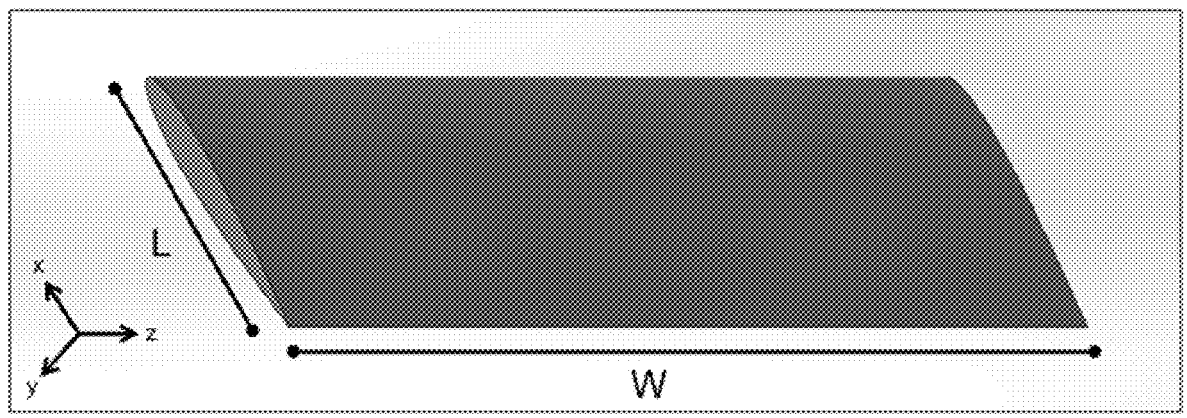
FIG. 9A and FIG. 9B illustrate isometric and cross-sectional views of a smooth NACA0012 airfoil.
Figure 9B:
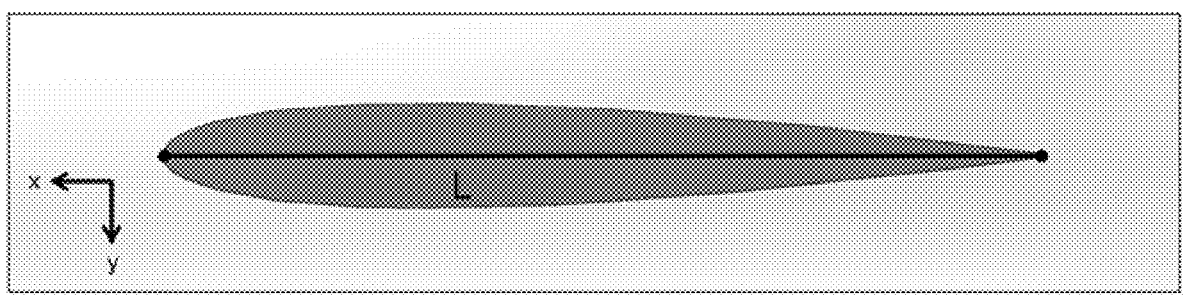

In this section, we provide geometric details on all of the different, airfoils considered. All the airfoils tested are based on a symmetric NACA0012 airfoil with aspect ratio W/L=2.8 (L=68 mm being the chord length and W denoting the span length—see FIG. 9A and FIG. 9B). We first characterized the aerodynamic performance of the smooth airfoil, and then investigated how the coefficients of lift and drag are affected when different geometric perturbations are arranged on its suction side.

Models of all airfoils were created using SolidWorks (SolidWorks Corp., Waltham, Mass., USA). These models were exported as stl files and 3D printed using an Objet Connex500 3D printer (Stratasys Ltd, Eden Prairie, Minn., USA). The airfoils were printed from a transparent photopolymer (RGD810) on the Connex500 3D printer. Any supporting material used to print the airfoil was easily removed using a water jet (1). Because this 3D printer has some precision limitations with which smooth surfaces can be printed, the leading edge of the airfoils had some slight roughness with a root-mean-square height of roughly 8 microns, measured using surface profilometry.

Figure 10:
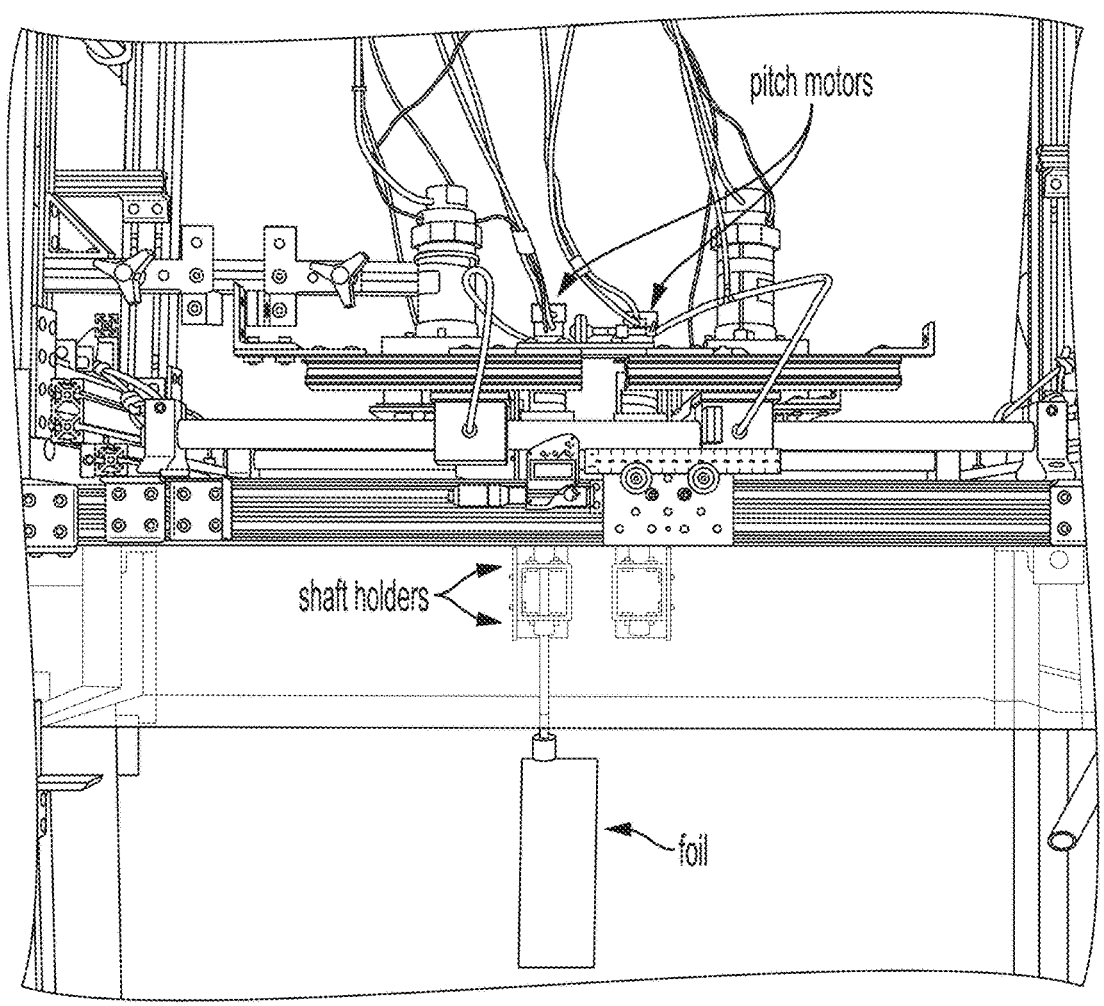
FIG. 10 depicts the experimental flow tank setup used to test representative airfoils and systems of the present disclosure.

Each airfoil's aerodynamic performance was tested in steady state within the water flow lank shown in FIG. 10 (kinematic viscosity $\nu$=1×10$^{-6}$ m$^2$/s). All tests were conducted in the laminar regime with a flow speed of U=0.58 m/s, which corresponds to a chord Reynolds number of $Re_c$=UL/$\nu$≈4×10$^4$. PIV was conducted using this water tank as well. 10 g of neutrally-buoyant, sliver-covered glass particles were added to the water tank, and a 10 W continuous-wave argon-ion laser (Innova 300, Coherent Laser Group, CA, USA) was focused at the middle of each airfoil for which PIV was conducted. Using a Photron mini-UX100 high-speed video camera, high speed videos at 2000 Hz and at a resolution of 1024 pixels by 1024 pixels were taken. Then, using LaVision's DaVis software (v 7.3.1), the videos were post-processed to obtain the streamlines.

It is important to note that, at the moderate Reynolds numbers considered, the response of the airfoils is strongly influenced by the unavoidable small imperfections introduced both during fabrication and testing (8). Therefore, the following points need to be considered when comparing the results with available airfoil data in the literature.

1. Surface roughness of the airfoil. Surface roughness of an airfoil can certainly influence flow separation and measured $C_L$ and $C_D$ values, and no manufactured airfoil is completely smooth. We measured the surface roughness of our 3D printed airfoils using quantitative surface profilometry and report a root-mean-square surface feature height of 8 microns (2, 3).

2. Turbulence intensity. Turbulence intensity in the tank can also influence patterns of the fluid flow over a airfoil. The turbulence intensity values measured for our experimental setup are roughly 3-5%.

3. Drag on the holding rod. We measured forces on the holding rod in the absence of the airfoil over a range of angles of attack (since rotating the holding rod could potentially affect measured drag). Mean values of rod drag and lift were subtracted at each point.

4. Tip effects and surface waves. The upper and lower edges of the tested airfoils were roughly 3 cm from the tank bottom and free water surface. Some interaction of flow over the airfoil and these surfaces is inevitable, but we were not able to detect any effects of airfoil surface interactions that affected our experimental data.

5. Trailing edge thickness. 3D printed airfoils are subject to the challenges of 3D printing resolution in general, and a perfectly sharp tailing edge is particularly difficult to achieve. Our airfoils were printed at high resolution on an Objet Connex 500 printer which has state-of-the art resolution capability, but the trailing airfoil edge is likely not as sharp as might occur in manufactured and polished aluminum airfoils.

6. Asymmetry in manufactured airfoils. Even though there are necessarily some minor asymmetries due to additive printing, we made every effort to ensure that our 3D printed airfoils were symmetrical and met NACA0012 profile standards.

Figure 11:
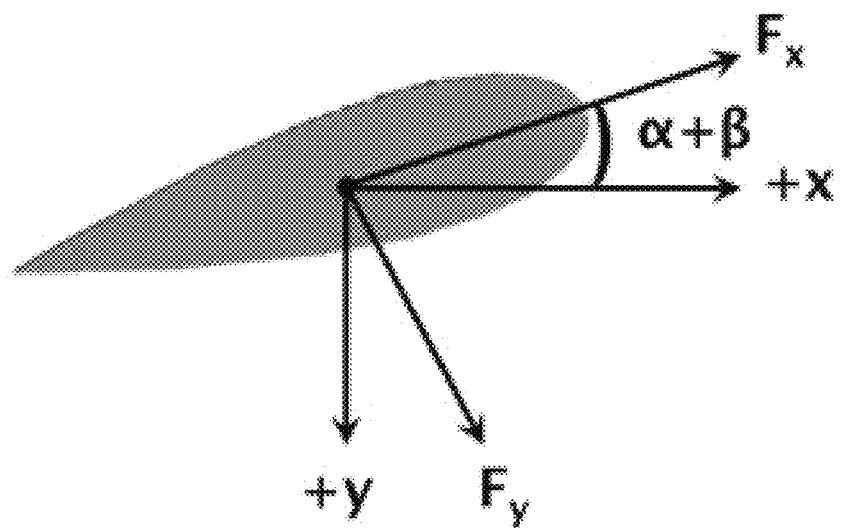
FIG. 11 illustrates a schematic for calibration of the experimental flow tank setup.
Figure 12C:
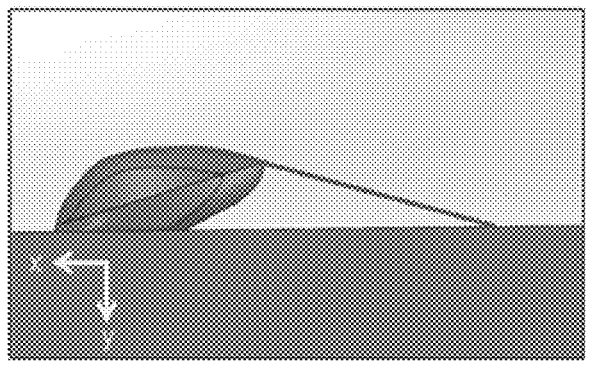
FIG. 12C depicts chordwise placement of the 2D bump on the airfoil (d/L=0.26)
Figure 12C:
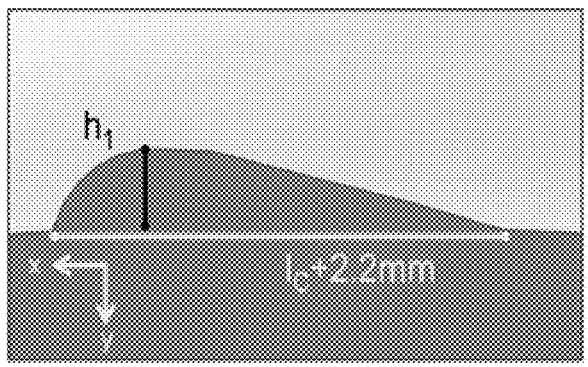
Figure 12C:
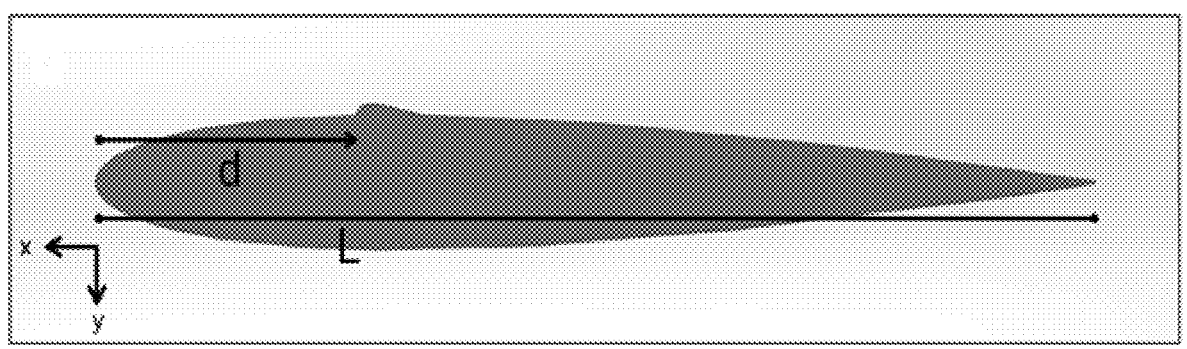
Figure 12D:
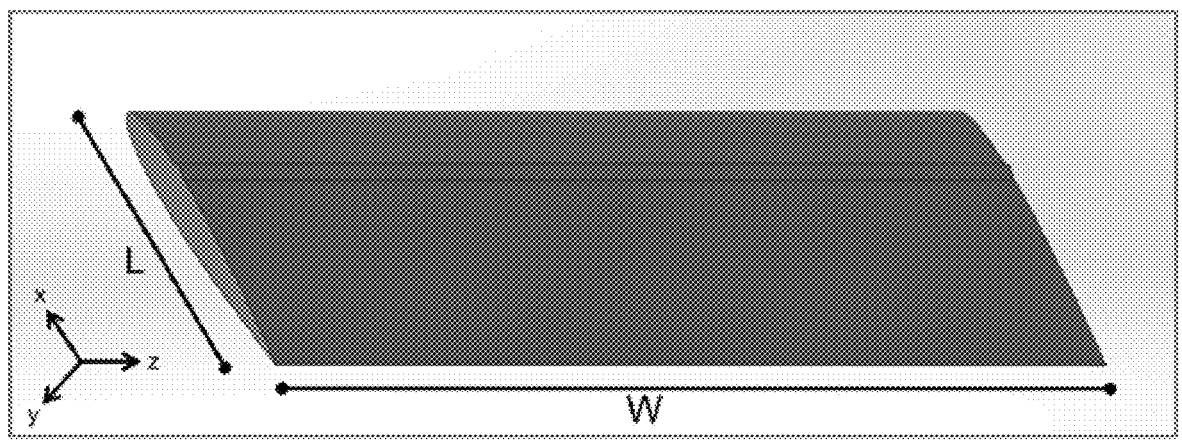
FIG. 12D depicts an isometric view of the 2D bump airfoil.

7. Calibration and airfoil alignment. Airfoil calibration and alignment is one of the most critical and yet challenging issues in conducting static tests on airfoils (8). We expended considerable effort to ensure that our calibration was accurate and that airfoil alignment provided accurate, symmetric results for the smooth control airfoil. Symmetrical data were obtained when the control airfoil was moved in both directions (i.e., measurements of lift and drag forces showed similar patterns when the airfoil was rotated both clockwise and counterclockwise). In order to be, able to obtain these accurate, symmetric results, the data had to be calibrated from the raw forces read by the transducer. Because it is very difficult to perfectly align the transducer with the airfoil, some D angle must be introduced to calibrate, calculate, and ensure symmetric and accurate results in the smooth control airfoil. Specifically, since the force transducer is locked in with the airfoil during experiments, it rotates with the airfoil as the airfoil is rotated to test the different angles of attack. If we denote with $F_x$ and $F_y$ the forces along the x- and y-direction read by the transducer (see FIG. 11), it follows that the lift and drag force on the airfoil can be calculated as $$F_D = F_x * \cos(\alpha + \beta) + F_y * \sin(\alpha + \beta) \qquad \text{(Eq. 2)}$$

$$F_L = F_y * \cos(\alpha + \beta) - F_x * \sin(\alpha + \beta) \qquad \text{(Eq. 3)}$$

where $\alpha$ is the angle of attack of the airfoil and $\beta$ is the calibration angle to ensure symmetrical results for the airfoils (see FIG. 11).

In addition, we note that the $C_L$ and $C_D$ values of our smooth control at zero angle of attack align well with the literature (8). Differently, a wide range of values of lift and drag has been reported in literature for angles of attack past zero. This is undoubtedly due to a rather considerable variation of the parameters (i.e. 7 points described above) among the different investigators.

Experimental Results for Control Airfoils: Smooth, 2D Bump, and Vortex Generators In 9A and FIG. 9B we show a model of the airfoil used as a smooth control. It consists of a symmetric NACA0012 airfoil with aspect ratio W/L=2.8 and no perturbation on its faces.

To further understand the effect of aerodynamic devices 100 on the aerodynamic performance of the airfoils, we then considered an airfoil in which one row of aerodynamic devices 100 is replaced with a simple 2D bump profile, which has non-zero curvature only in the chordwise direction.

FIG. 12A, FIG. 12B, FIG. 12C, and FIG. 12D show the morphology of the 2D bump airfoil. The leading edge curvature matches the middle ridge leading edge curvature of aerodynamic device 100. However, rather than having an overhang like aerodynamic device 100 does, the bump attaches to the airfoil downstream from where the middle ridge of aerodynamic device 100 ends. This gives the 2D bump a streamlined nature so as to reduce pressure drag. Note that all parameters and dimensions ($h_1$, $l_s$, d, L, W) shown in FIG. 12A, FIG. 12B, FIG. 12C, and FIG. 12D match exactly that of the best airfoil with aerodynamic devices 100 (Airfoil #1). Specifically, $h_1$=0.7 mm, $l_c$=2 mm, d/L=0.26, L=68 mm and W/L=2.8.

Experimental Results for Airfoils with Aerodynamic Devices 100

Figures 3A, 3B:
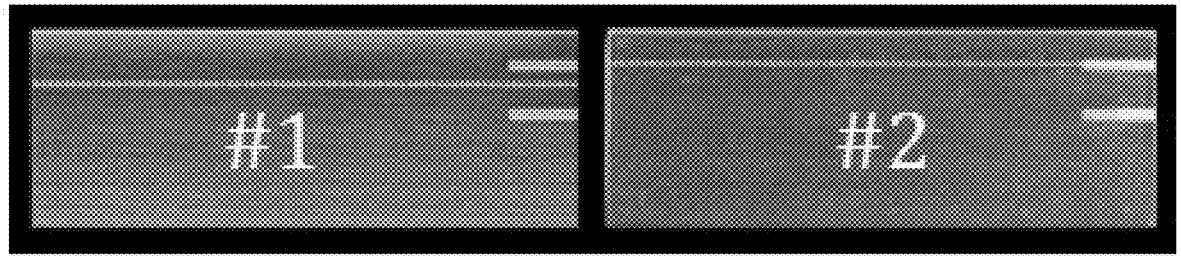
FIGS. 3A-3T depict twenty airfoils featuring representative arrangements of aerodynamic devices arranged on the surface of an airfoil with varying sized, rows, and row positions, according to various embodiments of the present disclosure.
Figures 3C, 3D:
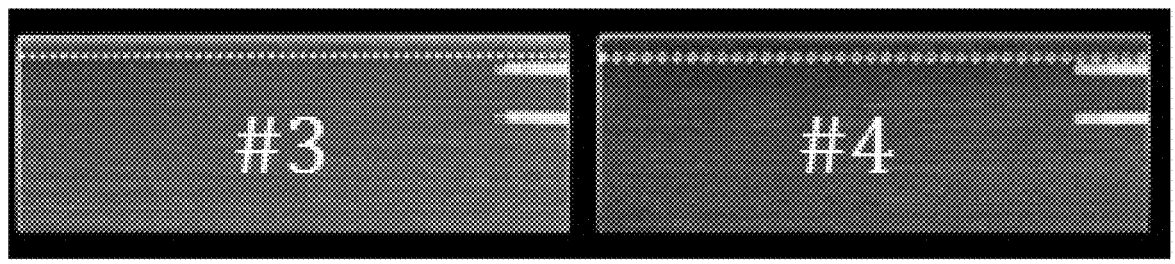
Figures 3E, 3F:
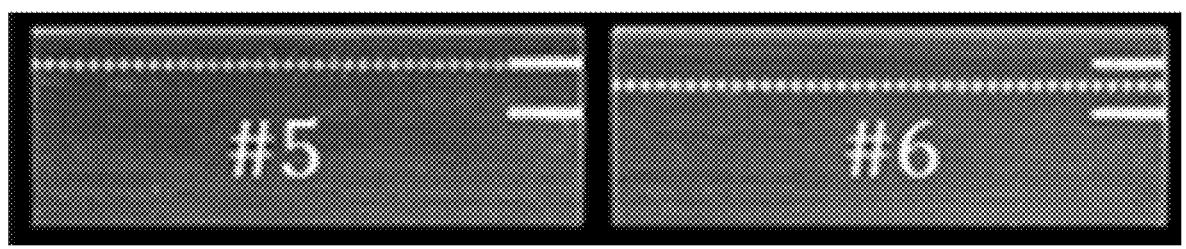
Figures 3G, 3H:
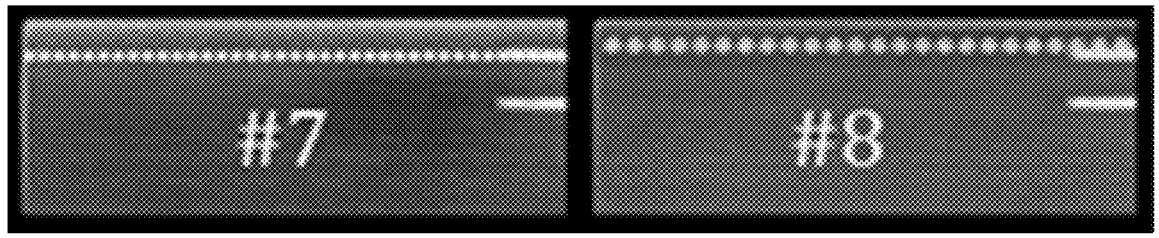
Figures 3I, 3J:
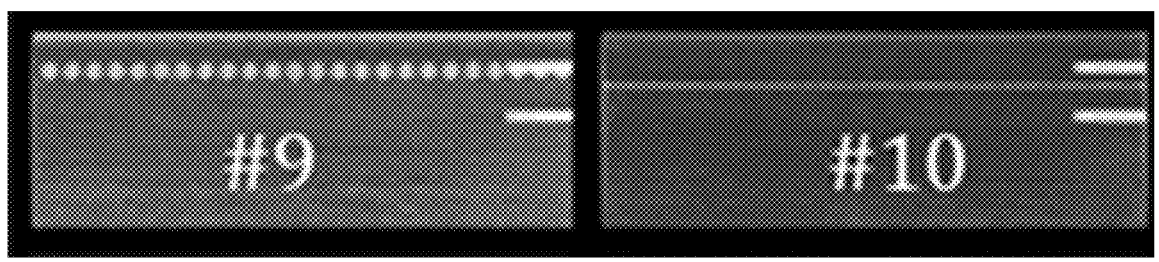
Figures 3K, 3L:
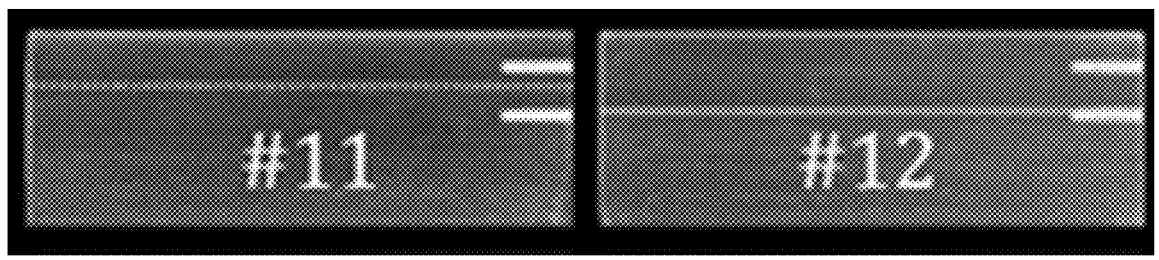
Figures 3M, 3N:
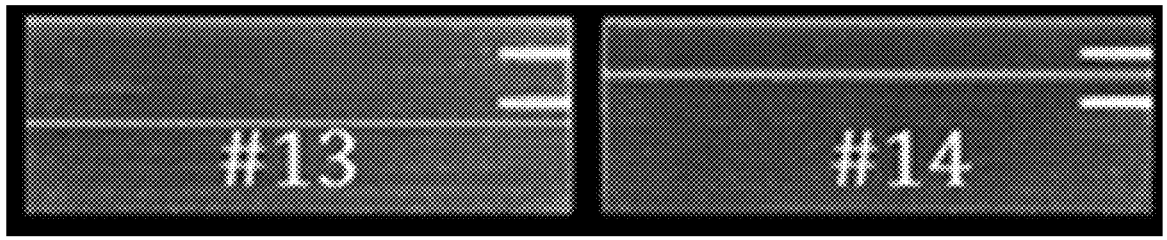
Figures 3O, 3P:
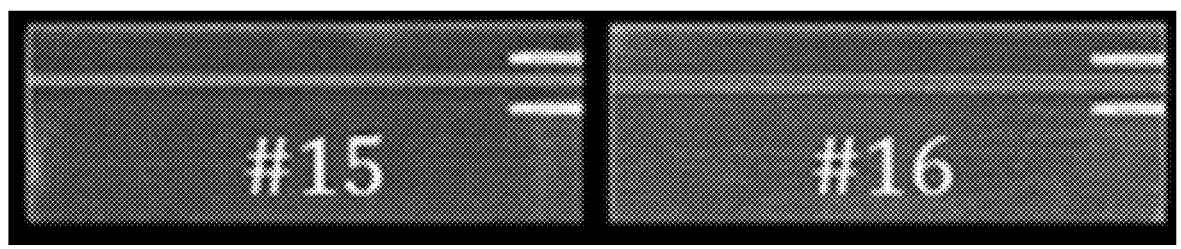
Figures 3Q, 3R:
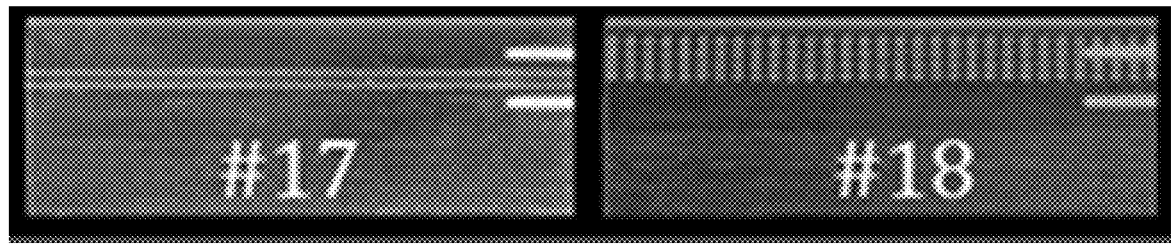
Figures 3S, 3T:
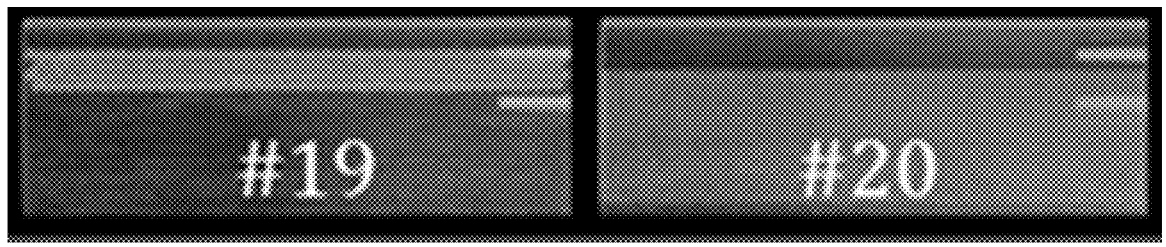

We designed 20 airfoils characterized by different arrangements, sizes, and tilt angles of representative models of aerodynamic devices 100 attached to their suction side (see FIGS. 3A-3T).

Representative model of aerodynamic device 100: A 3D parameterized model of a single representative denticle from a shortfin mako shark (Isurus oxyrinchus) was constructed using a microCT scanner (XradiaVersaXRM-500, at Cornell University, Institute of Biotechnology) and meshed using Mimics 3D (Materialise Inc., Leuven, Belgium). Details of shark denticle modeling are also available in Wen et. al. (2014, 2015) (1, 4). A representative model of aerodynamic device 100 is shown in FIG. 2A, FIG. 2B, FIG. 2C, and FIG. 2D. There, $l_c$ is the chordwise length of the middle ridge, $l_r$ is the chordwise length of the side ridges, is $l_s$ the spanwise length between the outside ridges (the middle ridge is placed in the middle between these two ridges), $h_1$ is the height of the middle ridge, and $h_2$ is the height of the side ridges. Based on measurements of the shark denticles, we kept $l_c/l_s=1.37$, $l_c/l_r=1.25$, $h_1/h_2=1.40$, and $l_c/h_1=2.95$ constant for all airfoils. Moreover, all aerodynamic devices 100 (except those arranged on airfoil #7) were placed with a 15° angle of tilt (θ) (see FIG. 2D). An additional 15° of tilt (meaning aerodynamic devices 100 were rotated 15° further counter-clockwise about their center) was given to aerodynamic devices 100 arranged on airfoil #7. Additional details on the geometry of aerodynamic devices 100 arranged on the 20 different airfoils considered are provided in Table 1.

Arrangement of aerodynamic devices 100: All aerodynamic devices 100 were placed on the suction side of the airfoils with their grooves aligned parallel to the chordwise direction (see FIGS. 3A-3T). Thirteen airfoils (airfoils #1-#13) comprise a single row of aerodynamic devices 100 placed at different distances, d/L, along the chord (d denoting the distance from the leading edge to the front of the row of aerodynamic devices 100—see FIG. 13A) and with a spanwise separation b varying between 0 mm and 3 mm (see FIG. 13B and Table 1 for details). The remaining seven airfoils (airfoils #14-#20) comprise multiple rows of aerodynamic devices 100, arranged either according to a linear pattern (see FIG. 13C) or a staggered pattern (see FIG. 13D). Note that for these airfoils the geometric parameter d as specified in Table 1 indicates the distance from the leading edge of the airfoil to the front of the first row of aerodynamic devices 100. Moreover, in Table 1 "closely packed" refers to aerodynamic devices 100 spaced as closely as possible without physically touching, as shown in FIG. 13D.

Table 1 sets forth geometric parameters characterizing the 20 different airfoils with aerodynamic devices 100 that were considered. Images of all 20 airfoils are shown in FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, and FIG. 3T.

Figure 14:
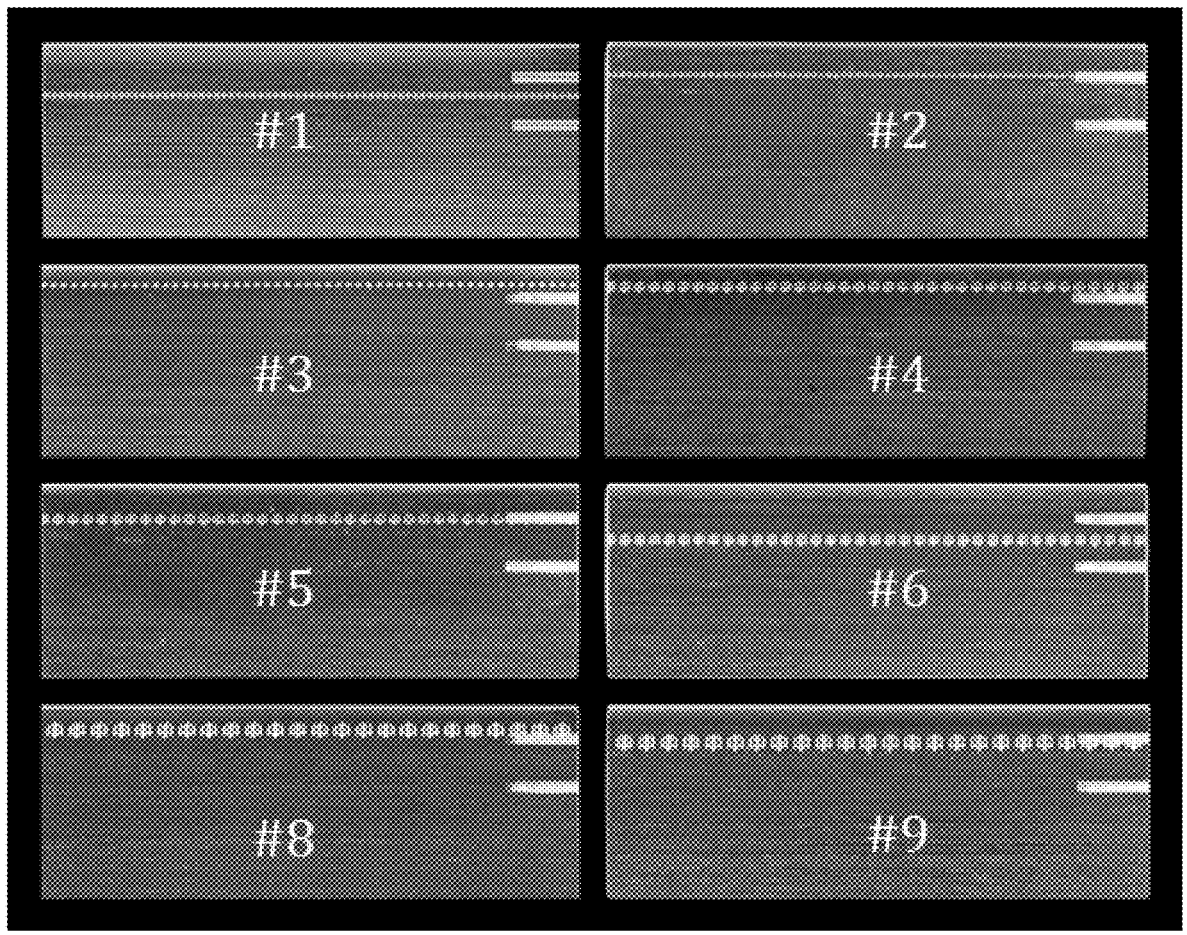
FIG. 14 depicts airfoils #-#9 of FIGS. 3A-3I with aerodynamic devices arranged in a single row with different chordwise position and size, according to embodiments of the present disclosure.
Figure 15A:
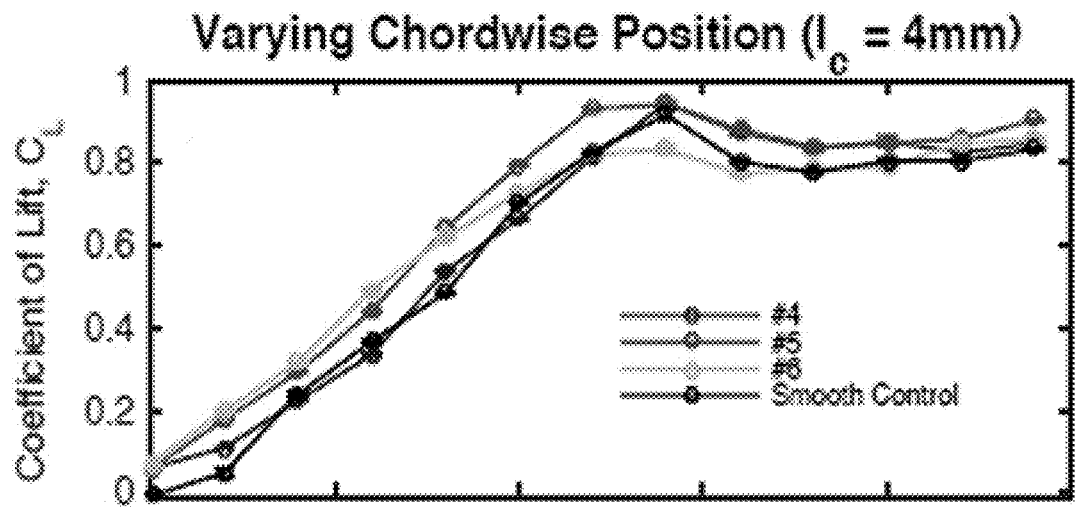
FIG. 15A, FIG. 15B, and FIG. 15C depict experimental results of lift coefficient, drag coefficient, and lift-to-drag ratio as a function of angle of attack for airfoils #4, #5, and #6, compared with experimental results for a smooth control airfoil, according to embodiments of the present disclosure.
Figure 15B:
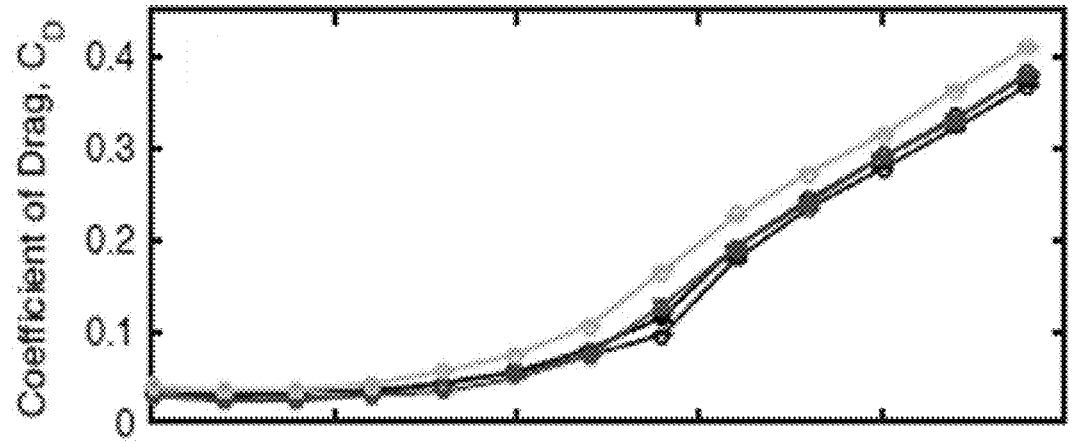
Figure 15C:
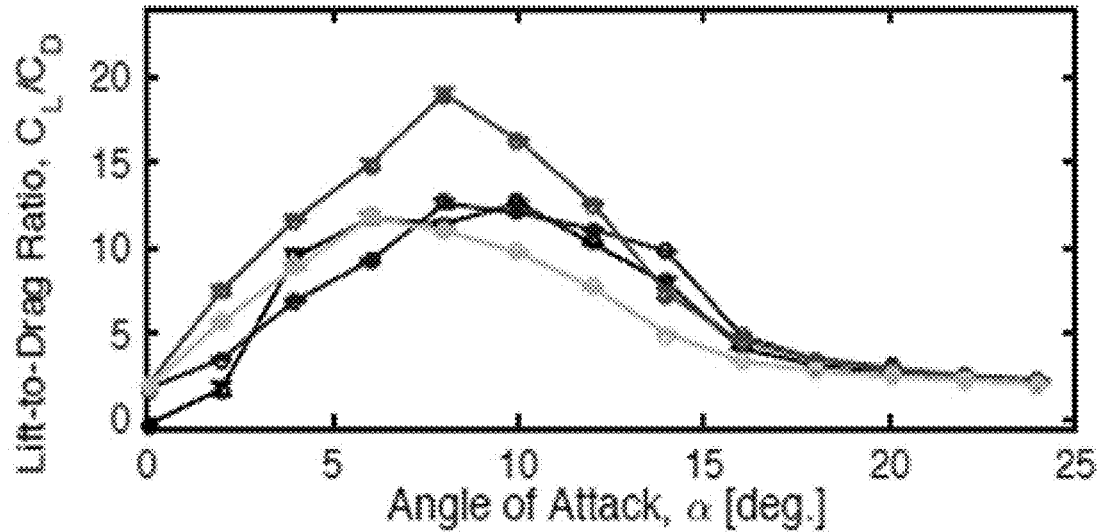
Figure 16A:
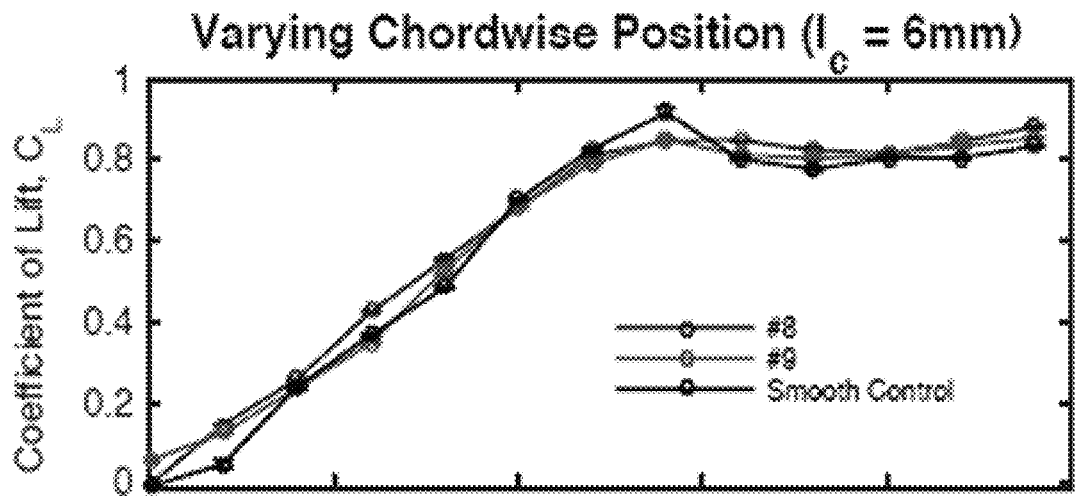
FIG. 16A, FIG. 16B, and FIG. 16C depict experimental results of lift coefficient, drag coefficient, and lift-to-drag ratio as a function of angle of attack for airfoils #9 and #10, compared with experimental results for a smooth control airfoil, according to embodiments of the present disclosure.
Figure 16B:
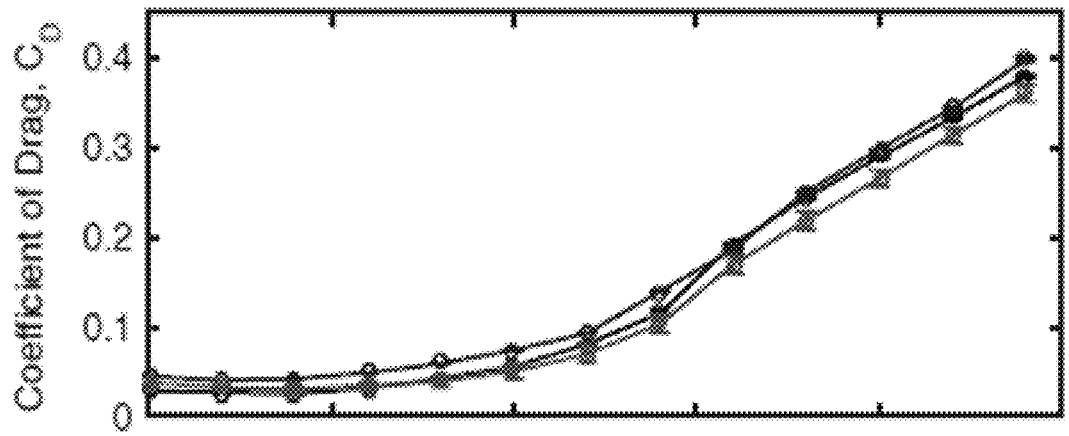
Figure 16C:
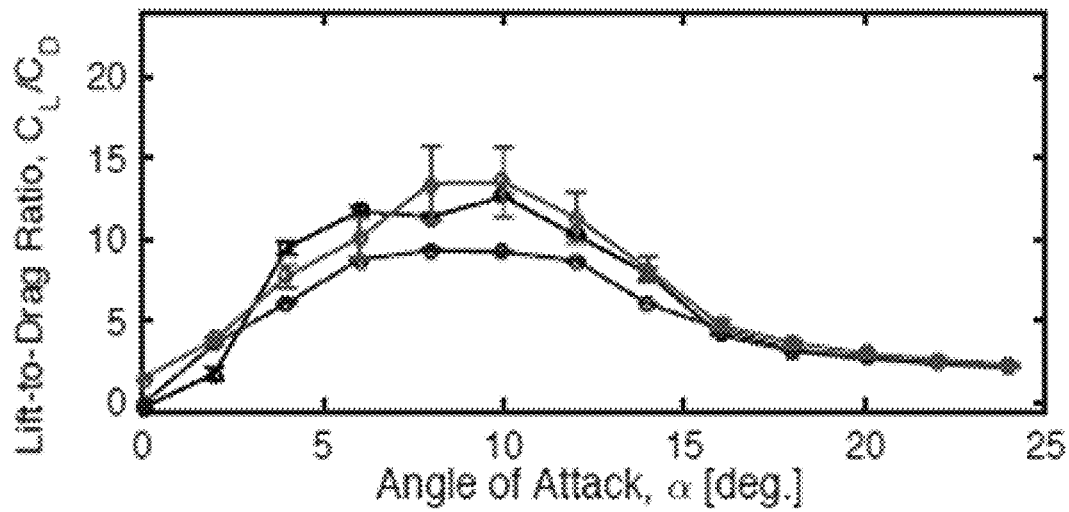
Figure 17A:
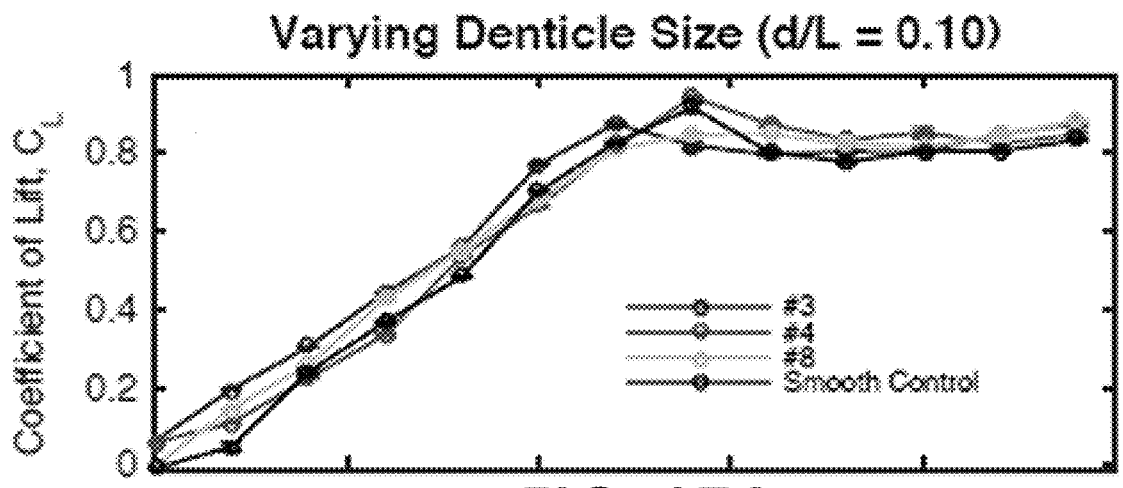
FIG. 17A, FIG. 17B, and FIG. 17C depict experimental results of lift coefficient, drag coefficient, and lift-to-drag ratio as a function of angle of attack for airfoils #3, #4, and #8, compared with experimental results for a smooth control airfoil, according to embodiments of the present disclosure.
Figure 17B:
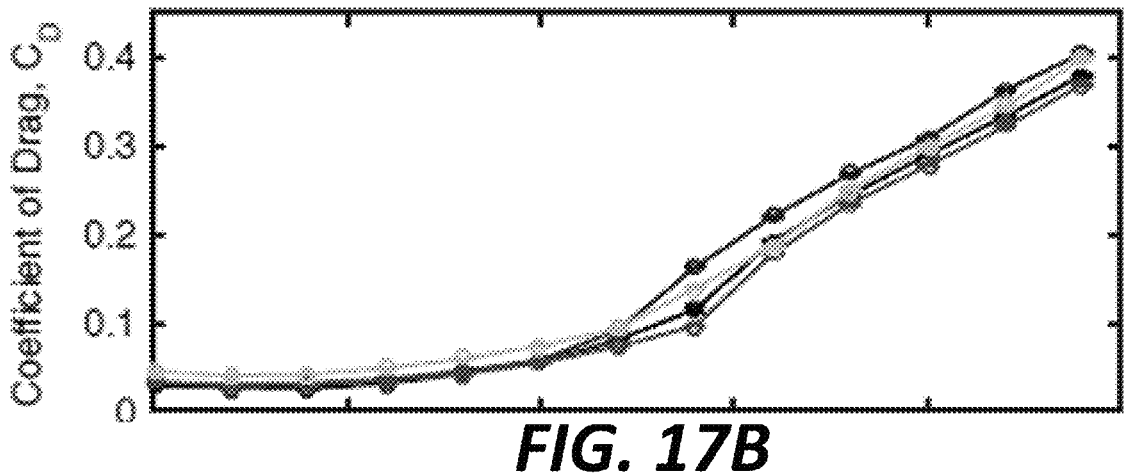
Figure 17C:
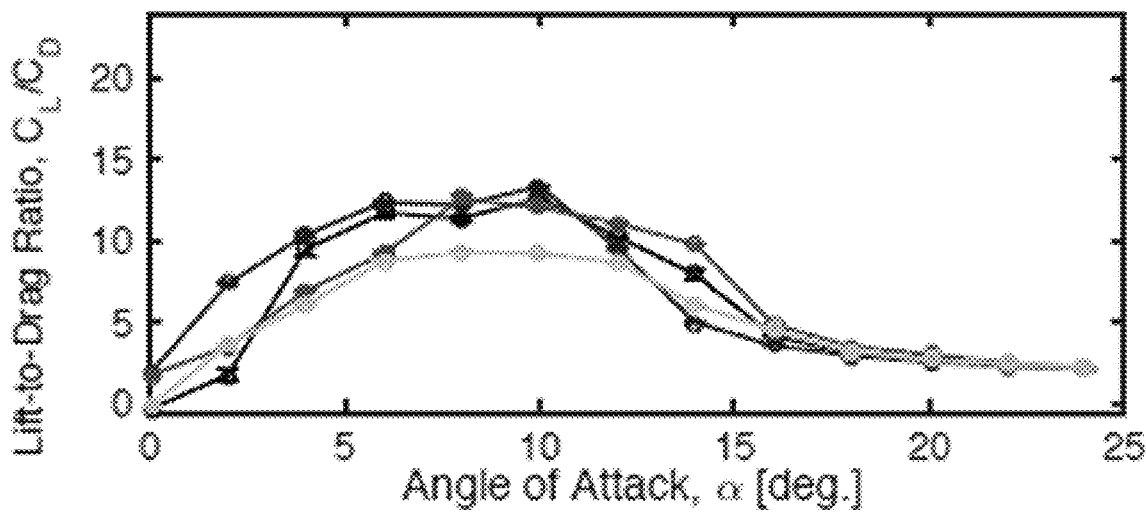
Figure 18A:
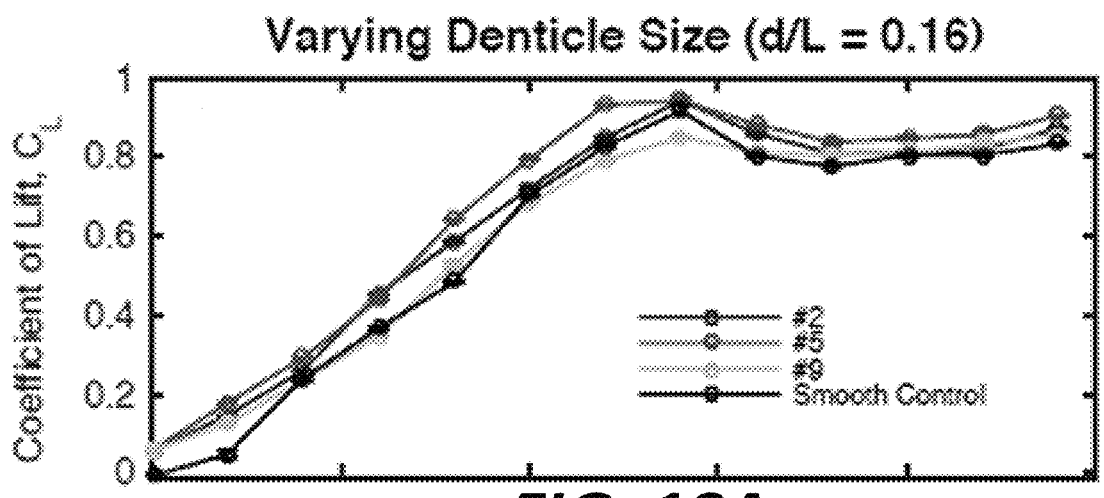
FIG. 18A, FIG. 18B, and FIG. 18C depict experimental results of lift coefficient, drag coefficient, and lift-to-drag ratio as a function of angle of attack for airfoils #2, #5, and #9, compared with experimental results for a smooth control airfoil, according to embodiments of the present disclosure.
Figure 18B:
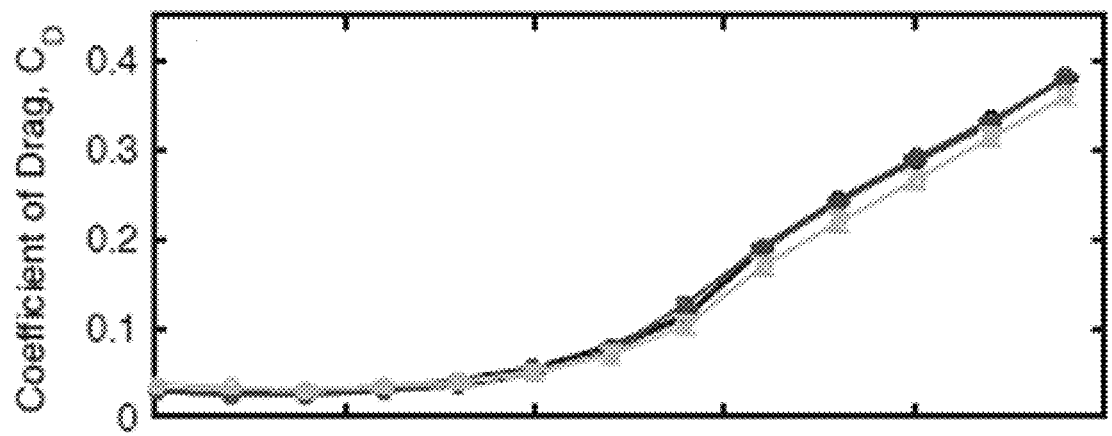
Figure 18C:
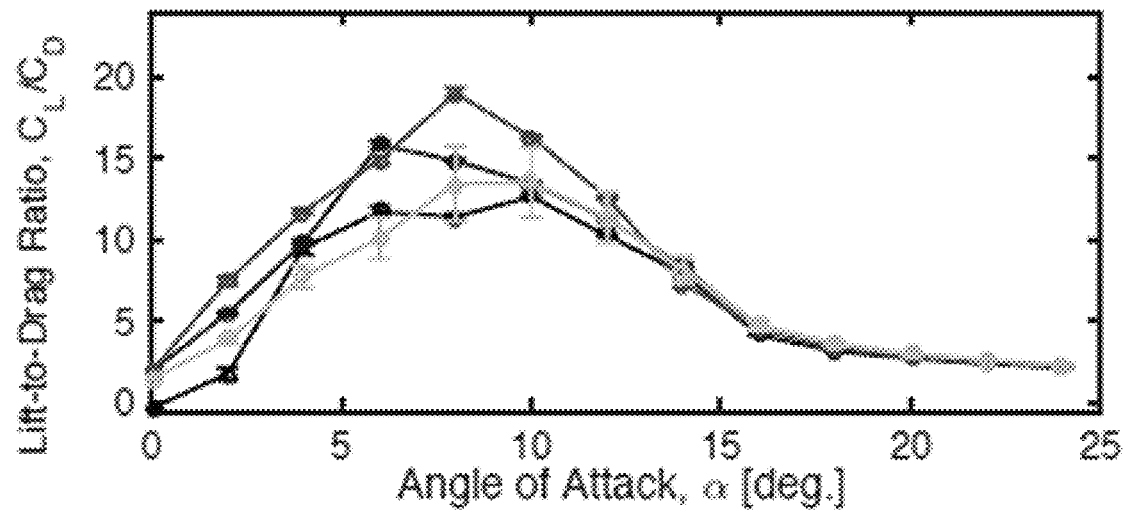
Figure 19A:
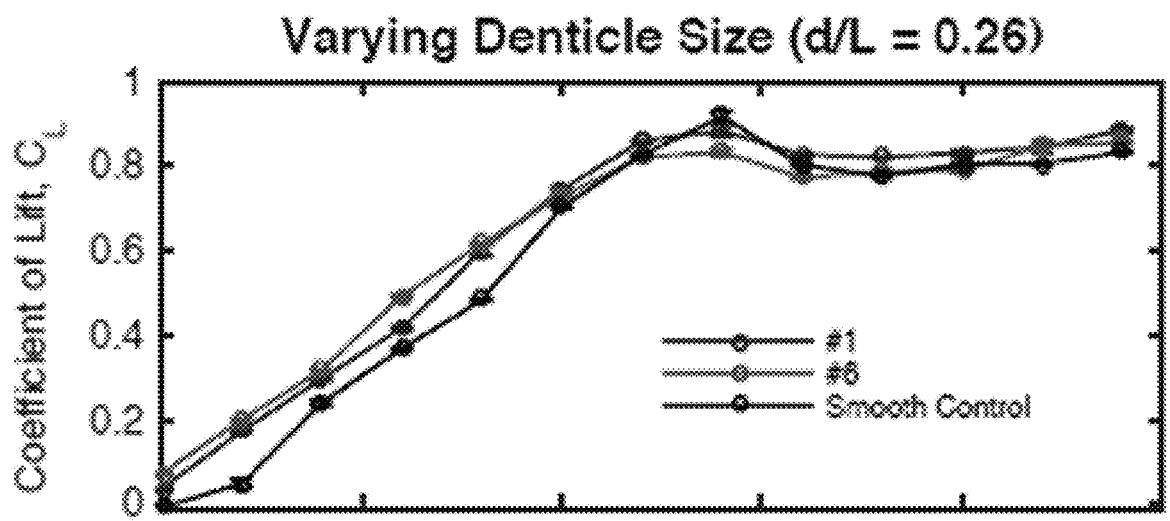
FIG. 19A, FIG. 19B, and FIG. 19C depict experimental results of lift coefficient, drag coefficient, and lift-to-drag ratio as a function of angle of attack for airfoils #1 and #6, compared with experimental results for a smooth control airfoil, according to embodiments of the present disclosure.
Figure 19B:
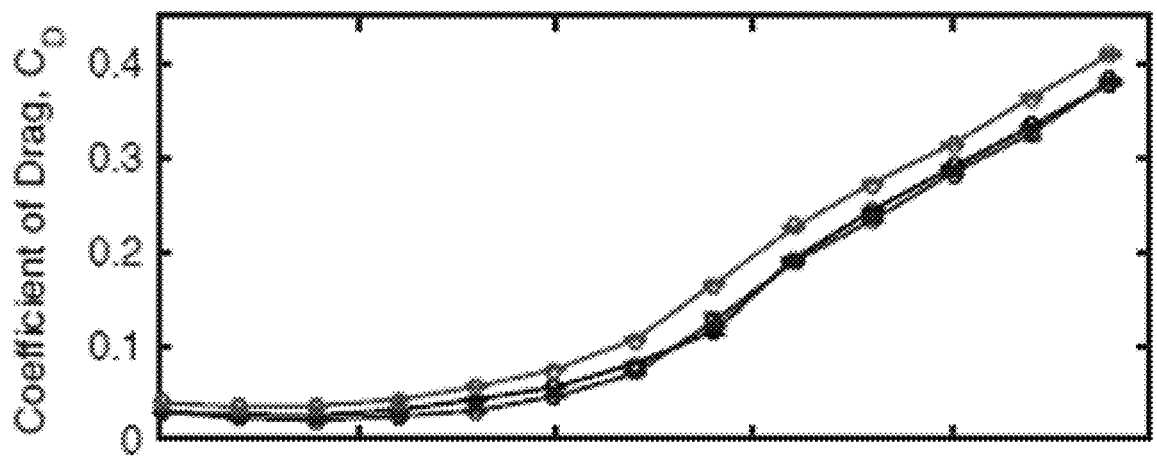
Figure 19C:
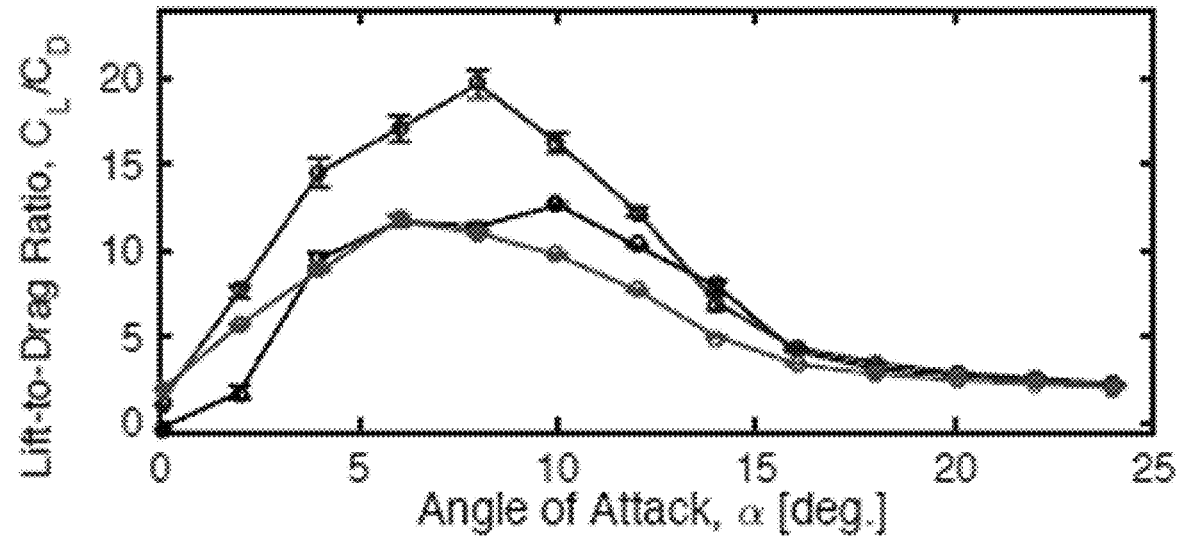

As shown in FIG. 14, airfoils #1-6, #8-9 feature various arrangements of aerodynamic devices 100 of different sizes and at different chordwise positions. Experimental aerodynamic performance data for each of these airfoils can be found in FIG. 15A, FIG. 15B, FIG. 15C, FIG. 16A, FIG. 16B, FIG. 16C, FIG. 17A, FIG. 17B, FIG. 17C, FIG. 18A, FIG. 18B, FIG. 18C, FIG. 19A, FIG. 19B, and FIG. 19C. As shown in FIG. 15A, FIG. 15B, and FIG. 15C, airfoil #5 appeared to demonstrate the best L/D at high angles of attack, with values about on par with those of airfoil #1 shown in FIG. 19A, FIG. 19B, and FIG. 19C. While the relationship between size and performance is complicated, in various embodiments, those airfoils with aerodynamic devices roughly the height of the boundary layer appeared to perform best in terms of L/D.

Figure 20:
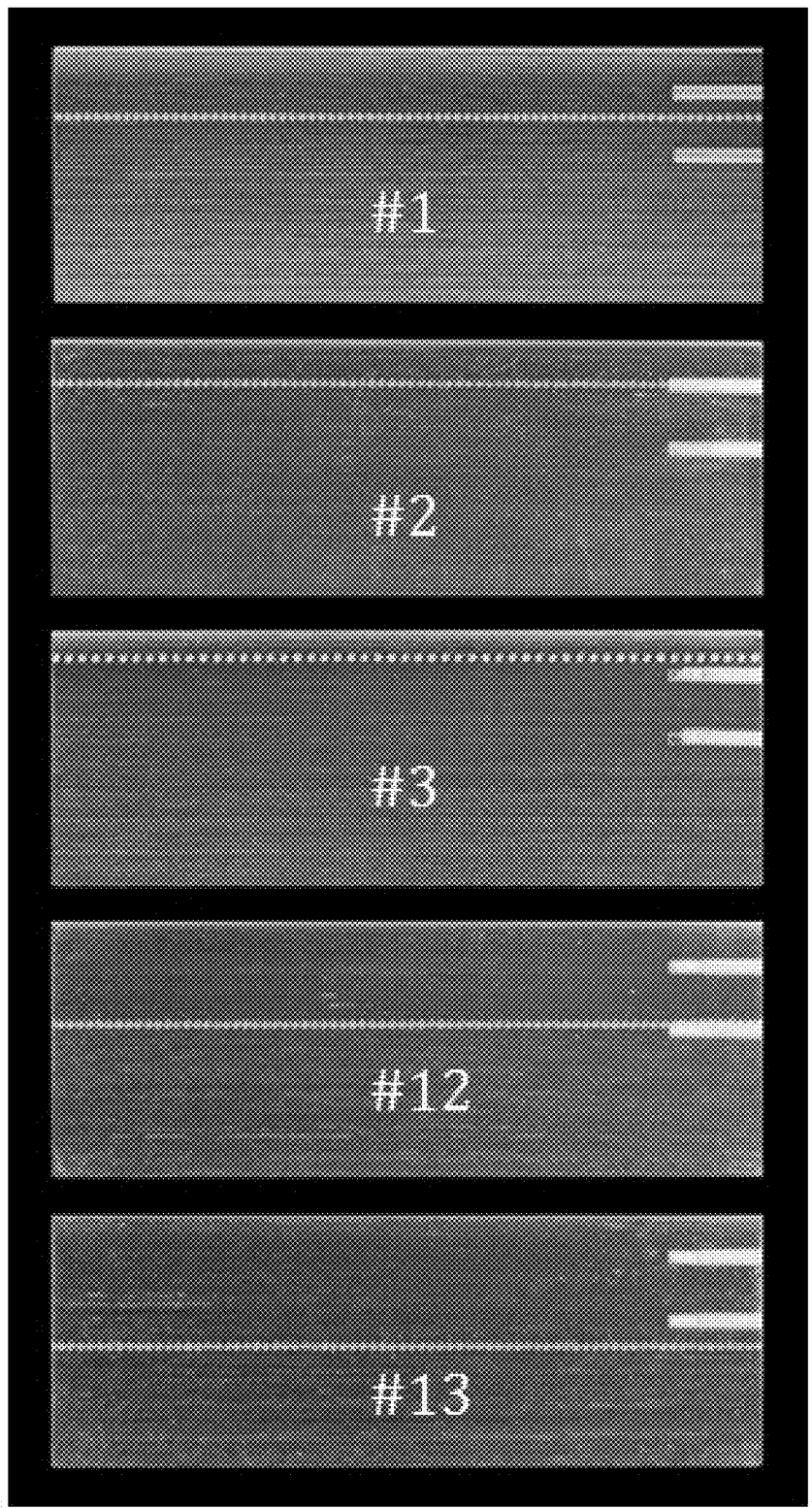
FIG. 20 depicts airfoils #1, #2, #3, #12, and #13 of FIG. 3A, FIG. 3B, FIG. 3C, FIG. 3L, and FIG. 3M, respectively, with aerodynamic devices arranged in a single row with $l_c$=2 mm and different chordwise positions, according to embodiments of the present disclosure.
Figure 21A:
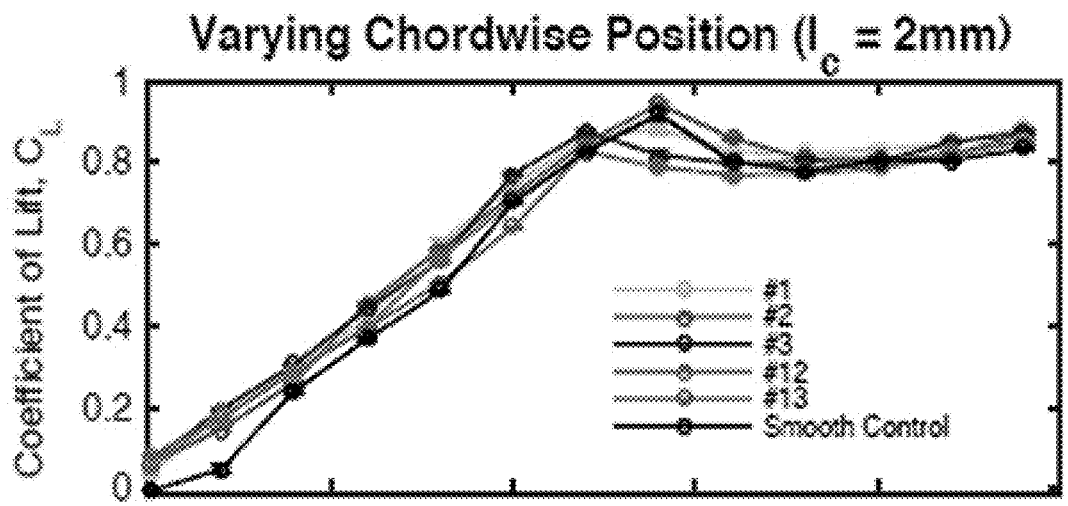
FIG. 21A, FIG. 21B, and FIG. 21C depict experimental results of lift coefficient, drag coefficient, and lift-to-drag ratio as a function of angle of attack for airfoils #1, #2, #3, #12, and #13, compared with experimental results for a smooth control airfoil, according to embodiments of the present disclosure.
Figure 21B:
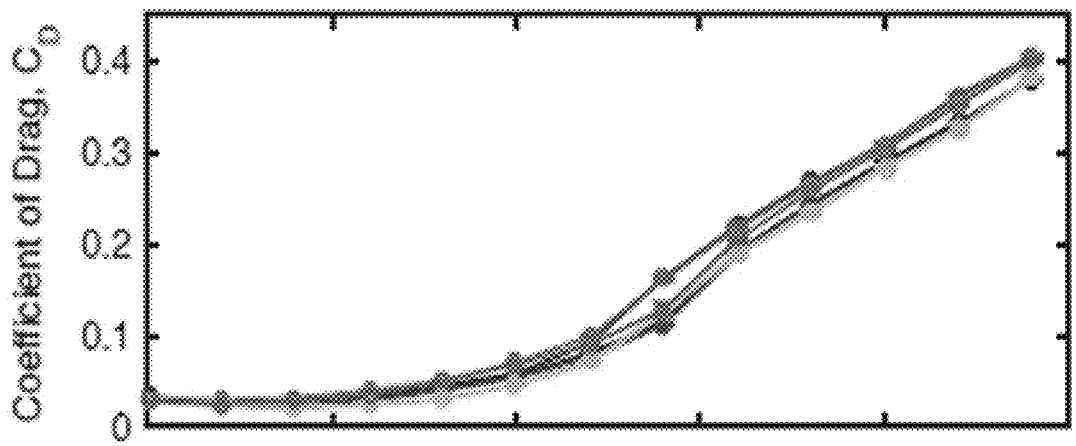
Figure 21C:
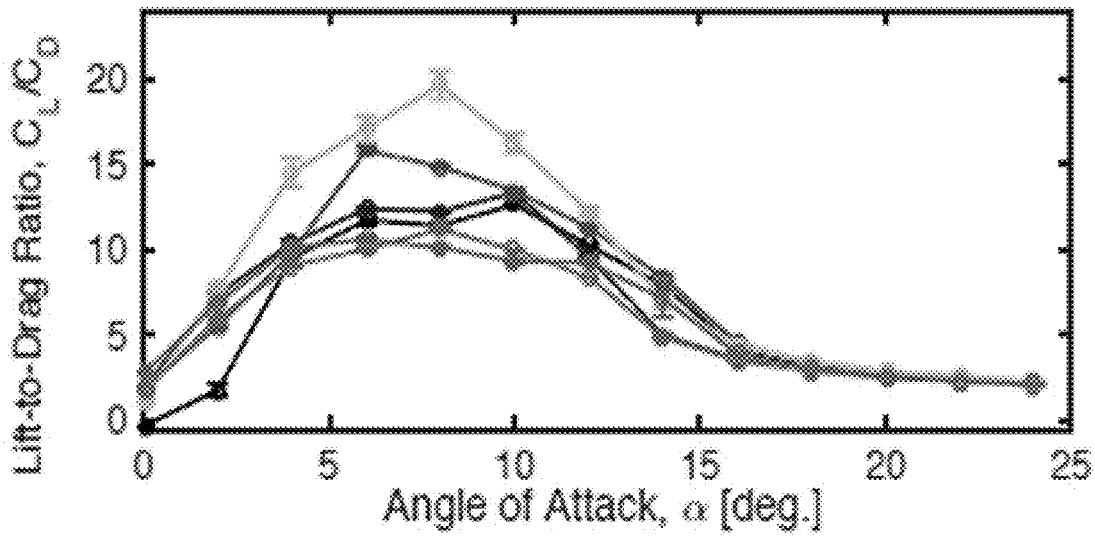

Moving on to FIG. 20, airfoils #1-3, #12-13 feature aerodynamic devices 100 with fixed $l_c$=2 mm arranged at different chordwise positions. Experimental aerodynamic performance data for each of these airfoils can be found in FIG. 21A, FIG. 21B, and FIG. 21C. As shown in FIG. 21A, airfoil #2 and airfoil #3 appeared to delay stall the longest and also feature the best L/D (aside from, airfoil #1) within this group. Notably though, L/D peaked relatively early for airfoil #2. Generally speaking, the results show that, all other things the same, the best chordwise position of aerodynamic device 100 is around quarter chord on the symmetric NACA 0012 airfoil used in the tests, which corresponds with the peak pressure location of a NACA 0012 airfoil. Of course, the best chordwise position for aerodynamic device 100 may vary depending on the cross-sectional shape of the airfoil used, and one of ordinary skill in the art will recognize such a chordwise location without undue experimentation based on the teachings of the present disclosure. In various embodiments, it may be preferable to position aerodynamic device 100 at or near the location of peak pressure for the given airfoil being used.

Figure 22:
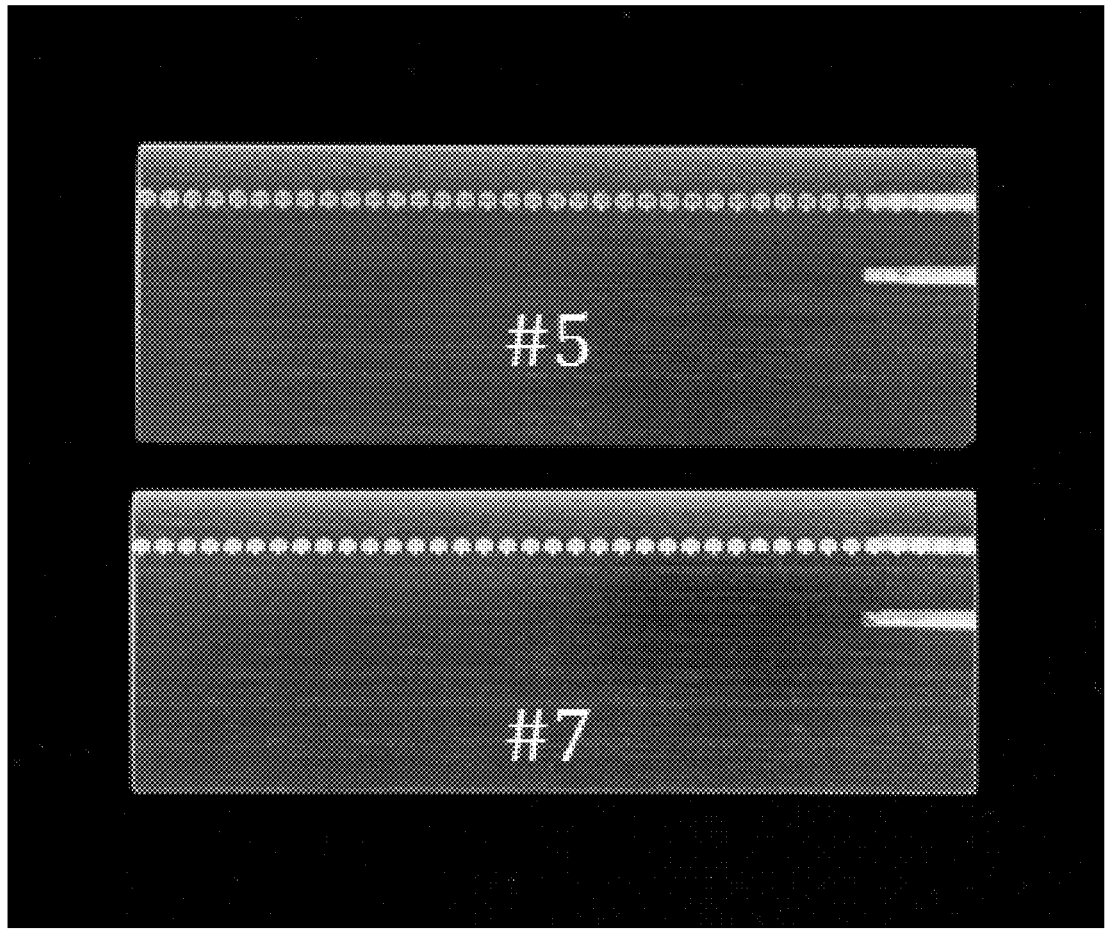
FIG. 22 depicts airfoils #5 and #7 of FIG. 3E and FIG. 3G, respectively, with aerodynamic devices arranged in a single row with $l_c$=4 mm and different tilt angles, according to embodiments of the present disclosure.
Figure 23A:
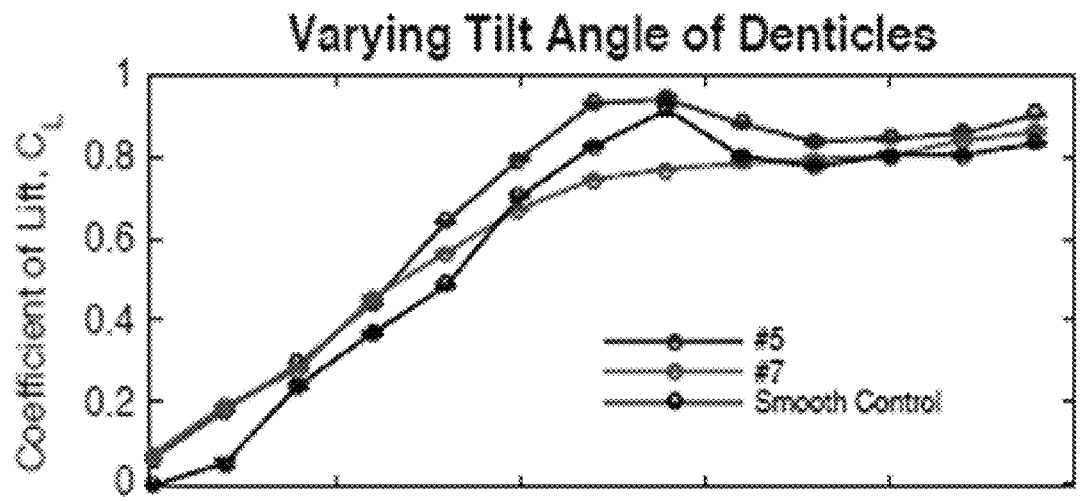
FIG. 23A, FIG. 23B, and FIG. 23C depict experimental results of lift coefficient, drag coefficient, and lift-to-drag ratio as a function of angle of attack for airfoils #5 and #7, compared with experimental results for a smooth control airfoil, according to embodiments of the present disclosure.
Figure 23B:
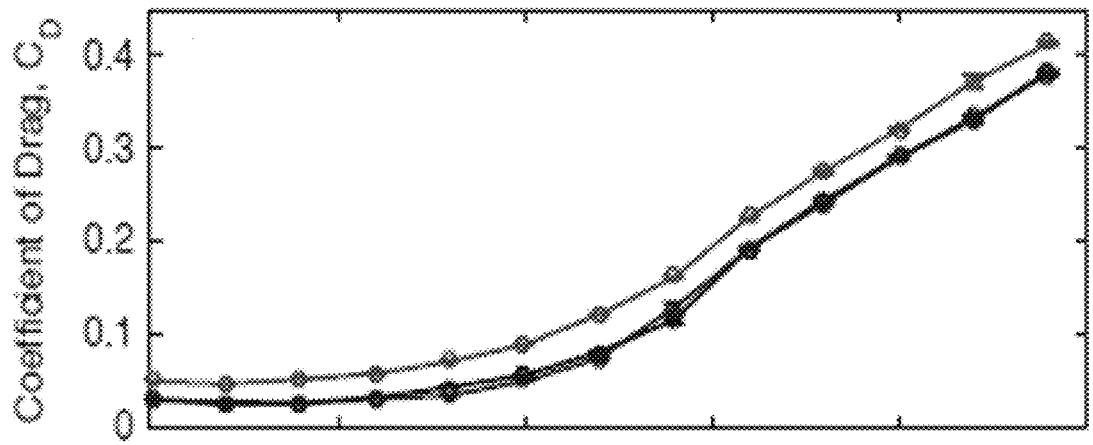
Figure 23C:
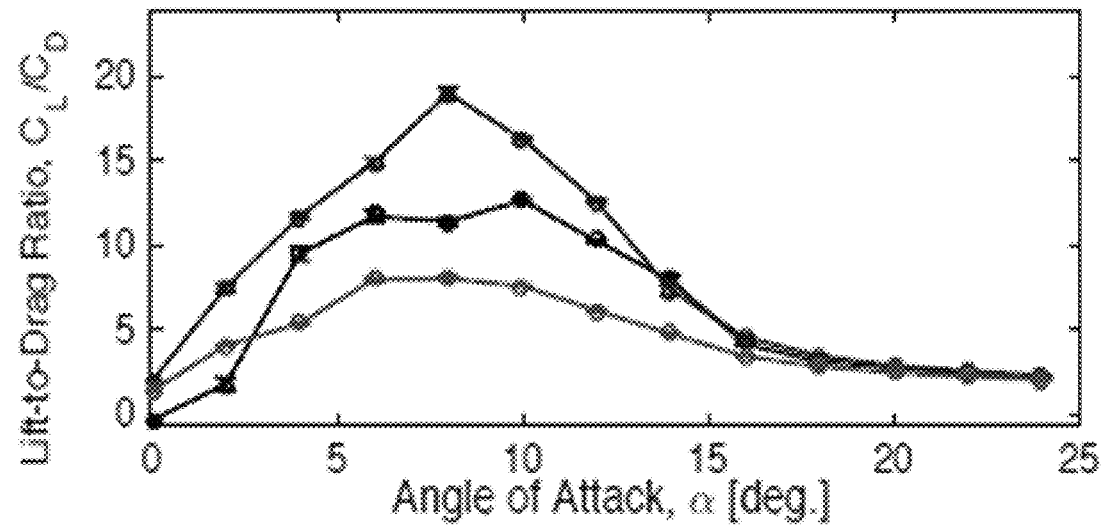

Looking now at FIG. 22, airfoils #5 and #7 feature aerodynamic devices with fixed $l_c$=4 mm arranged at different tilt angles. Experimental aerodynamic performance data for each of these airfoils can be found in FIG. 23A, FIG. 23B, and FIG. 23C. As shown, airfoil #5 (15 degree tilt) appears to demonstrate far better performance at all angles

TABLE 1

| Airfoil # | Pattern | # of Rows | Chordwise Separation, a [mm] | Spanwise Separation, b [mm] | Location along Chord, | Size, $l_c$ [mm] | Tilt Angle, θ |
|---|---|---|---|---|---|---|---|
| 1 | linear | 1 | n/a | 1 | 0.26 | 2 | 15 |
| 2 | linear | 1 | n/a | 1 | 0.16 | 2 | 15 |
| 3 | linear | 1 | n/a | 2 | 0.10 | 2 | 15 |
| 4 | linear | 1 | n/a | 2 | 0.10 | 4 | 15 |
| 5 | linear | 1 | n/a | 2 | 0.16 | 4 | 15 |
| 6 | linear | 1 | n/a | 2 | 0.26 | 4 | 15 |
| 7 | linear | 1 | n/a | 2 | 0.16 | 4 | 30 |
| 8 | linear | 1 | n/a | 3 | 0.10 | 6 | 15 |
| 9 | linear | 1 | n/a | 3 | 0.16 | 6 | 15 |
| 10 | linear | 1 | n/a | 0 | 0.26 | 2 | 15 |
| 11 | linear | 1 | n/a | 2 | 0.26 | 2 | 15 |
| 12 | linear | 1 | n/a | 1 | 0.38 | 2 | 15 |
| 13 | linear | 1 | n/a | 1 | 0.50 | 2 | 15 |
| 14 | staggered | 2 | closely packed | closely packed | 0.26 | 2 | 15 |
| 15 | linear | 2 | closely packed | 1 | 0.26 | 2 | 15 |
| 16 | linear | 2 | 1 | 1 | 0.26 | 2 | 15 |
| 17 | linear | 2 | 2 | 1 | 0.26 | 2 | 15 |
| 18 | linear | 4 | closely packed | 3 | 0.10 | 4 | 15 |
| 19 | staggered | 4 | closely packed | closely packed | 0.16 | 4 | 15 |
| 20 | linear | 26 | closely packed | 1 | 0.26 | 2 | 15 |

Referring now to FIGS. 14-31, we experimentally measured lift coefficient ($C_L$), drag coefficient ($C_D$), and lift-to-drag ratio ($C_L/C_D$) at various angles of attack for each of the 20 different airfoils featuring various arrangements of aerodynamic devices 100, grouped by the different parameters that were varied. In all plots each data point is based on at least six total tests, and standard error bars are included (error bars are sometimes small enough to be contained within the plotted symbol).

of attack than airfoil #7 (30 degrees tilt). Without wishing to be bound by theory, it may be possible that higher tilt angles create too much flow separation, and that lower tilt angles fail to either draw in higher energy flow to contain the separation bubble or fail to create a very high suction separation bubble itself. Accordingly, in various embodiments, aerodynamic device 100 may be oriented on airfoil surface 16 at about a 15 degree tilt angle. One of ordinary skill in the art will recognize suitable variations in preferred tilt angle without undue experimentation based on the teachings of the present disclosure.

Figure 24:
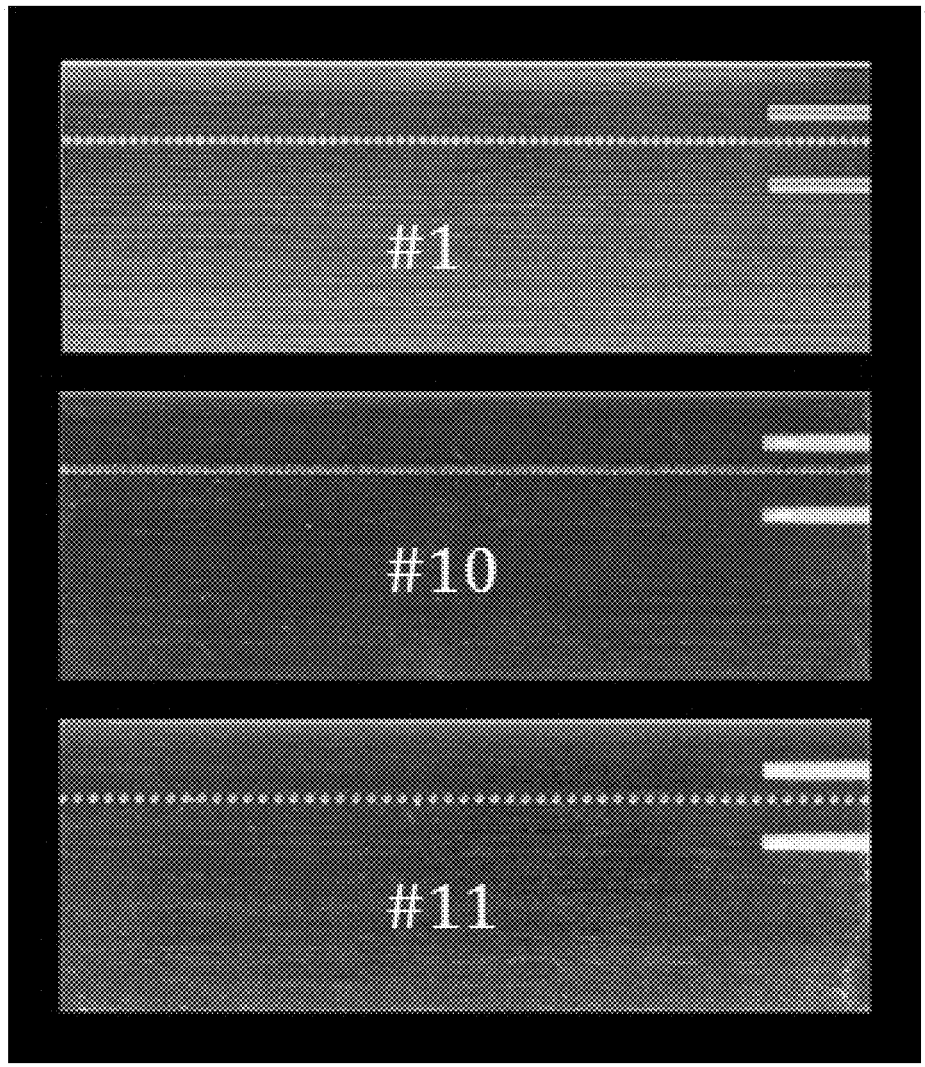
FIG. 24 depicts airfoils #1, #10, and #11 of FIG. 3A, FIG. 3J, and FIG. 3K, respectively, with aerodynamic devices arranged in a single row with $l_c$=2 mm placed at d/L=0.26 and with different spanwise, separations, according to embodiments of the present disclosure.
Figure 25A:
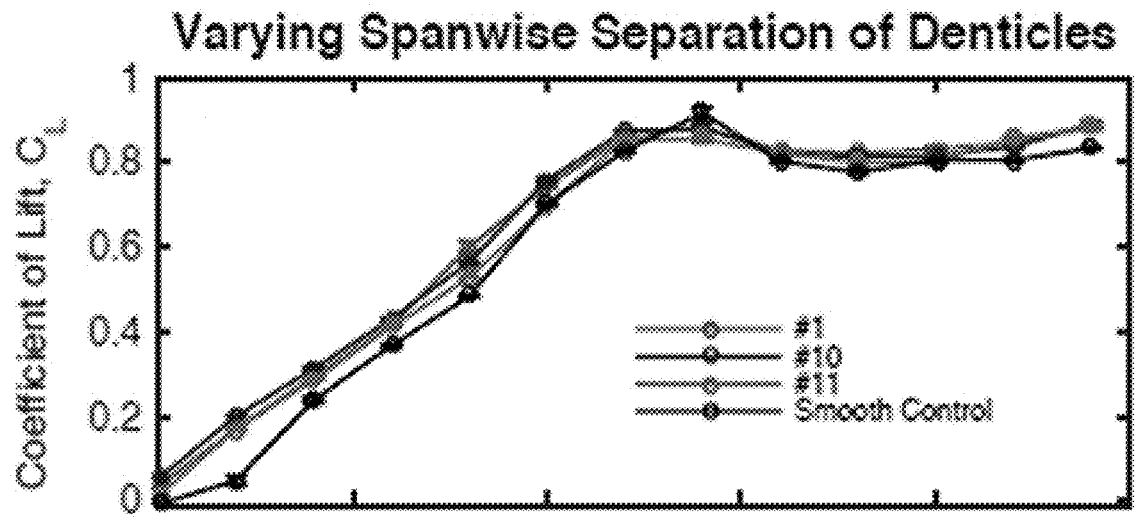
FIG. 25A, FIG. 25B, and FIG. 25C depict experimental results of lift coefficient, drag coefficient, and lift-to-drag ratio as a function of angle of attack for airfoils #1, #10, and #11, compared with experimental results for a smooth control airfoil, according to embodiments of the present disclosure.
Figure 25B:
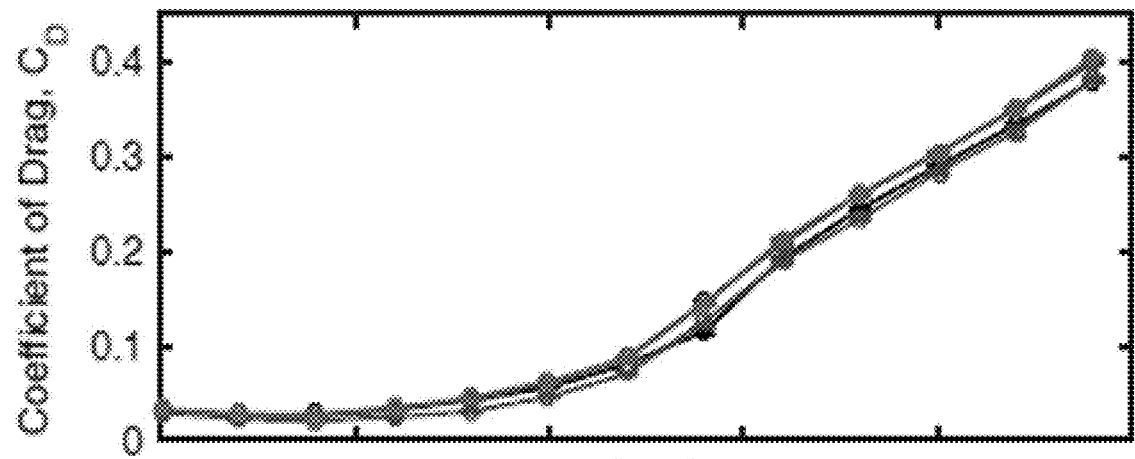
Figure 25C:
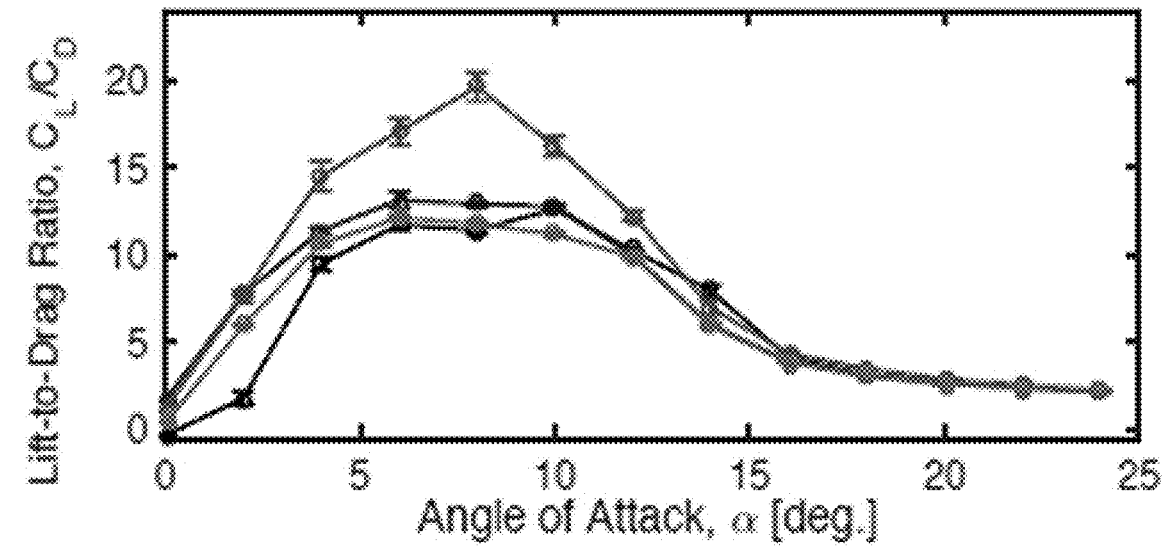

As shown in FIG. 24, airfoils #1, #10, and #11 each feature a single row of aerodynamic devices 100 with $l_c=2$ mm placed at d/L=0.26, but with different spanwise separations between each. Experimental aerodynamic performance data for each of these airfoils can be found in FIG. 25A, FIG. 25B, and FIG. 25C. Surprisingly, a spanwise separation of 1 mm (airfoil #1) yielded very significantly better results than spanwise separations of 0 mm (airfoil #10) or 2 mm (airfoil #11). Without wishing to be bound by theory, this is perhaps attributable to one or a combination of: (i) using 2 mm separation means fewer aerodynamic devices on the airfoil versus 1 mm, and thus lesser overall benefits; or (ii) for 1 mm spacing, interactions between vortices shed by adjacent aerodynamic devices somehow produce more advantageous performance benefits compared with any such interactions (or lack thereof) corresponding with 2 mm spacing.

Figure 26:
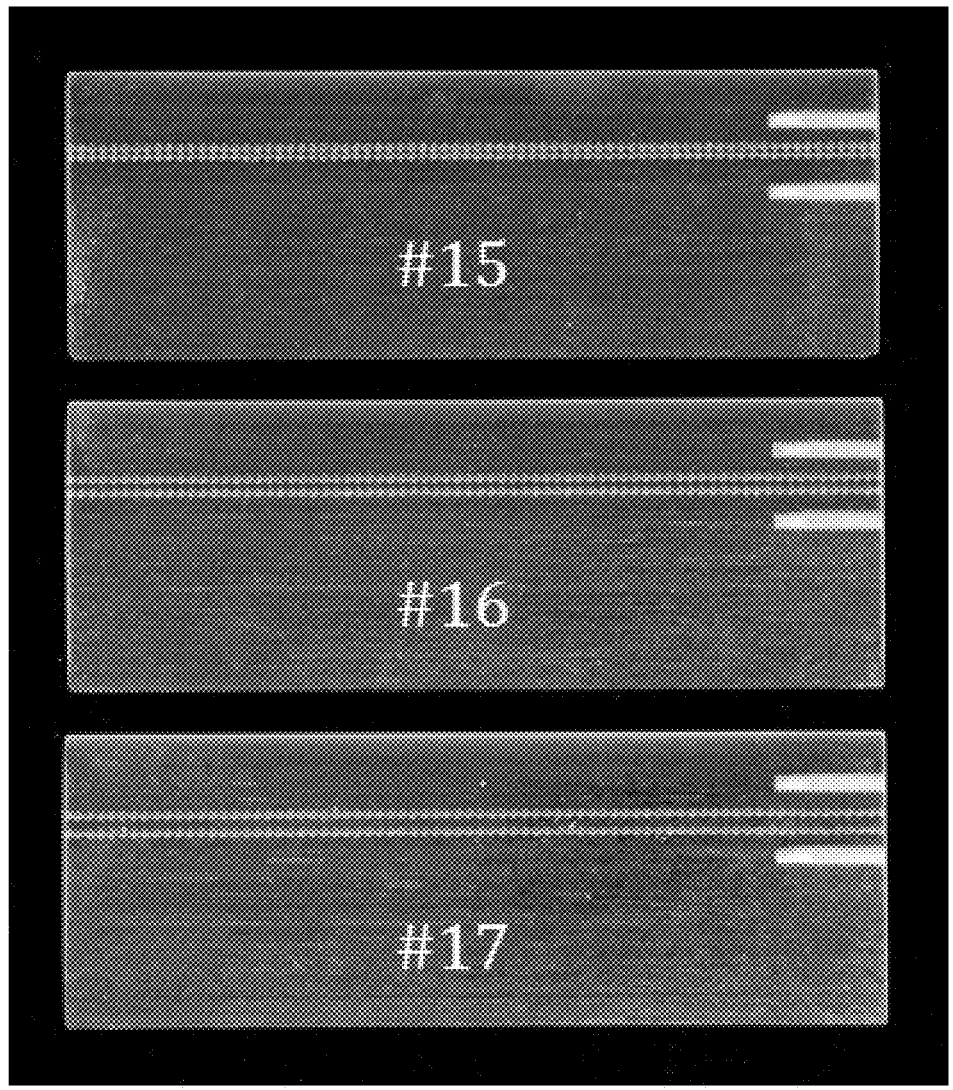
FIG. 26 depicts airfoils #15, #16, and #17 of FIG. 3O, FIG. 3P, and FIG. 3Q, respectively, with aerodynamic devices arranged in two rows with different chordwise separations, according to embodiments of the present disclosure.
Figure 27A:
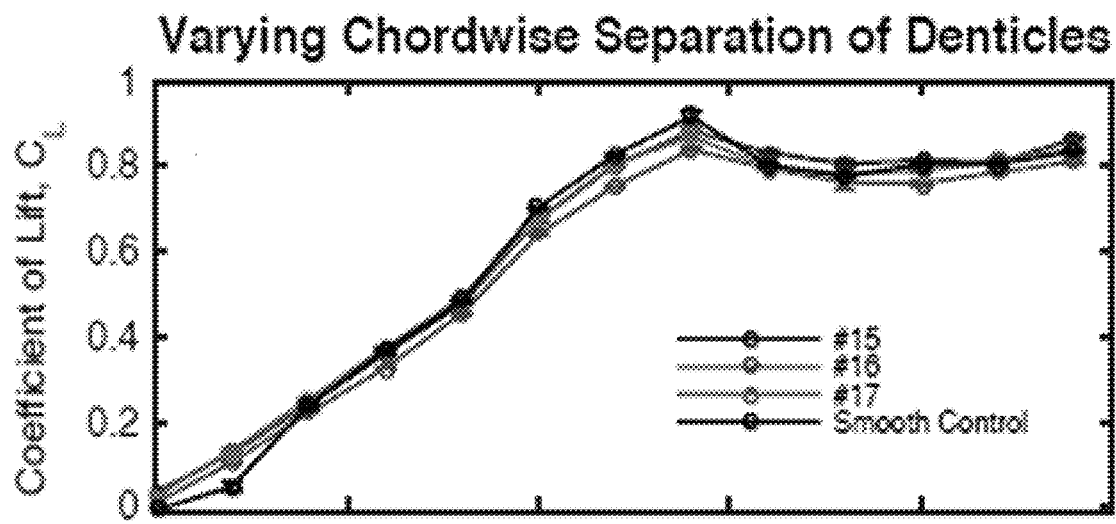
FIG. 27A, FIG. 27B, and FIG. 27C depict experimental results of lift coefficient, drag coefficient, and lift-to-drag ratio as a function of angle of attack for airfoils #15, #16, and #17, compared with experimental results for a smooth control airfoil, according to embodiments of the present disclosure.
Figure 27B:
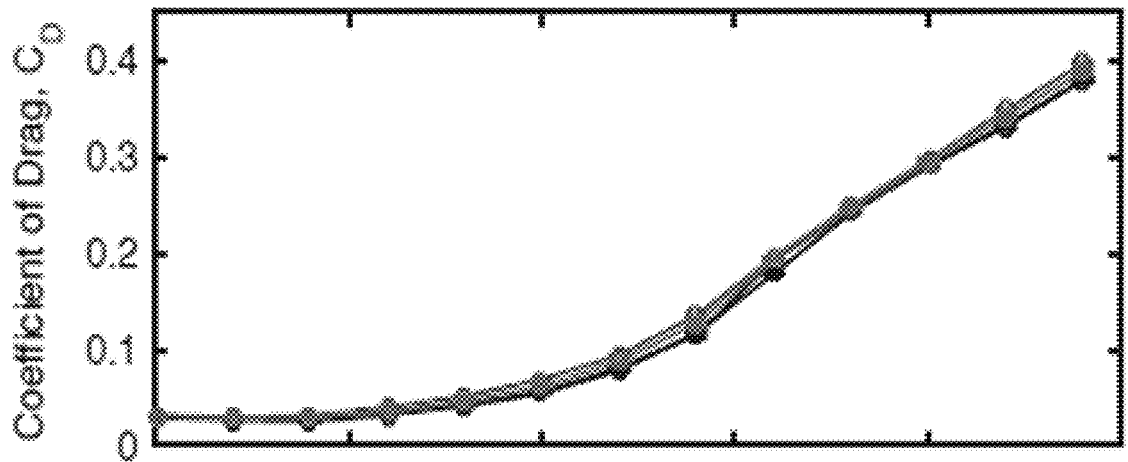
Figure 27C:
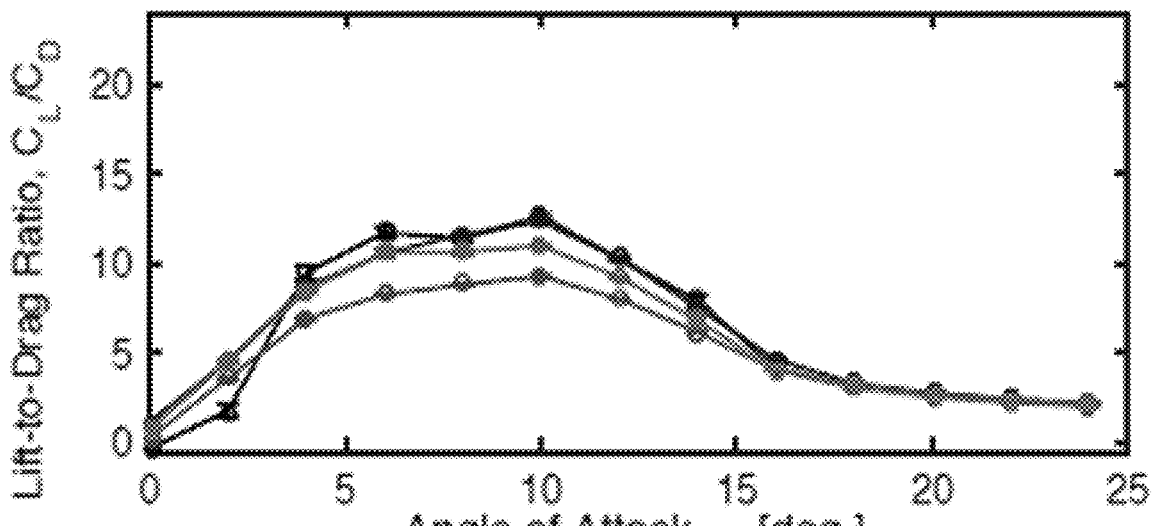

Moving on to FIG. 26, airfoils #15, #16, and #17 each feature two rows of aerodynamic devices 100 with $l_c=2$ mm placed at d/L=0.26, but with different chordwise separations between rows. Experimental aerodynamic performance data for each of these airfoils can be found in FIG. 27A, FIG. 27B, and FIG. 27C. Interesting, all three of these airfoils with two rows of aerodynamic devices 100 underperformed the smooth control airfoil, and thus even further underperformed airfoil #1 with one row.

Figure 28:
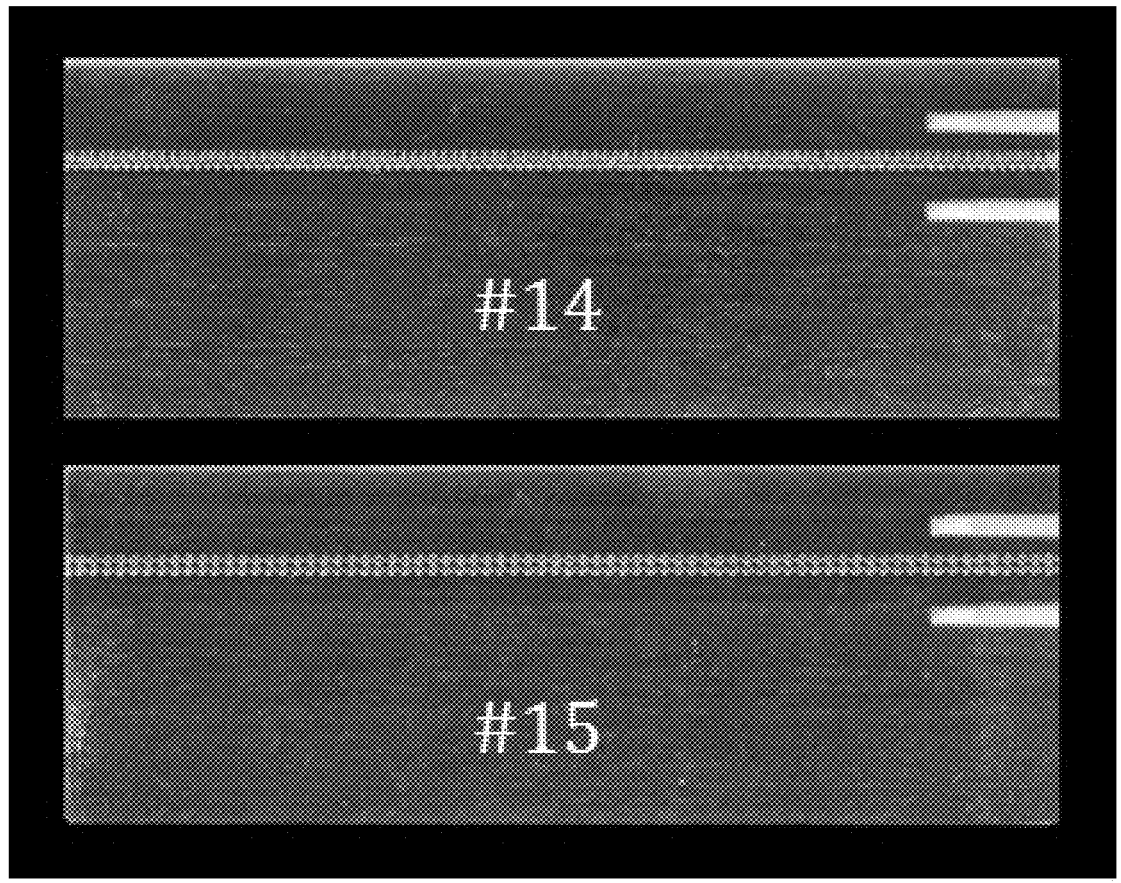
FIG. 28 depicts airfoils #14 and #15 of FIG. 3N and FIG. 3O, respectively, with aerodynamic devices arranged in two rows with staggered and linear patterns, respectively, according to embodiments of the present disclosure.
Figure 29A:
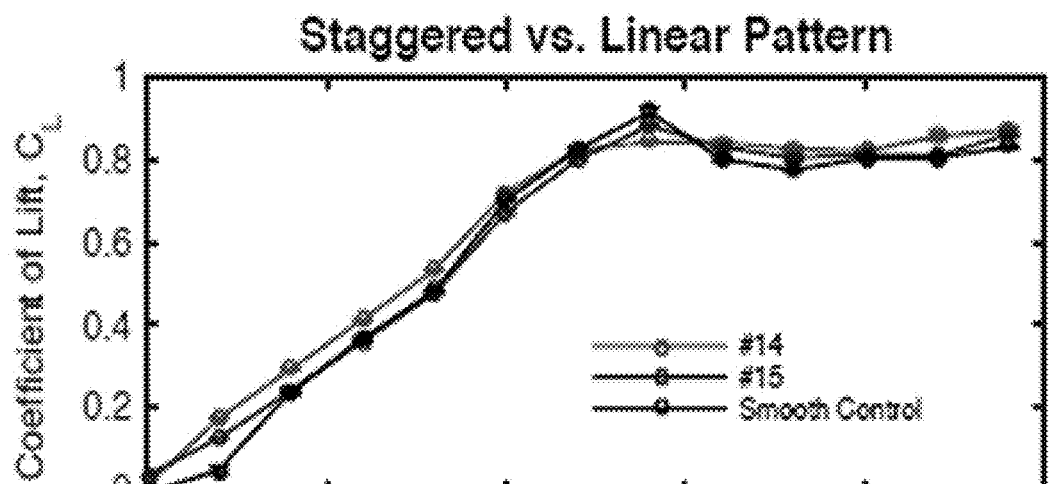
FIG. 29A, FIG. 29B, and FIG. 29C depict experimental results of lift coefficient, drag coefficient, and lift-to-drag ratio as a function of angle of attack for airfoils #14 and #15, compared with experimental results for a smooth control airfoil, according to embodiments of the present disclosure.
Figure 29B:
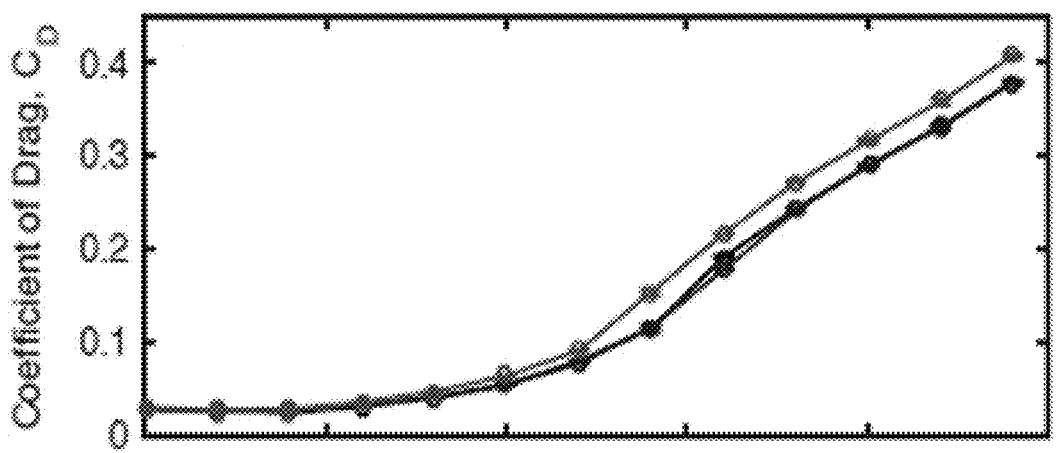
Figure 29C:
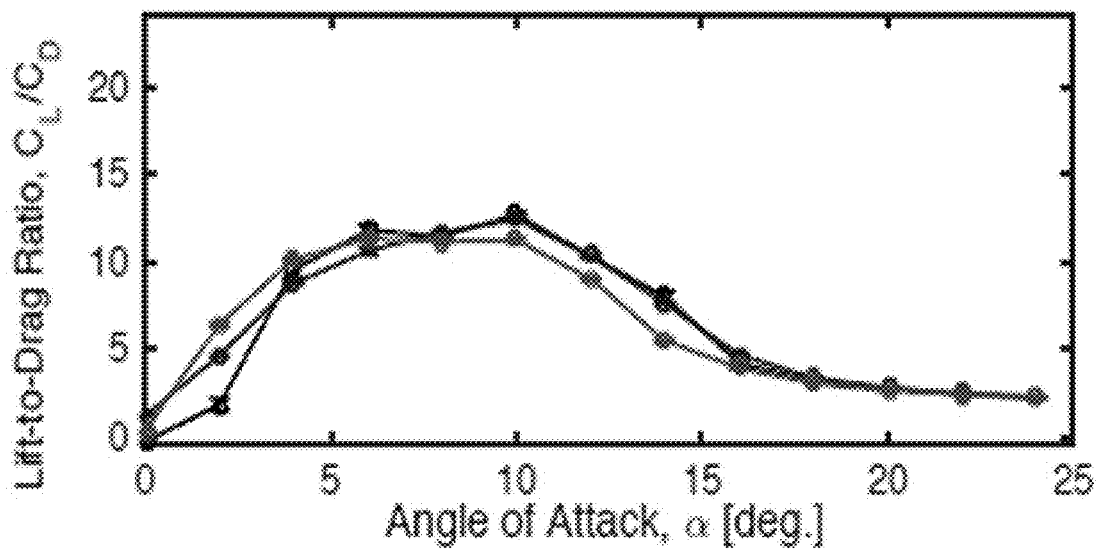

Looking now at FIG. 28, airfoils #14 and #15 each feature two rows of aerodynamic devices 100 with $l_c=2$ mm placed at d/L=0.26, but with different arrangements. In particular, on airfoil #14 the rows are staggered, whereas on airfoil #15 the rows are aligned. Experimental aerodynamic performance data for each of these airfoils can be found in FIG. 29A, FIG. 29B, and FIG. 29C. As shown, it appears airfoil #14 has a much higher drag coefficient than airfoil #15, and that both airfoil #14 and airfoil #15 both underperform the smooth control airfoil. Again, it seems that airfoils with multiple rows of aerodynamic devices 100 underperform airfoils with a single row of aerodynamic devices 100.

Figure 30:
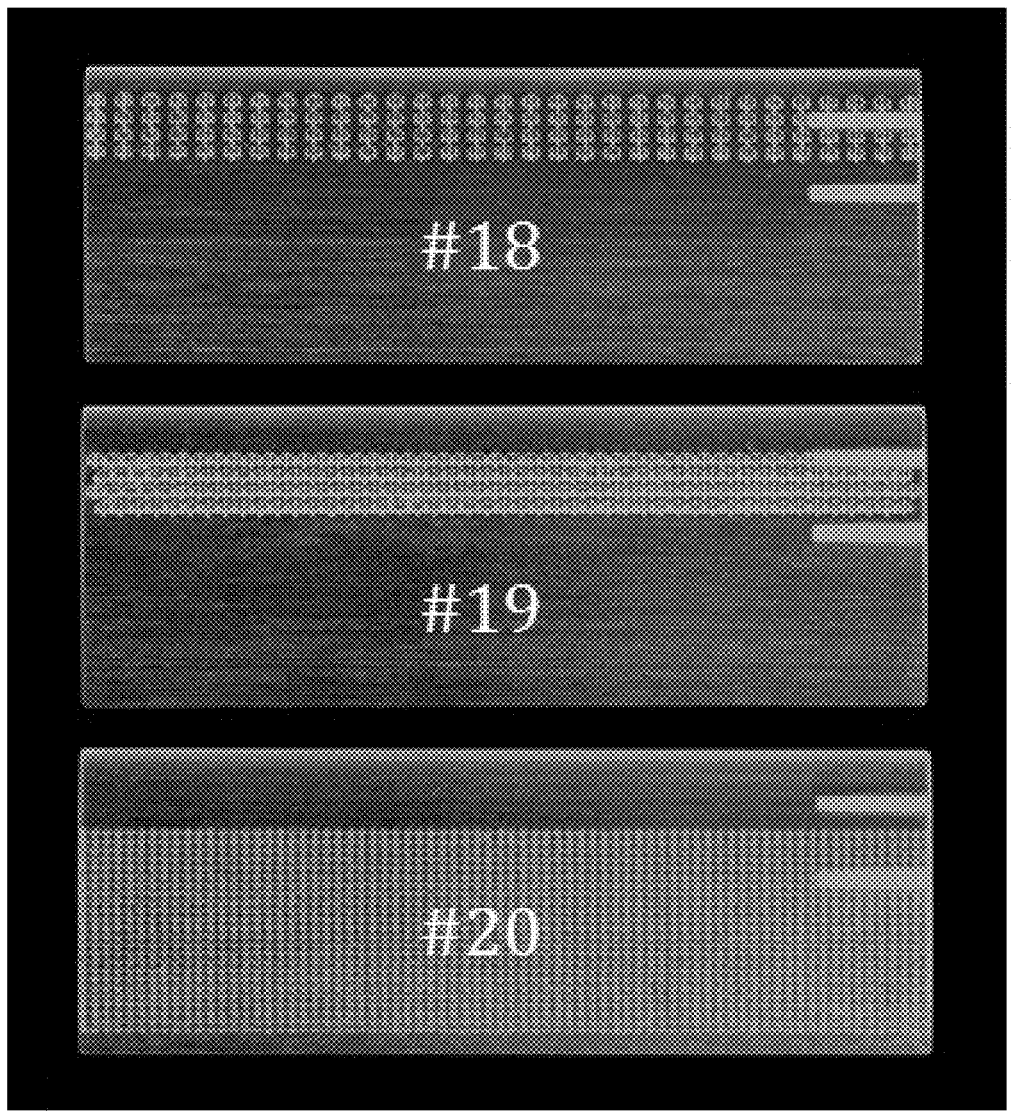
FIG. 30 depicts airfoils #18, #19, and #20 of FIG. 3R, FIG. 3S and FIG. 3T, respectively, with aerodynamic devices arranged in multiple rows, according to embodiments of the present disclosure.
Figure 31A:
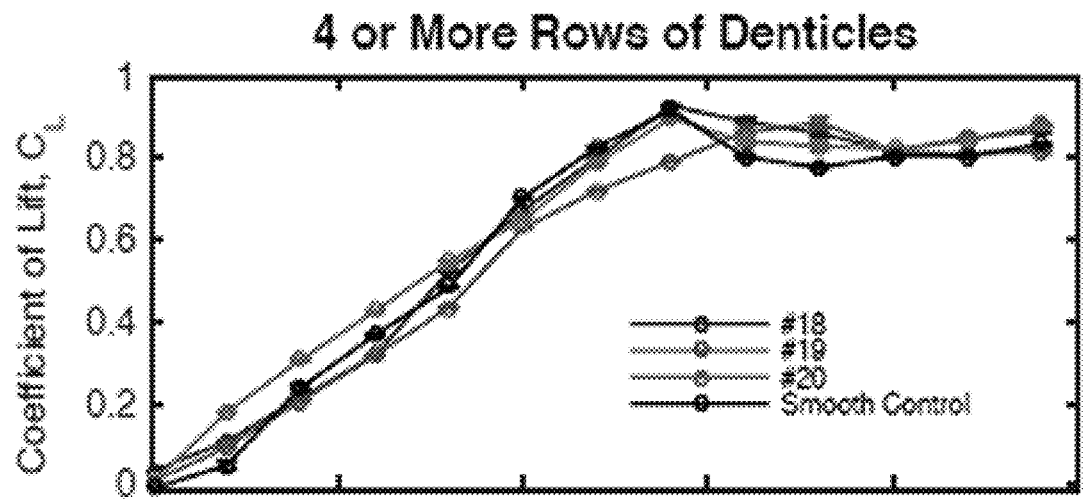
FIG. 31A, FIG. 31B, and FIG. 31C depict experimental results of lift coefficient, drag coefficient, and lift-to-drag ratio as a function of angle of attack for airfoils #18, #19, and #20, compared with experimental results for a smooth control airfoil, according to embodiments of the present disclosure.
Figure 31B:
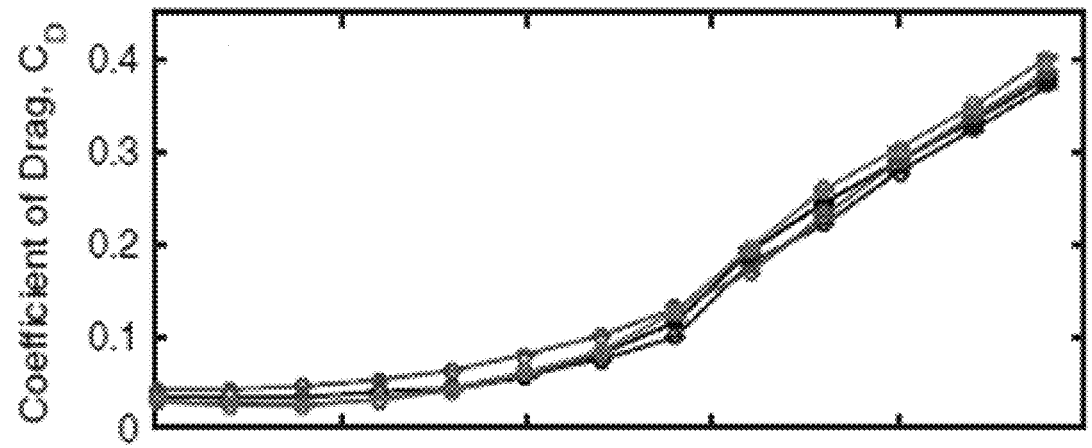
Figure 31C:
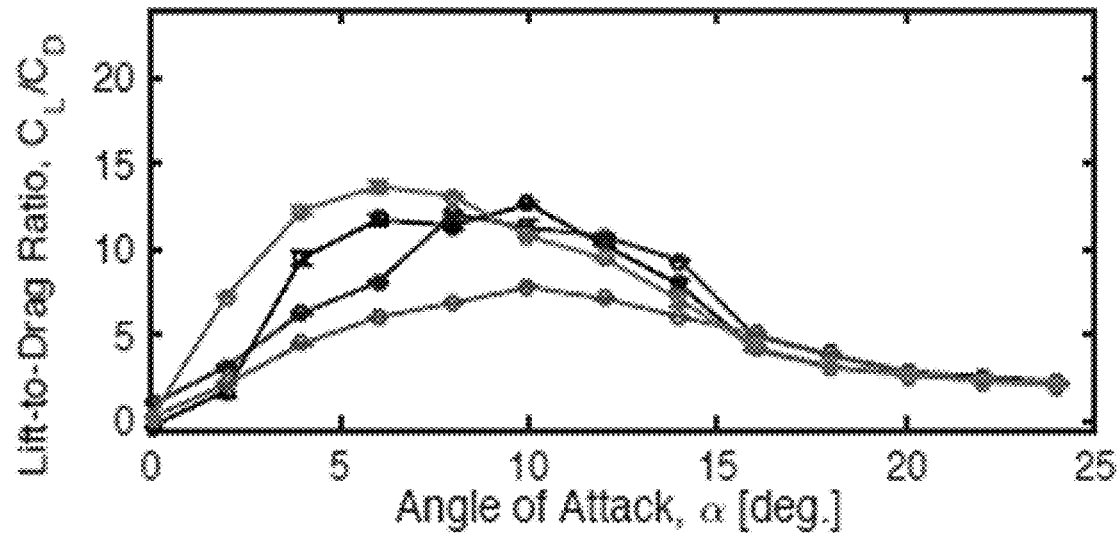

As shown in FIG. 30, airfoils #18, #1.9, and #20 each feature multiple rows of aerodynamic devices 100 with a variety of different parameters. Experimental aerodynamic performance data for each of these airfoils can be found in FIG. 31A, FIG. 31B, and FIG. 31C. Consistent with the preceding experimental results, it appears that adding more rows of aerodynamic devices 100, regardless of arrangement, does not necessarily further enhance performance compared with the preferred arrangement of airfoil #1 with a single row of aerodynamic devices 100.

Although airfoil #1 demonstrated the best aerodynamic performance improvements, these experimental data show that there are several other airfoils that also demonstrated significant improvements in aerodynamic performance.

Further Validation with CFD Analysis

We used the commercial computational fluid dynamic (CFD) package ANSYS® CFX, release 16.0 to carry out the calculations of flow over aerodynamic device 100 on a flat plate and the 2D bump airfoil. This code employs a hybrid finite-volume/finite-element approach to discretize the Navier Stokes equations. The equations are solved by an unsteady fully-implicit, fully-coupled multigrid solver in the inertial reference frame of the lab. The Shear Stress Transport (SST) turbulence model, which combines the k-w model near the wall and the k-e model away from the wall, is used throughout our CFD analysis. The choice of turbulence model allows for accurate prediction of onset and amount of flow separation under adverse pressure gradient conditions, and can handle the transition of the flow from laminar to turbulent. The airfoil is placed inside a rectangular fluid domain. An O-type structured mesh is refined around the airfoil and coarsened away from the airfoil. The physical normal distance of the first mesh node above the surface of the airfoil is kept fixed for all the cases. The maximum non-dimensional distance corresponding to the first node above the airfoil surface among all the cases is $y+\approx 0.3$ The dimensionless wall distance $y^+$ is defined as $y^+=u^*y/v$, where $u^*$, y, and u correspond to the nearest-wall friction velocity, normal distance away from the wall, and kinematic viscosity, respectively.

Figure 32A:
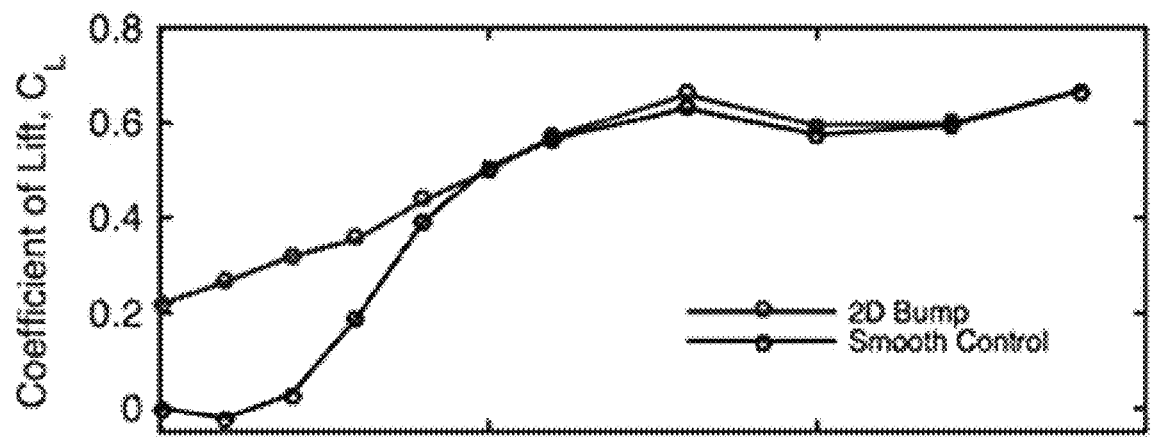
FIG. 32A, FIG. 32B, FIG. 32C, and FIG. 32D depict CFD results for a smooth control airfoil and an airfoil featuring a 2D bump at $\alpha=0°$ and $4°$.
Figure 32B:
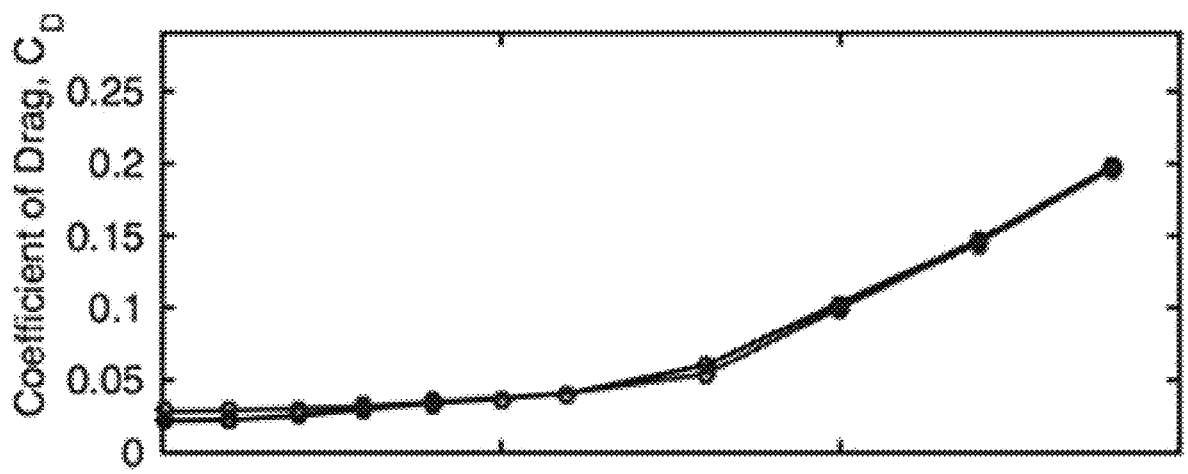
Figure 32C:
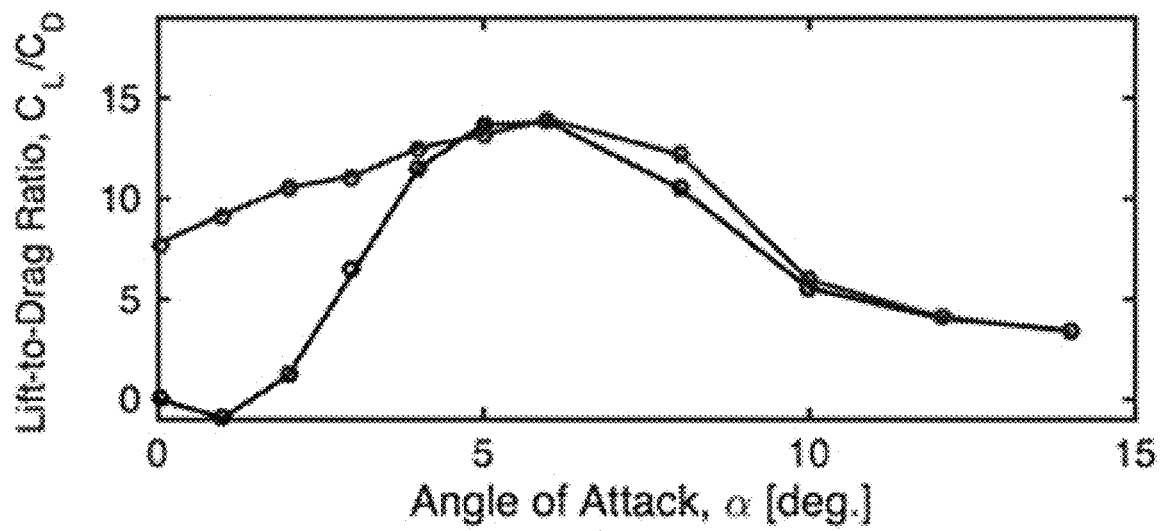

Because of the geometric simplicity of the 2D bump airfoil compared to the airfoil with aerodynamic devices 100, 2D simulations of this system were conducted. As done with the experiments, CFD data were computed for angles of attack that extended past stall. For the CFD results shown in FIG. 32A, FIG. 32B, FIG. 32C, and FIG. 32D, we observe similar results to those seen in the experiments. Positive lift is being generated at zero angle of attack by the 2D bump profile ($C_L=0.22$), and we calculate a 946% and 11% increase in lift generated at $\alpha=2°$ and $\alpha=4°$ respectively compared to the control (see FIG. 32A). In addition, we notice that lift enhancements by the 2D bump airfoil are lost at higher angles of attack just as was the case in experiments (see FIG. 32A). At low angles of attack, a separation bubble is formed by the 2D bump profile, which leads to separation, and which in turn likely ultimately degrades the performance of the 2D bump airfoil at higher angles. In regards to drag, it is important to note that at zero angle of attack a very similar drag coefficient is seen in CFD (see FIG. 32B) compared to the experiments (both just a bit below 0.03). Because of these lift and drag results, we see an overall qualitatively similar L/D curve as was seen in experiments (see FIG. 32C).

Figure 32D:
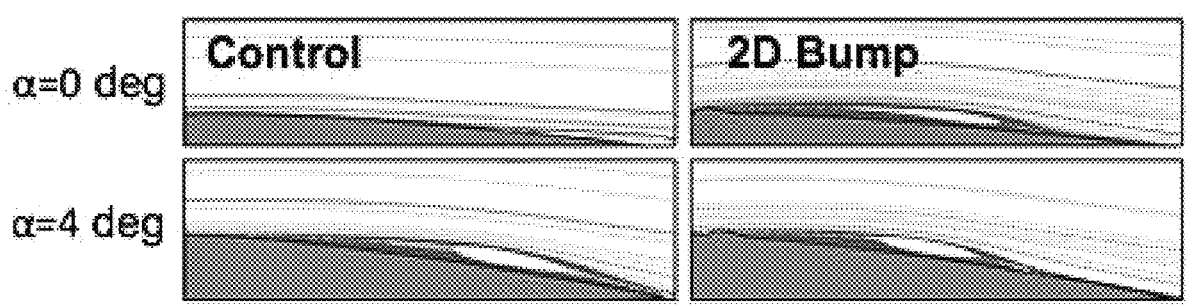

FIG. 32D shows the CFD streamlines for the 2D bump and control for two low angles of attack at which lift is being enhanced by the 2D bump profile ($\alpha=0°$ and $\alpha=4°$). Analyzing these images, we see that at 0° a short separation bubble is being generated by the 2D bump airfoil yet not in the smooth control (as was the case with the airfoil with aerodynamic devices 100). At 4° we do see a separation bubble developing at the trailing edge of the smooth control. However, this separation bubble is fairly large and does not quite reattach at the trailing edge of the airfoil, negatively affecting lift. In the 2D bump airfoil, we see the separation bubble in both CFD and PIV at $\alpha=4°$ much further upstream, which is a more beneficial location in regards to the pressure gradient along the chord as previously discussed.

We should note, however, that there are some differences in the experimental and CFD results, such as the angle at which each of the airfoils stall and the maximum lift and drag being generated. The 2D CFD calculations here are inherently somewhat different than the 3D experiments which include three-dimensional effects; CFD is a much more idealized version of the experiments. In the experiments, for example, tip vortices may reduce the size of the separation bubble. In spite of some inherent differences between the two, we have shown that there are qualitative similarities between the CFD and experiments, including the following: (i) a positive lift enhancement at low angles of attack, (ii) non-zero lift at zero angle of attack, and (iii) the loss of lift increase relative to the control near and at stall. Furthermore, similar flow mechanisms are seen in both the CFD and PIV streamlines, where short separation bubbles form downstream from the trailing edge of the 2D bump profile.

Aerodynamic Device 200

Various embodiments of aerodynamic device 200 include a geometric perturbation that takes advantage of the multiple mechanisms that were seen to be beneficial in the airfoils with from the design of aerodynamic device 100 and the 2D bump. More specifically, we designed a geometric perturbation that combines the ridges of aerodynamic device 100 with the continuous chordwise curved profile of the 2D bump to achieve the lift-to-drag ratio benefits of aerodynamic device 100, while yet also improving the lift further at very low angles of attack (especially α=0°) in the way seen by the 2D bump profile. While this new morphology's chordwise cross-section is designed similarly to that of the 2D bump, its spanwise curvature and morphology resembles that of aerodynamic devices 100 except for the fact that it has a continuous sinusoidal-like nature as opposed to the finite nature of aerodynamic devices 100 placed side-by-side on a airfoil.

Figure 33A:
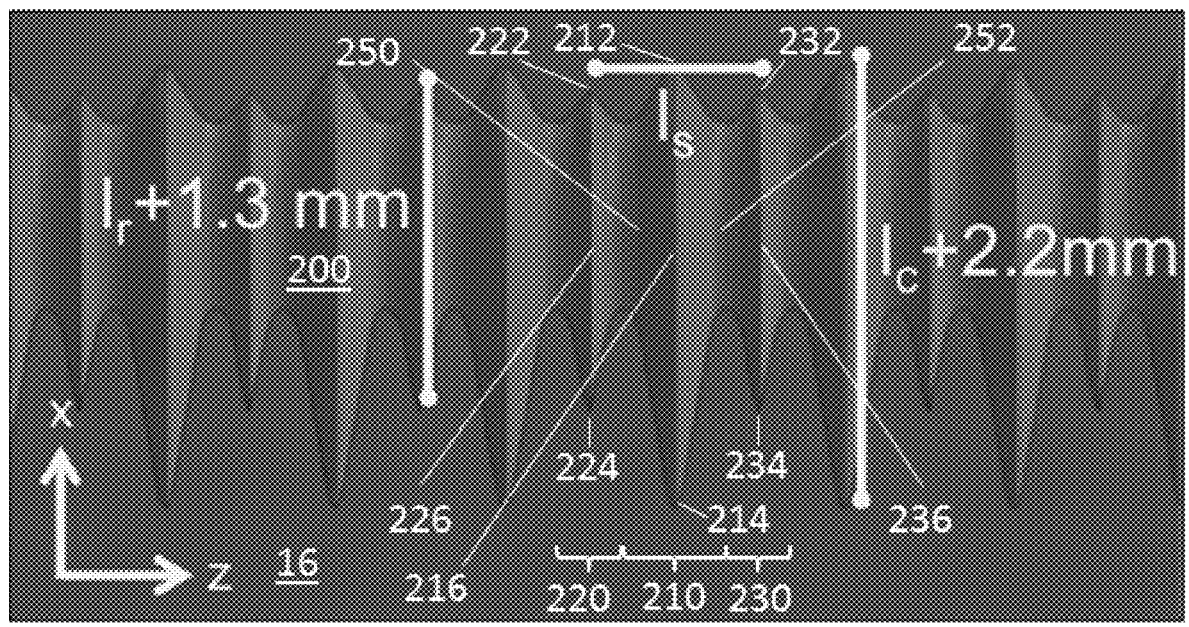
FIG. 33A depicts a top view of a continuous shark-inspired aerodynamic device, according to an embodiment of the present disclosure.
Figure 33B:
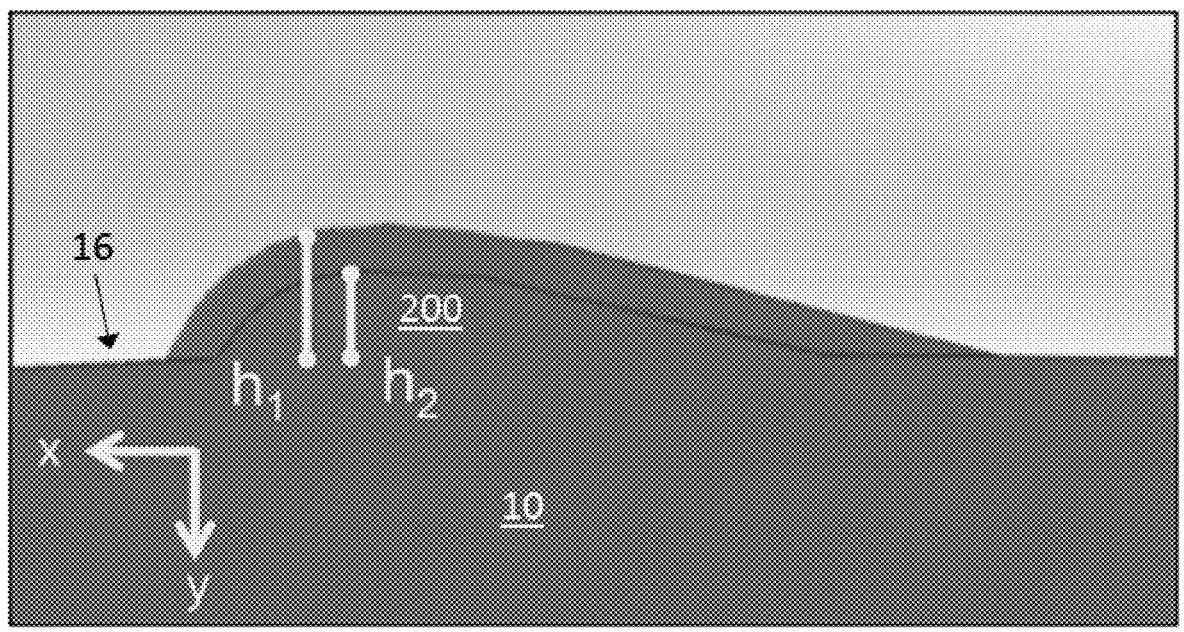
FIG. 33B depicts a side view of a continuous shark-inspired aerodynamic device and corresponding geometric parameters, according to an embodiment of the present disclosure.

Referring now to FIG. 33A and FIG. 33B, we show different views of aerodynamic device 200 of the present disclosure. Aerodynamic device 200, in various embodiments, may generally include a continuous structure including raised members positioned on surface 16 of airfoil 10, either coupled thereto or formed integrally as part of surface 16. Each raised member may generally include an a central portion 210, a first outer portion 220, and a second outer portion 230. The raised members may be situated next to one another so as to extend in a row in a substantially spanwise direction along surface 16 of airfoil 10. In various embodiments, aerodynamic device 200 may be oriented on airfoil 10 such that central portion 210 and first and second portions 2120, 230 of the raised members are oriented in a substantially chordwise direction as shown.

Figure 33C:
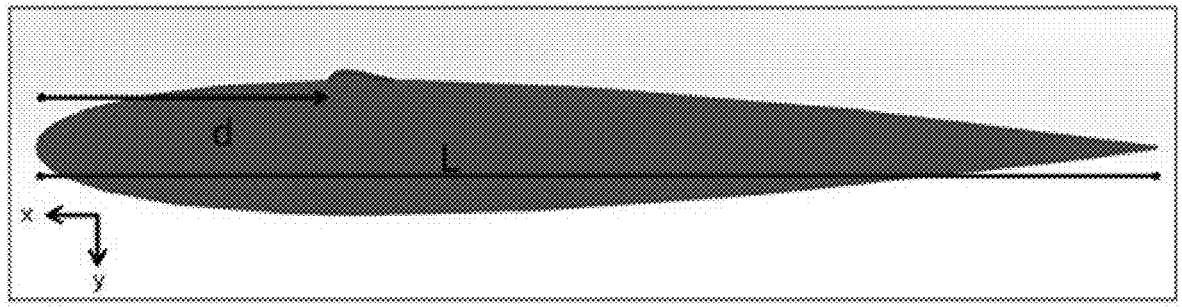
FIG. 33C depicts chordwise placement of the continuous shark-inspired aerodynamic device on the airfoil (d/L=0.26), according to an embodiment of the present disclosure.
Figure 33D:
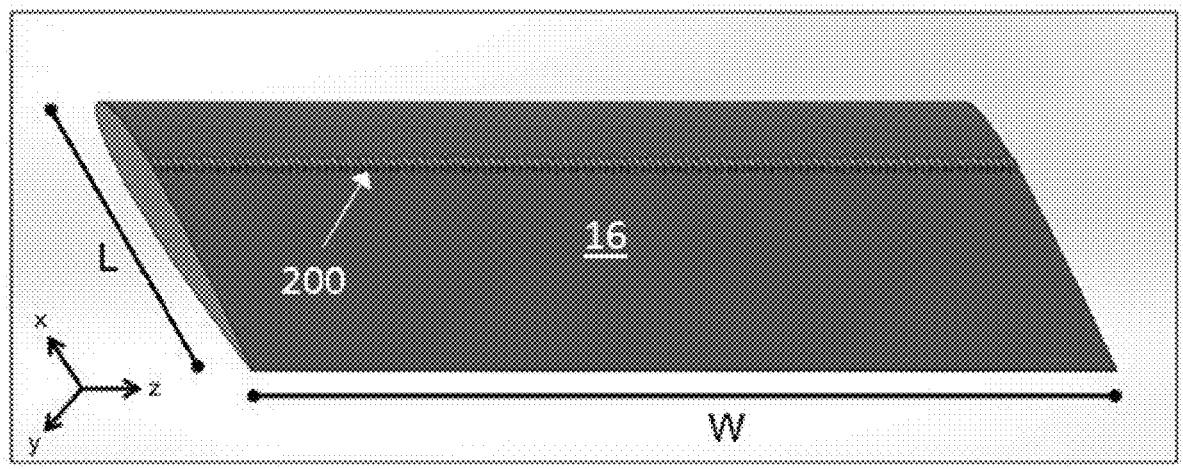
FIG. 33D depicts an isometric view of the continuous shark-inspired aerodynamic device, according to an embodiment of the present disclosure.

Central portion 210, in various embodiments, may be substantially elongated in shape as best shown in FIG. 33A and FIG. 33D. A leading edge 212 and a trailing edge 214 of central portion 210, in an embodiment, may be tapered as shown. This tapering, in some embodiments, may be more aggressive than that seen in FIGS. 2A-2D for central portion 210 of aerodynamic device 100 for enhanced streamlining. Central portion 210, in an embodiment, may slope upwards towards its longitudinal centerline, in some cases forming a ridge 216 running from leading edge 212 to trailing edge 214. These features (or variations thereof, as noted below) combine to define a curvature of central portion 210 itself, as well as a portion of a curvature of overall aerodynamic device 200. This overall curvature interacts with streamwise flow over airfoil 10 to generate fluid dynamic effects serving to improve the aerodynamic performance of airfoil 10, as later described in more detail.

Figure 38:
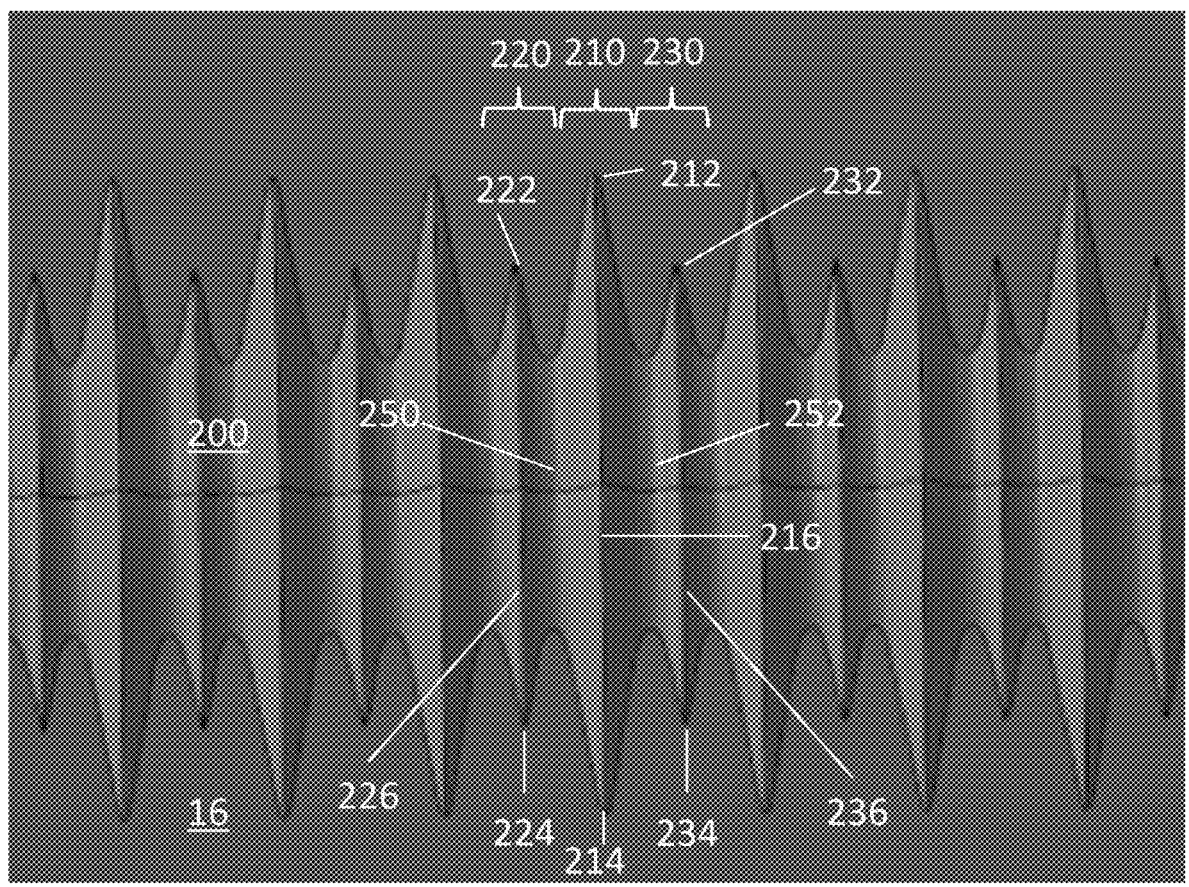
FIG. 38 depicts a top view of a continuous, shark-inspired, symmetric aerodynamic device, according to an embodiment of the present disclosure.

It should be recognized that the above-referenced features of central portion 210 are merely representative of the preferred embodiment shown in FIGS. 33A-33D, and that various perturbations may be made one or more features of central portion 210 without necessarily imparting significant changes to the overall effect on the flow over airfoil 10. For example, in some embodiments, both leading edge 212 and trailing edge 214 of central portion 210 may be tapered or rounded so long as the overall effect on the flow over airfoil 10 retains similar properties and aerodynamic performance benefits as those described herein. Likewise, in another example, central portion 210 may slope upwards as described above, but may converge with a smooth transition rather than forming ridge 216. In some embodiments, central portion 210 may even be less elongated so as to take on a more ovular or circular shape than the heavily elongated profile shown. Referring to FIG. 38, in various embodiments, central portion 210 may have an elongated and symmetric profile. For example, as shown in FIG. 38, central portion 210 may have an elongated oval-like shape that is symmetric about both a spanwise axis (i.e., an axis running left-right across the figure) and a chordwise axis (i.e., an axis running up-down across the figure and coincident with ridge 216, if present) when viewed from above. One of ordinary skill in the art will recognize suitable perturbations to features of central portion 210 in light of the teachings of the present disclosure without undue experimentation.

Outer portions 220, 230, in various embodiments, may have elongated profiles and may be arranged substantially parallel to and on opposing sides of central portion 110, as best shown in FIG. 33A. Leading edges 222, 232 and trailing edges 224, 234 of outer portions 220, 230, respectively, in various embodiments, may be tapered as shown. Unlike in aerodynamic device 100, leading edges 222, 232 of outer portions 220, 230, in an embodiment, may be straight rather than curving toward and blend into leading edge 212 of central portion 210 as shown. Similarly, trailing edges 224, 234 of outer portions 220, 230, an embodiment, may sweep away from trailing edge 214 of central portion 210 to form a v-shaped junctures 240, 242 on opposing sides of central portion 210. These v-shaped trailing edge junctures 240, 242 (which notably need not be constrained to v-shapes only), in an embodiment, may align with valleys 250, 252 created between raised outer portions 220, 230 and raised central portion 210. In some embodiments, central portion 210 and outer portions 220, 230 may be connected at these valleys 250, 252 so as to form a continuous structure, as shown, while in other embodiments central portion 210 and outer portions 220, 230 may be partially or completely separated from one another within a given aerodynamic device 200. Like central portion 210, in an embodiment outer portions 220, 230 may slope upwards toward a longitudinal centerline, perhaps forming ridges 226, 236.

These features (or variations thereof, as noted below) combine to define a curvature of each outer portion 220, 230, as well as a portion of a curvature of overall aerodynamic device 200. This overall curvature interacts with streamwise flow over airfoil 10 to generate fluid dynamic effects serving to improve the aerodynamic performance of airfoil 10, as later described in more detail.

It should be recognized that the above-referenced features of outer portions 220, 230 are merely representative of the preferred embodiment shown in FIGS. 33A-33D, and that various perturbations may be made to one or more features of outer portions 220, 230 without necessarily imparting significant changes to the overall effect on the flow over airfoil 10. For example, in some embodiments, the surface of outer portions 220, 230 may slope upwards from spanwise outer and inner bases as described above, but may converge with a smooth transition rather than forming ridges 226, 236. Referring to FIG. 38, in various embodiments, outer portions 220, 230 may have elongated and symmetric profiles. For example, as shown in FIG. 38, outer portions 220, 230 may each have an elongated oval-like shape that is symmetric about both its respective spanwise axes (i.e., axes running left-right across the figure) and its respective chordwise axes (i.e., axes running up-down across the figure and coincident with ridges 226, 236, if present) when viewed from above. One of ordinary skill in the art will recognize suitable perturbations to features of outer portions 220, 230 in light of the teachings of the present disclosure without undue experimentation.

Aerodynamic device 200 and its constituent components 210, 220, 230 described above may be assigned lengthwise (chordwise) dimensions, widthwise (spanwise) dimensions, and height dimensions as shown in FIG. 33A and FIG. 33B. More specifically, as shown in FIG. 33A, aerodynamic device 200 may have an overall length $l_c$ (which, in various embodiments, may also be length of central portion 210) and each component 210, 220, 230 may have a respective length $l_r$ (denoting length of outer portions 220, 230) measured along its longest chordwise dimension, which in many cases may be along ridges 216, 226, 236 if present. Each raised member (e.g., each combination of central portion 210, first outer portion 220, and second outer portion 230) may have an overall width $l_s$ (denoting spanwise width) and each component may have respective heights $h_1$ (denoting height of central portion 210) and $h_2$ (denoting the heights of outer portions 220, 230), as shown in FIG. 33B. Aerodynamic device 200 may be coupled to or formed integrally with surface 16 of airfoil 10.

Generally speaking, in the preferred embodiment shown, outer portions 220, 230 may be narrower spanwise than central portion 210, central portion 210 may be taller than outer portions 220, 230, and central portion 210 may be longer than outer portions 220, 230. However, as previously noted, one of ordinary skill in the art will recognize suitable perturbations to the relative dimensions of central portion 210 and outer portions 220, 230 in light of the teachings of the present disclosure without undue experimentation.

Aerodynamic device 100, in various embodiments, may feature an $l_c/l_s$ between about 0.25 to about 10. In the embodiment tested, $l_c/l_s$ was about 2.9. Aerodynamic device 100, in various embodiments, may feature an $l_c/l_r$ between about 0.25 to about 5. In the embodiment tested, $l_c/l_s$ was about 1.5. Likewise, aerodynamic device 100, in various embodiments, may feature an $h_1/h_2$ between about 0.25 to about 5. In the embodiment tested, $l_c/l_s$ was about 1.4.

In various embodiments, a ratio of overall chordwise length of aerodynamic device 100 ($l_c$) to the chord of airfoil 10 may be between about 0.003 and about 0.15. In the embodiment tested, this ratio was about 0.06.

In various embodiments, for each raised member of aerodynamic device 200, a ratio of the spanwise dimension of one of the first or second portions 220, 230 and a spanwise dimension of the central portion 210 is between about 0.005 and about 1.

In various embodiments, a ratio of: a) the spanwise dimension between the longitudinal center of central portion 210 and the longitudinal center of one of outer portions 220, 230, to b) the spanwise dimension of airfoil 10, may be between about 0.0005 and about 0.05. This ratio is essentially a measure of the internal spacing within each raised member of aerodynamic device 200 and the span of the airfoil 10 on which device 200 is positioned.

In various embodiments, the overall height of aerodynamic device 200 may be less than or equal to the height of the boundary layer of the corresponding airfoil 10 on which it is positioned. Stated otherwise, in such embodiments, aerodynamic device 200 may be fully or substantially submerged within the boundary layer. In other embodiments, the overall height of aerodynamic device 200 may be greater than the height of the boundary layer. In some such cases, only a small portion of aerodynamic device 200 may extend above the boundary layer, such as the trailing end of central portion 210, and in more pronounced cases, the trailing ends of outer portions 220, 230. Accordingly, in various embodiments, $h_1/h_2$ of aerodynamic device 200 may be between about 0.01 to about 2. One of ordinary skill in the art will recognize a suitable overall height of aerodynamic device 200 relative to the boundary layer for a given application without undue experimentation in light of the teachings of the present disclosure.

Without wishing to be bound by theory, it is thought that the curvature of central portion 210 may contribute to the formation of a separation bubble immediately downstream of central portion 210 that creates enhanced local suction on the airfoil for enhancing lift properties. Again not wishing to be bound by theory, it is thought that the curvature of outer portions 220, 230 may contribute to the formation of first and second streamwise vortices immediately downstream of outer portions 220, 230, respectively, that pull higher energy flow into the boundary layer which, in turn, minimizes local separation similar to the way a vortex generator does, but additionally acting to contain the separation bubble from expanding downstream and bursting at high angles of attack. Of course, one of ordinary skill in the art will recognize that while it is tempting to deconstruct the overall fluid dynamic effects created by aerodynamic device 200 into constituent parts (e.g., a separation bubble, and first and second streamwise vortices), as well as to attribute these constituent parts to individual portions of aerodynamic device 200 (e.g., separation bubble to central portion 210 and vortices to outer portions 220, 230, respectively), this may be an oversimplification, as the aerodynamic effect produced may include additional interactions attributable to the overall curvature of aerodynamic device. Stated otherwise, the aerodynamic effect produced by the overall curvature of aerodynamic device 200 may include unique properties beyond any constituent parts thought to be theoretically identifiable in experimental and computational analysis. Regardless of flow theory, the experimental results showing improvements in both lift and drag are undeniable and have practical, real-world implications for developing innovative aerodynamic bodies.

In FIG. 33C and FIG. 33D we show side and isometric views of the aerodynamic device 200. Essentially, this morphology can be thought of as one continuous shark denticle that runs the full span of the airfoil at a chordwise placement of d/L=0.26. The leading edge chordwise curvature of aerodynamic device 200 matches that of aerodynamic device 100 (just like the 2D bump profile did). This morphology also has an extremely similar structure as that of aerodynamic device 100 with a long chordwise middle ridge between two smaller side ridges (the side ridges have been extended an extra 1.3 mm and the middle ridge an extra 2.2 mm so as to give this profile a very streamlined extended shape like that of the 2D bump profile, yet with pronounced chordwise ridges like that of aerodynamic device 100). Similarly to airfoil #1, $h_1$=0.7 mm, $h_2$=0.5 mm, $l_s$=1.5 mm, $l_c$2 mm, $l_r$=1.6 mm, d/L=0.26, L=68 mm, W/L=2.8.

Figure 34A:
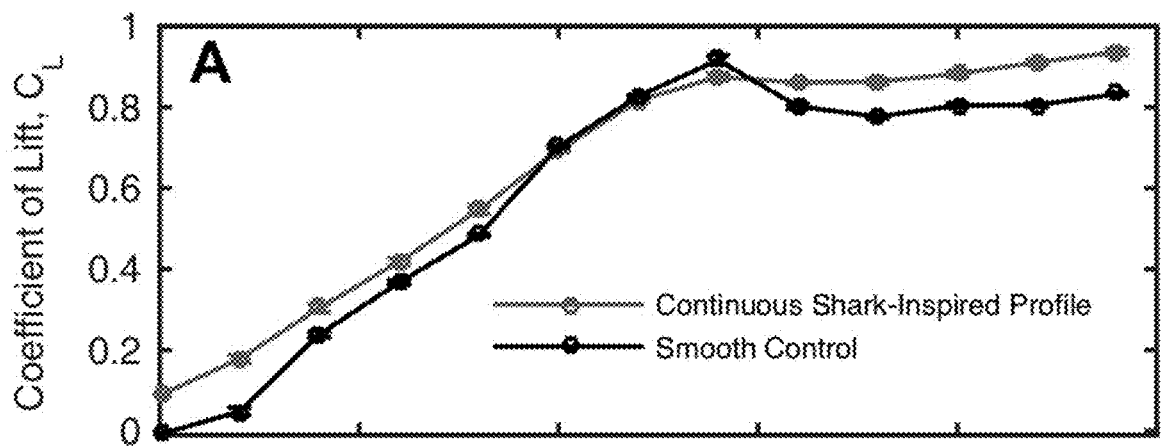
FIG. 34A, FIG. 34B, and FIG. 34C depict experimental results of lift coefficient, drag coefficient, and lift-to-drag ratio as a function of angle of attack for an embodiment of a continuous aerodynamic device, compared with experimental results for a smooth control airfoil, according to an embodiment of the present disclosure.
Figure 34B:
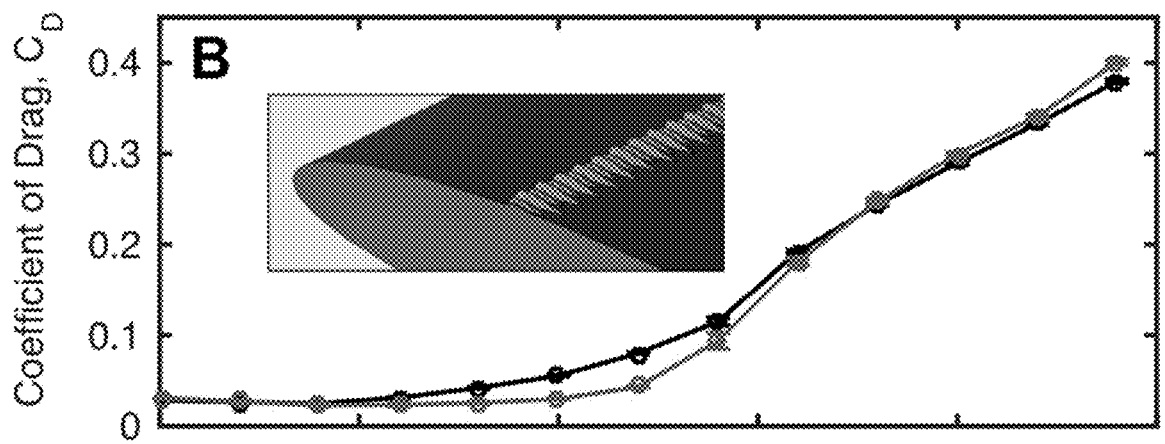
Figure 34C:
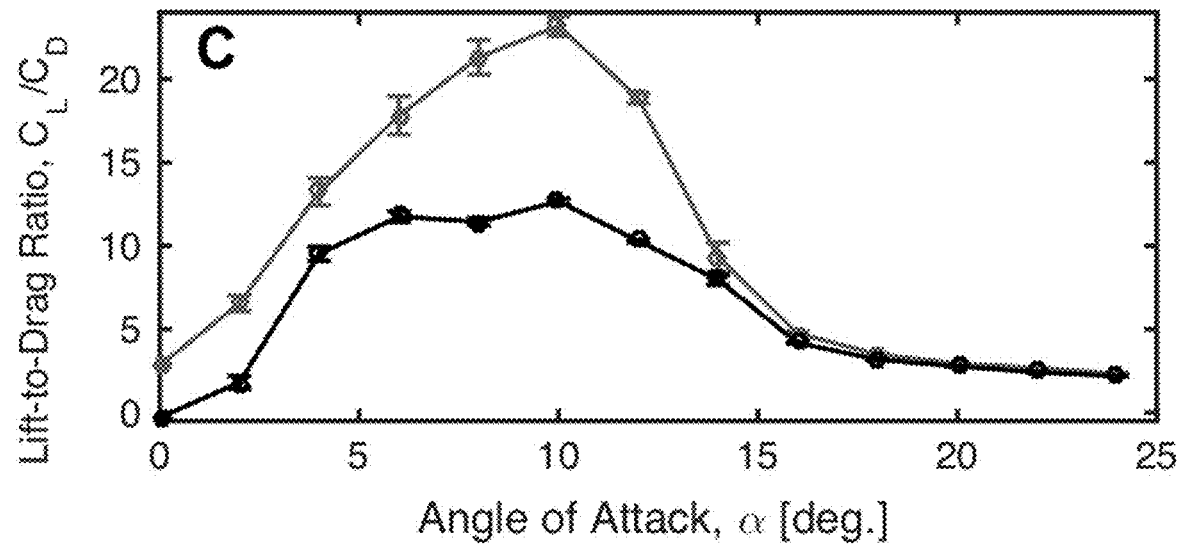

FIG. 34A, FIG. 34B, and FIG. 34C present experimental results for the aerodynamic response of an airfoil with aerodynamic device 200 placed at 26% along the chord. First, focusing on lift at low angles of attack, we find that this airfoil with aerodynamic device 200 generates roughly the same amount of lift as the one with the 2D bump profile, and over twice that of the airfoil with aerodynamic devices 100 at $\alpha=0°$ ($C_L^{cont.}/C_L^{2Dbump}=1.03$ and $C_L^{cont.}/C_L^{shark}=2.47$—see FIG. 34A). We also see that the airfoil with aerodynamic devices 200 results in coefficients of lift similar to those seen for the cases of the 2D bump profile and aerodynamic devices 100 at other low angles of attack ($C_L^{cont.}/C_L^{2Dbump}=1.19$, 1.09 and $C_L^{cont.}/C_L^{shark}=1.04$, 1.03 at $\alpha=2$ and 4°, respectively). Second, our results indicate that aerodynamic device 200 does not lose these lift benefits as much at higher angles of attack prior to stall. Third, we find that aerodynamic device 200 leads to even more drag reduction than the aerodynamic device 100 (see FIG. 34B). This is especially evident at angles of attack just before stall, with $C_D^{cont.}/C_D^{control}=0.54$ and 0.53 at $\alpha=10°$ and 12°, respectively (resulting in $C_{L/D}^{control}/C_{L/D}^{shark}=0.65$ and 0.62 at $\alpha=10°$ and 12°, respectively). This may in part be helped by the streamlined nature of aerodynamic device 200. Finally, it is important to note that the observed high lift and low drag lead to large lift-to-drag ratio increases ($C_{L/D}^{cont.}/C_{L/D}^{control}=3.61$, 1.39, 1.52, 1.86, 1.83, and 1.83 at $\alpha=2°$, 4°, 6°, 8°, 10°, and 12°, respectively—see FIG. 34C).

Figure 35:
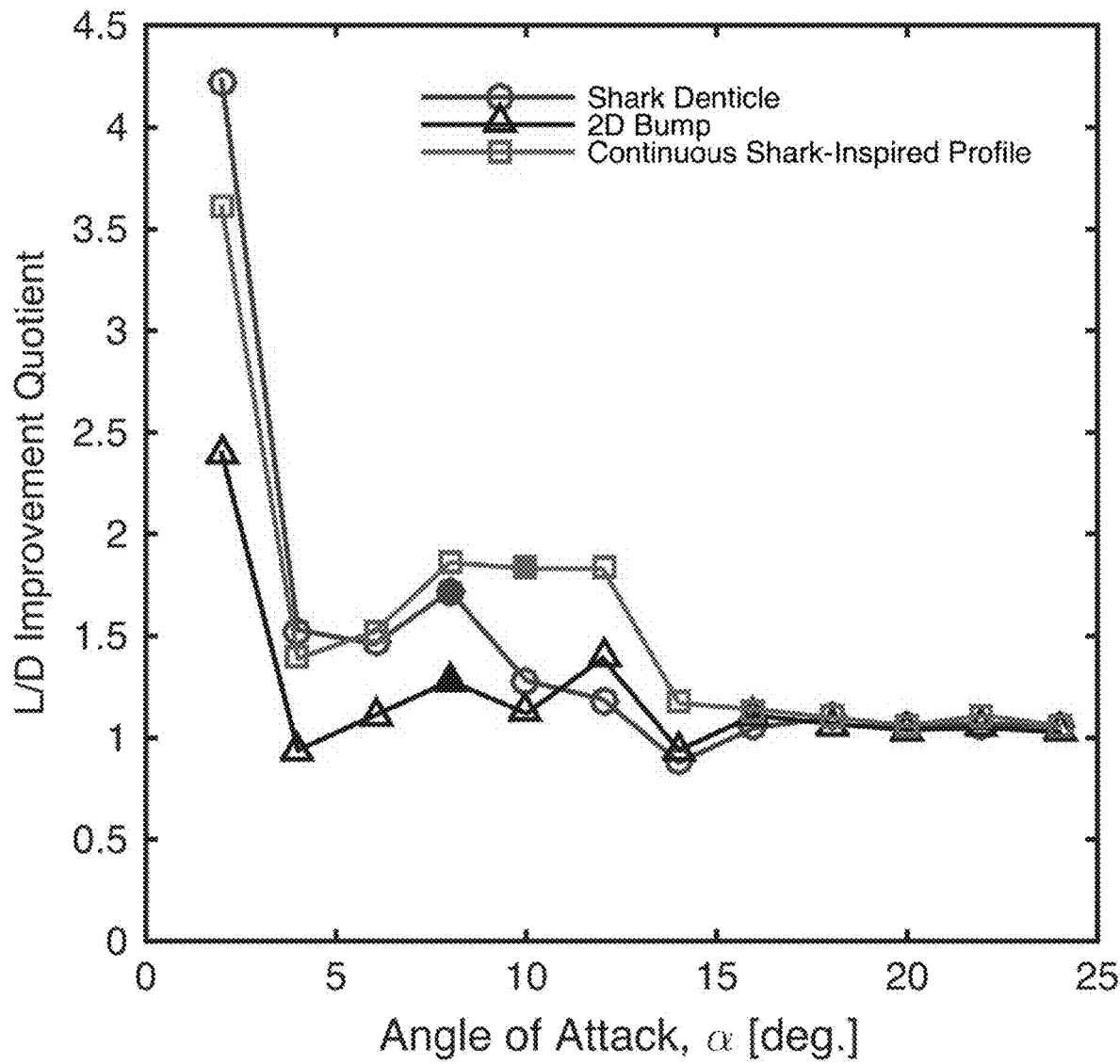
FIG. 35 depicts comparisons of lift-to-drag improvement quotient over a smooth control airfoil ($C_{L/D}^{aerodynamic\ device}/C_{L/D}^{smooth\ control}$) for airfoils with a denticle-like aerodynamic device, a 2-D bump profile, and a continuous aerodynamic device (red, blue, and green, respectively), according to embodiments of the present disclosure.

Specifically, we see from FIG. 35 (which shows a comparison of the lift-to-drag ratio improvements of airfoils with aerodynamic device 100, aerodynamic device 200, and 2D bump) that aerodynamic device 200 outperforms the 2D bump profile at all angles of attack and aerodynamic device 100 at just about all angles of attack. This is because aerodynamic device 200 is able to produce the same lift benefits as the 2D bump at low angles of attack (especially $\alpha=0°$) without losing these lift benefits as much at higher angles of attack (like the 2D bump does), in addition to greatly reducing drag at higher angles (like aerodynamic device 100 is able to). Note that in FIG. 35 we also indicate with a filled in marker the angle at which the maximum lift-to-drag ratio occurs for each airfoil. Again, we find that aerodynamic device 200 produces the greatest improvement at this angle.

In addition to these great lift-to-drag ratio improvements, aerodynamic, device 200 has another important advantage over aerodynamic device 100 and the 2D bump discussed here. Although there has, been increased interest in recent years aimed at reproducing the hydrodynamic performance of shark denticles for use on engineered surfaces, one major obstacle to the mass production of these shark skin-inspired geometries has been the structural complexity of the denticles. While it has been demonstrated previously that it is possible to replicate these forms through the use of 3D printing, this approach is unfortunately difficult to scale, and the undercuts and overhangs present on the native denticles prevent the direct molding of these specific geometries using conventional manufacturing strategies. Aerodynamic device 200 described here circumvents these problems and is easily amendable to roll-to-roll embossed fabrication, bringing this technology one step closer to large-scale adoption for aquatic and aerospace applications.

Referring to FIG. 38, in various embodiments, aerodynamic device 200 may have a symmetric profile as shown. In particular, each of central portion 210 and outer portions 220, 230 may have symmetric profiles and be positioned relative to one another such that the chordwise midpoint of each is aligned. Stated otherwise, outer portions 220, 230 may be the same shape and size as one another, and may positioned such that leading edges 222, 232 line up with one another and trailing edges 224, 234 line up with one another, as shown. Outer portions 220, 230 may be further positioned such that their chordwise midpoints align with the chordwise midpoints of central portion 210, such that there leading edges 222, 232 are set back from leading edge 212 by the same distance that trailing edges 224, 234 are set back from trailing edge 214.

An overall symmetric profile may allow aerodynamic device 200 to produce the same or similar aerodynamic results regardless of whether the flow approaches towards a leading edge of aerodynamic device 200 (i.e., from the top of the figure towards the bottom of the figure) or towards a trailing edge of aerodynamic device 200 (i.e., from the bottom of the figure towards the top of the figure). This can be useful in a variety of real-world situations including, without limitation, on rotating bodies, especially those that are operated or allowed to rotate in multiple directions. For example, a flying disc, such as a Frisbee®, sporting disc, or disc golf disc, may be thrown such that it rotates clockwise or counterclockwise, depending on whether thrown forehand or backhand, or by a left-handed person or a right-handed person. Accordingly, providing the flying disc with an aerodynamic device 200 having a symmetric design may allow the flying disc to benefit from similar aerodynamic performance improvements regardless of whether it spins clockwise or counterclockwise in flight. Another representative example is an American football, which may be thrown with either end pointing forward and with a spiral rotation in either direction depending on whether the quarterback is left-handed or right-handed. One of ordinary skill in the art will recognize other suitable applications that take advantage of the symmetric performance afforded by symmetric designs of aerodynamic device 200. Of course, other embodiments (e.g., non-symmetric or only symmetric along one axis such as a chordwise axis) of aerodynamic devices 100, 200 may be utilized on surfaces of rotating bodies (e.g., flying disc, football) and the like as well.

To that end, in various embodiments, symmetric embodiments of aerodynamic device 200 may be oriented on an aerodynamic surface such that central portion 210, outer portion 220, and outer portion 230 of each respective raised member making up the continuous structure of aerodynamic device 200 are each substantially aligned with a streamwise direction of localized flow over the body. As configured, flow will approach either the leading edge or the trailing edge of aerodynamic device 200 in a direction substantially parallel to that of central portion 210, outer portion 220, and outer portion 230 at a corresponding location on the aerodynamic surface. As configured, the symmetric aerodynamic device 200 will manipulate the flow in a similar manner as previously described in the context of those oriented chordwise on an airfoil. It should be recognized that the flow direction need not be exactly aligned with aerodynamic device 200 in order to increase lift and reduce drag as described herein, but in any event, aerodynamic device 200 will likely perform best when aligned as much as possible with the direction of localized flow. In some cases, the localized flow direction may be characterized as a combination (i.e., vector analysis) of wind direction, the direction and speed of translation of the body, and the direction and speed of rotation of the body, as will be recognized by persons skilled in the art in light of the present disclosure.

Figure 39:
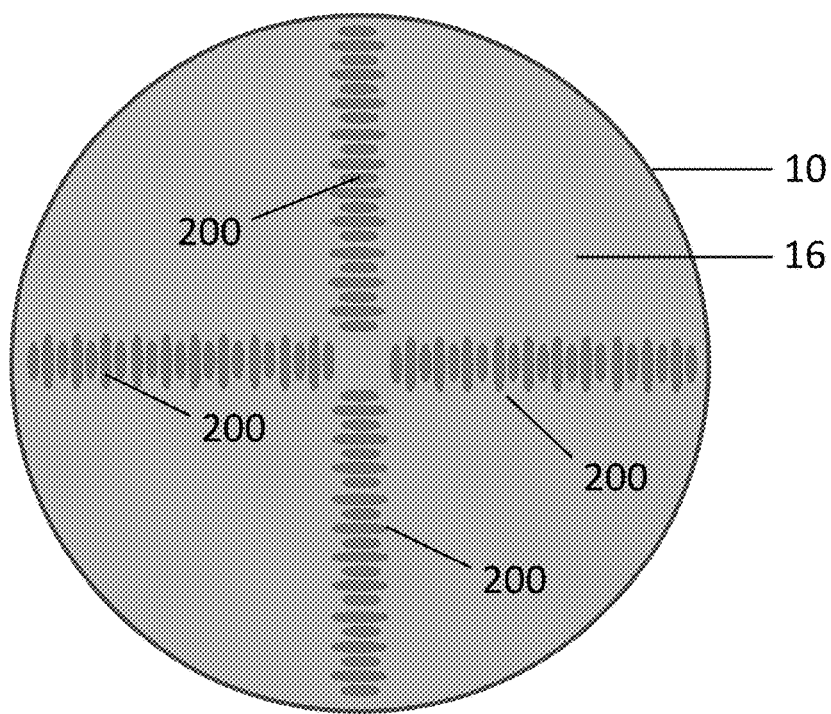
FIG. 39 depicts a top view of a flying disc having four continuous symmetric aerodynamic devices spanning the radius of the disc, according to an embodiment of the present disclosure.
Figure 40:
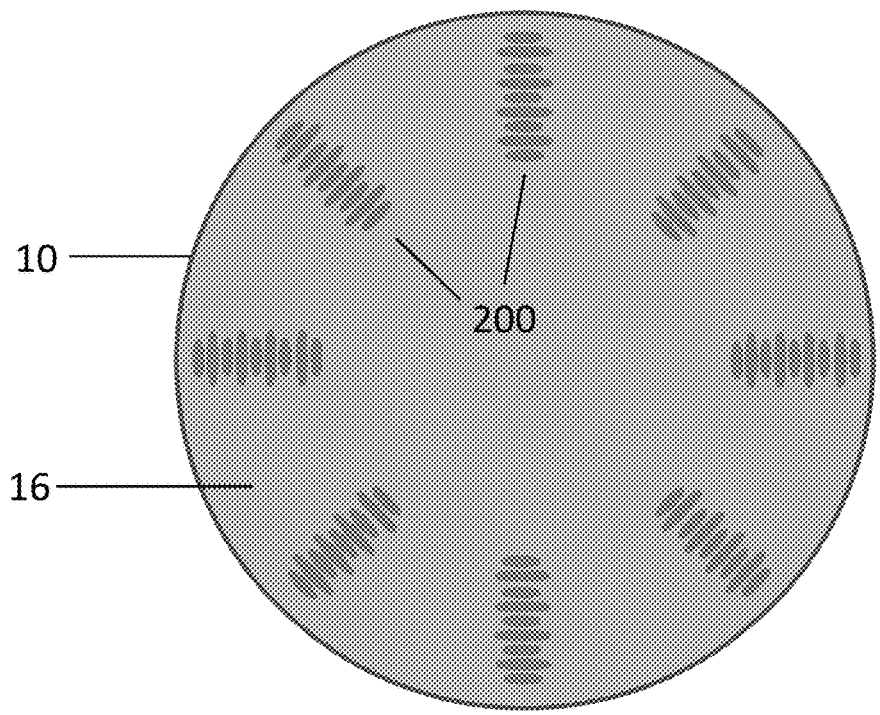
FIG. 40 depicts atop view of a flying disc having eight continuous symmetric aerodynamic devices spanning an outer portion of the radius of the disc, according to an embodiment of the present disclosure.
Figure 41:
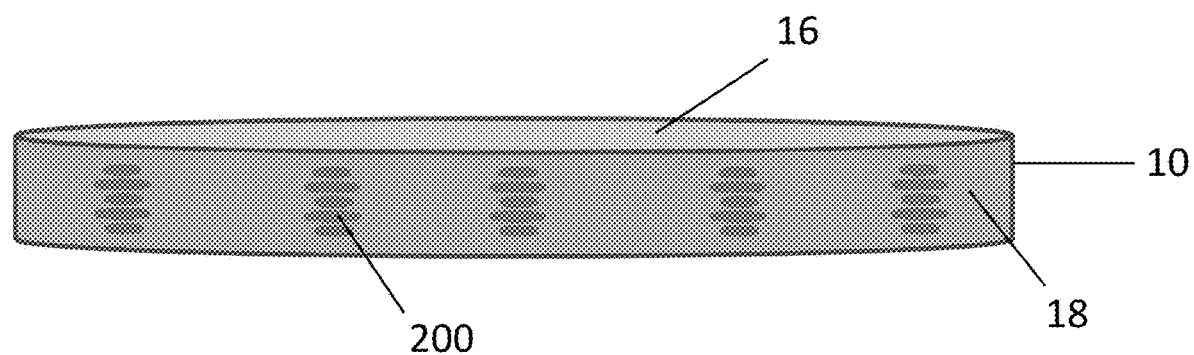
FIG. 41 depicts a side view of a flying disc having numerous continuous symmetric aerodynamic devices arranged about an outer rim of the flying disc, according to an embodiment of the present disclosure.

For example, with reference now to FIG. 39 and FIG. 40, in a flying disc embodiment, symmetric aerodynamic device 200 may be positioned on or form at least a portion of an upper surface 16 of a flying disc 10, and oriented with its leading and trailing edges pointing in opposing circumferential directions, as shown in FIG. 39 and FIG. 40. As configured, regardless of whether the flying disc is thrown with clockwise or counterclockwise rotation, symmetric embodiments of aerodynamic device 200 will be substantially aligned with at least rotational flow, which in many cases is dominant. Additionally, as configured, aerodynamic device 200 may be substantially aligned a direction of translation of the flying disc when aerodynamic device rotates to an azimuthal position of about 90 degrees (advancing side when spinning counterclockwise while translating forward) and to an azimuthal position of about 270 degrees (retreating side when spinning counterclockwise while translating forward). Likewise, with reference to FIG. 41, symmetric embodiments of aerodynamic device 200 may be positioned on or form at least a portion of an outer surface of a rim 18 of flying disc 10. As configured, aerodynamic device 200 may be substantially aligned with rotational flow over the rim, as well as with translational flow when aerodynamic device 200 rotates to about 90 degree and 270 degree azimuthal positions during translation.

Referring back to FIG. 39 and FIG. 40, aerodynamic device 200 may be arranged in any suitable pattern on one or more surfaces of flying disc 10. As shown in both FIG. 39 and FIG. 40, in various embodiments, one or more aerodynamic devices 200 may be positioned on or form at least a portion of upper surface 16 of flying disc 10, and extend in a substantially radial direction. In some embodiments, aerodynamic device(s) 200 may span at least a radius of the upper surface 16, as is the case with each of the four aerodynamic devices 200 shown in FIG. 39. Of course, in an alternative embodiment, each pair of opposing aerodynamic devices 200 in FIG. 39 could be extended to form or be replaced with two diameter-length aerodynamic devices to similar effect. Likewise, any suitable number of aerodynamic devices 200 could be utilized, rather than only the four shown in FIG. 39. Additionally or alternatively, in some embodiments, aerodynamic devices 200 may be shorter and thus cover only a portion of the radius, as shown in FIG. 40. Here, eight symmetric aerodynamic devices 200 are depicted, each being dimensioned and positioned to span only an outer portion of the radius of the upper surface 16 of flying disc 10, such as the outer about 10% to about 25% of the radius. Generally speaking, outer portions of flying disc 10 experience faster flows than inner portions due to the rotation of flying disc 10, and thus aerodynamic device 200 may be used to greater effect on outer portions. Similar to FIG. 39, any suitable number of aerodynamic devices 200 could be utilized, rather than only the eight shown in FIG. 39. In various embodiments, multiple aerodynamic devices 200 may be spaced apart at equal distances from one another, while in some embodiments, one or more of multiple aerodynamic devices may be grouped into clusters. While aerodynamic device 200 is shown in FIG. 39 and FIG. 40 as linear and extending in a substantially radial direction, in various embodiments, aerodynamic device may take on any shape suitable for producing the aerodynamic benefits described in the present disclosure. For example, in some embodiments (not shown), aerodynamic device could be curved rather than linear. One of ordinary skill in the art will recognize suitable numbers, orientations, and arrangements of aerodynamic devices 200 on an aerodynamic surface of a body, such as upper surface 16 or rim surface 18 of flying disc 10, in light of the teachings of the present disclosure without undue experimentation.

Experimental Comparison of Airfoils with Aerodynamic Devices 100, 200 Versus Airfoils with 2D Bump or Vortex Generators In this section, we compare the results of aerodynamic device 100 (i.e., airfoil #1 with best performance benefits); aerodynamic device 200, and 2D bump profile. Specifically, in FIG. 35 we report the lift-to-drag ratio (L/D) improvement of each of the airfoils in comparison with the smooth control as a function of angle of attack a. Note that, since the control airfoil is symmetric and therefore has an L/D of zero at $\alpha=0°$, the plot begins at $\alpha=2°$.

The results of FIG. 35 show two key features. First, all three airfoils provide great improvements in L/D at low angles of attack (i.e. at $\alpha=2°$), with the airfoils having aerodynamic device 100 and aerodynamic device 200 performing significantly better. This is because, although the 2D bump profile enhances lift over twice that of the shark denticle at $\alpha=0°$, it loses a lot of those lift benefits at higher angles of attack and does not produce a lot of drag reduction since it is not a vortex generator. Second, the airfoil featuring aerodynamic device 200 is outperforming the other two airfoils at the majority of angles of attack. This is because aerodynamic device 200, which combines aspects of the 2D bump profile and aerodynamic device 100, is able to produce the same lift benefits as the 2D bump at $\alpha=0°$ without losing these lift benefits as much at higher angles of attack (like the 2D bump does), in addition to greatly reducing drag at these higher angles.

In FIG. 35 we also indicate with a filled in marker the angle at which the max L/D occurs for each airfoil. Note that at this angle the airfoil can move with its most advantageous lift-to-drag ratio. So for example, if a given application does not have a mandatory angle of attack at which it must move, then this angle of attack would be the most advantageous to use for generating a lot of lift without producing too much drag. We see from FIG. 35 that, like in the case of most angles of attack, aerodynamic device 200 produces the greatest improvements at this max L/D (as seen by comparing the filled in markers for each airfoil).

Figure 36:
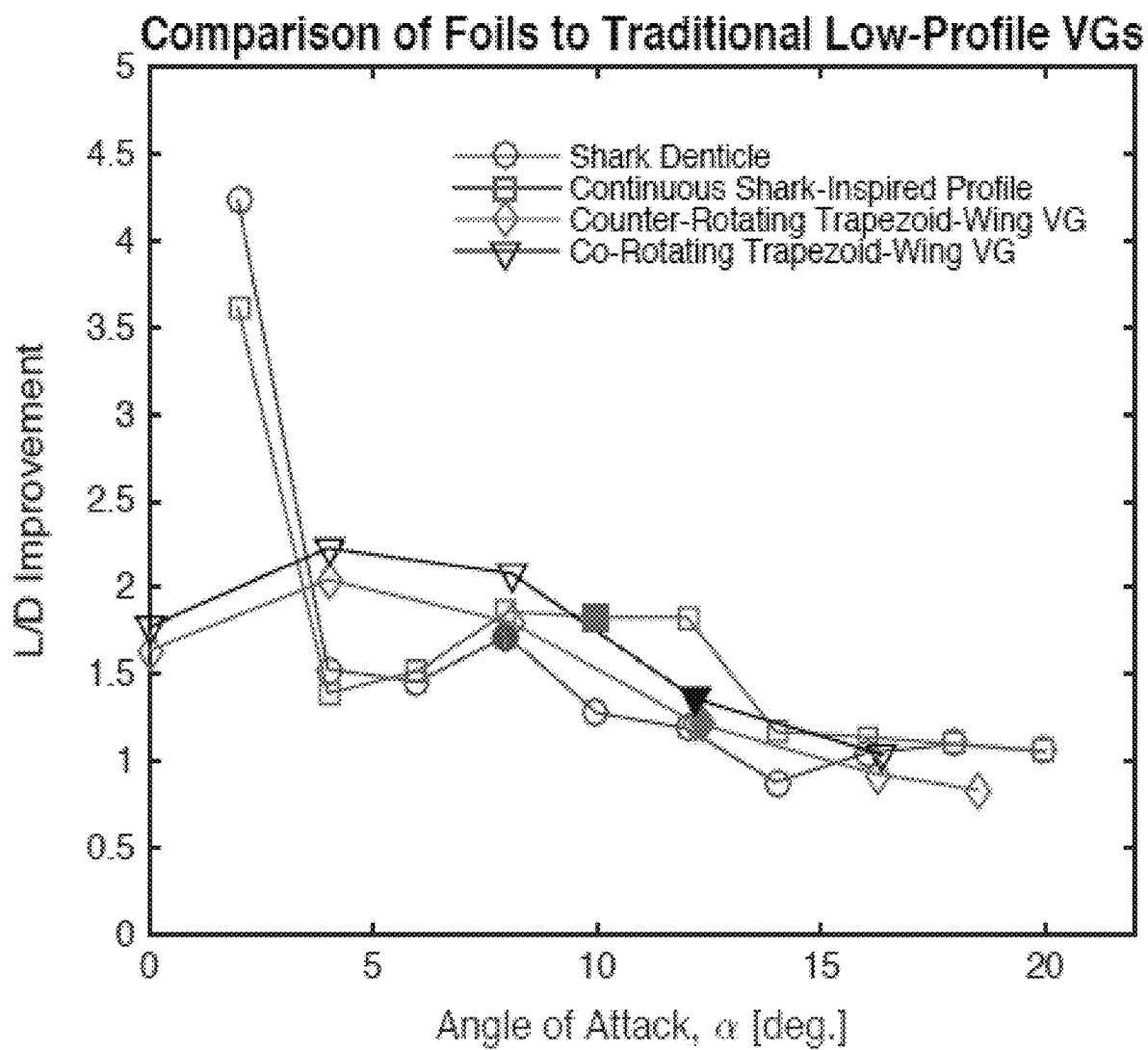
FIG. 36 illustrates lift-to-drag improvement quotient over a smooth control airfoil ($C_{L/D}^{aerodynamic\ device}/C_{L/D}^{smooth\ control}$) for the airfoils of FIG. 35 in further comparison with those of airfoils equipped with various low-profile vortex generators known in the art, according to embodiments of the present disclosure.

Referring now to FIG. 36, we now compare the results obtained for aerodynamic devices 100, 200 to those of traditional low-profile vortex generator designs. Specifically, we consider the following set of data available for low-profile vortex generators described in the references set forth in Table 2 below:

Counter-rotating and co-rotating trapezoid-wing vortex generators arranged on a cambered airfoil. For this system, lift-to-drag ratio measurements as a function of angle of attack at $Re_c \approx 9 \times 10^6$ are reported in FIG. 17 of Reference A and FIG. 15 of Reference B of Table 2.

Wedge-type vortex generators tested on a "rooftop" section of an airplane wing in transonic flow with M=0.71. Lift-to-drag ratio measurements as a function of $C_L$ are reported in FIG. 12 of Reference C of Table 2.

Co-rotating vane-type vortex generators tested on a "10%-scale configuration of a near-term technology, low-observable, multi-role fighter derivative concept." Lift-to-drag ratio measurements as a function of $C_L$ at a Re≈1,300,000 per foot are reported in FIG. 8 of Reference D of Table 2.

TABLE 2

| | |
|---|---|
| Reference A | Yao C, Lin J, Allen B. 2002 Flowfield Measurement of Device-Induced Embedded Streamwise Vortex on a Flat Plate. 1st Flow Control Conference (American Institute of Aeronautics and Astronautics, Reston, Virginia). doi: 10.2514/6.2002-3162. |
| Reference B | Kerho M, Hutcherson S, Blackwelder RF, Liebeck RH. 1993 Vortex generators used to control laminar separation bubbles. J Aircr 30, 315-319. |
| Reference C | Lin JC, Robinson SK, McGhee RJ, Valarezo WO. 1994 Separation control on high-lift airfoils via micro-vortex generators. J Aircr 31, 1317-1323. |

TABLE 2-continued

| | |
|---|---|
| Reference D | Lin J. 1999 Control of turbulent boundary-layer separation using micro-vortex generators. 30th Fluid Dynamics Conference (American Institute of Aeronautics and Astronautics, Reston, Virginia). doi: 10.2514/6.1999-3404. |

It is important to note that the vortex generators described above were tested in a much different environment than that of the experiments described here. Although it may be difficult to make a direct comparison, it allows for some reference to the present experiments and results.

As shown in FIG. 36, we compare the lift-to-drag ratio (L/D) improvement of aerodynamic devices 100, 200 to counter-rotating and co-rotating trapezoid-wing vortex generators described above, which are the best-reported traditional low-profile VGs as reported in Lin's literature review. It appears that on a whole aerodynamic devices 100, 200 presented here are relatively comparable to the results of these more traditional vortex generators at higher angles of attack near stall and the max L/D. However aerodynamic devices 100, 200 presented here show even better improvements at low angles than the traditional low-profile vortex generators. This low angle of attack improvement has potential significance for many systems such as drones, airplanes, and aquatic autonomous vehicles, which can often experience similar low angles of attack in use. Moreover, we see that aerodynamic device 200 is producing greater L/D improvements at its max L/D (filled in markers) than any other airfoil is. Once again, this is very beneficial for applications at which the angle of attack is not set, since at this angle the system can move with its most advantageous L/D.

Figure 37:
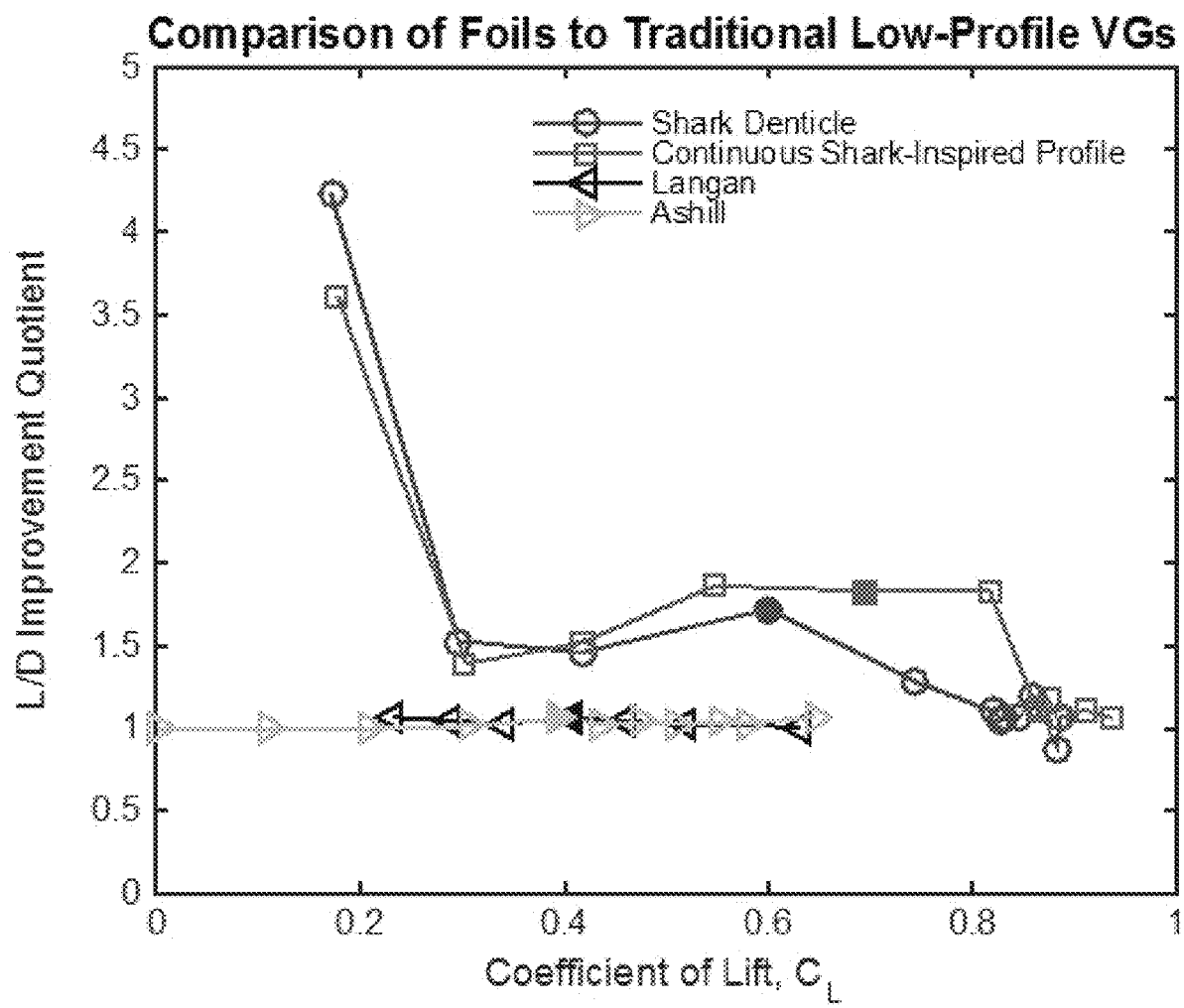
FIG. 37 illustrates lift-to-drag improvement quotient over a smooth control airfoil ($C_{L/D}^{aerodynamic\ device}/C_{L/D}^{smooth\ control}$) for the airfoils of FIG. 35 in further comparison with those of airfoils equipped with low-profile vortex generators of Langan and Ashill, according to embodiments of the present disclosure.

Finally, in FIG. 37 we compare the lift-to-drag ratio improvements of our best aerodynamic devices 100, 200 to that measured for the wedge-type and co-rotating vane-type vortex generators described above. Note that in the plot the L/D improvement is reported as a function of the coefficient of lift. Analyzing FIG. 37, we find that our best airfoils featuring aerodynamic devices 100, 200 show significant improvements compared to the roughly 5% increases that the other studies see. This holds true for all values of $C_L$ tested in these other studies. In addition, just as we saw for the previous two plots, aerodynamic device 200 is producing the highest L/D improvements at its max L/D.

We have taken inspiration from shark denticles to design aerodynamic devices 100, 200, that significantly improve the aerodynamics of airfoils. In contrast to previous studies on shark skin that have mostly focused on drag reduction/ thrust improvement, we showed that aerodynamic devices 100, 200 also generate lift, resulting in high lift-to-drag ratio improvements.

Specifically, we found comparable results to those of the best previously reported low-profile vortex generators at higher angles of attack near stall, and even much higher improvements at low angles of attack ($\alpha < 4°$). The remarkable results shown here were achieved by utilizing two mechanisms. First, aerodynamic devices 100, 200 trip the boundary layer and generate a short (reattaching) separation bubble that provides extra suction along the chord and thereby enhances lift. Second, the spanwise curvature of aerodynamic devices 100, 200 helps to generate streamwise vortices that can lead to drag reduction and prevent lift losses at higher angles of attack.

It is important to note that the flow regime considered ($Re_c \approx 4 \times 10^4$) is relevant for many systems, including interior portions of wind turbine blades, helicopter blades, drones, and autonomous underwater vehicles. Moreover, some of the mechanisms discovered here can hold also for higher flow regimes and can be used to improve movement through air and water. Finally, the results discussed here may have implications for understanding the function of shark denticle morphology. Shark skin denticles have been shown to alter the position and strength of the leading edge vortex in experimental studies, and it is likely that the lift effects observed here with aerodynamic devices 100, 200 contribute to thrust enhancement effect of shark skin resulting in increased self-propelled swimming speeds.

While the presently disclosed embodiments have been described with reference to certain embodiments thereof, it should be understood by those skilled in the art that various changes may be made and equivalents may be substituted without departing from the true spirit and scope of the presently disclosed embodiments. In addition, many modifications may be made to adapt to a particular situation, indication, material and composition of matter, process step or steps, without departing from the spirit and scope of the present presently disclosed embodiments. All such modifications are intended to be within the scope of the claims appended hereto.

What is claimed is:

1. An aerodynamic device for enhancing lift and reducing drag on a body, the device comprising:
  a plurality of raised members, each having a symmetric profile and including:
    a central portion having an elongated profile; and
    a first outer portion and a second outer portion arranged substantially parallel to and on opposing sides of the central portion, each of the first and second outer portions having an elongated profile,
  wherein the plurality of raised members are situated adjacent one another to form a continuous structure on or defining at least a portion of a surface of the body,
  wherein the continuous structure of raised members is oriented such that the raised members are substantially aligned with a direction of localized flow on the body, and
  wherein the first outer portion and the second outer portion each have a narrower spanwise dimension than the central portion.

2. The aerodynamic device according to claim 1, wherein an overall height dimension of at least one of the raised members is less than or equal to a height of a boundary layer of the flow along the surface of the body at a corresponding location.

3. The aerodynamic device according to claim 1, wherein the first outer portion and the second outer portion each have a shorter height dimension than the central portion.

4. The aerodynamic device according to claim 1, wherein the first outer portion and the second outer portion each have a shorter chordwise dimension than the central portion.

5. The aerodynamic device according to claim 1, wherein the central portion, the first outer portion, and the second outer portion are connected so as to form a continuous structure.

6. The aerodynamic device according to claim 5, wherein a curvature of the aerodynamic device defines a first valley between the central portion and the first outer portion and a second valley between the central portion and the second outer portion.

7. The aerodynamic device according to claim 6, wherein the curvature of the continuous structure of raised members is configured to generate a pressure gradient in flow along the surface of the body, the pressure gradient acting to constrain a separation bubble formed downstream of the continuous structure of raised members from expanding further downstream and bursting when the body is oriented at a high angle of attack.

8. The aerodynamic device according to claim 1, configured to be coupled to the surface of the body.

9. The aerodynamic device according to claim 1, forming a corresponding portion of the surface of the body.

10. An aerodynamic device for enhancing lift and reducing drag of a flying disc, the device comprising:
  a plurality of raised members, each having a symmetric profile and including:
    a central portion having an elongated profile; and
    a first outer portion and a second outer portion arranged substantially parallel to and on opposing sides of the central portion, each of the first and second outer portions having an elongated profile,
  wherein the plurality of raised members are situated adjacent one another to form a continuous structure on a surface of the flying disc,
  wherein the plurality of raised members are oriented in a substantially circumferential direction on the surface of the flying disc, and
  wherein the first outer portion and the second outer portion each have a shorter height dimension than the central portion.

11. The aerodynamic device according to claim 10, wherein the flying disc is a sporting disc or a disc golf disc.

12. The aerodynamic device according to claim 10, wherein the continuous structure of raised members extends in a substantially radial direction on or defining at least a portion of an upper surface of the flying disc.

13. The aerodynamic device according to claim 12, wherein the continuous structure of raised members is dimensioned and positioned to span at least a radius of the upper surface of the flying disc.

14. The aerodynamic device according to claim 12, wherein the continuous structure of raised members is dimensioned and positioned to span about 10% to about 25% of an outer portion of a radius of the upper surface of the flying disc.

15. The aerodynamic device according to claim 12, further including an additional one or more of the continuous structures of raised members, each of the additional one or more continuous structures of raised members extending in a substantially radial direction on or defining at least a portion of the upper surface of the flying disc.

16. The aerodynamic device according to claim 15, wherein the continuous structures of raised members are spaced substantially equally apart from one another in a circumferential direction.

17. The aerodynamic device according to claim 10, wherein the continuous structure of raised members is located on or defines at least a portion of a surface of a rim of the flying disc.

18. The aerodynamic device according to claim 10, wherein an overall height dimension of at least one of the raised members is less than or equal to a height of a boundary layer of the flow along the surface of the flying disc at a corresponding location.

19. The aerodynamic device according to claim 10, wherein a curvature of the continuous structure of raised members is configured to generate a pressure gradient in flow along the surface of the flying disc, the pressure gradient acting to constrain a separation bubble formed downstream of the continuous structure of raised members from expanding further downstream and bursting when the flying disc is oriented at a high angle of attack.

20. An aerodynamic device for enhancing lift and reducing drag on a body, the device comprising:
  a plurality of raised members, each having a symmetric profile and including:
    a central portion having an elongated profile; and
    a first outer portion and a second outer portion arranged substantially parallel to and on opposing sides of the central portion, each of the first and second outer portions having an elongated profile,
  wherein the plurality of raised members are situated adjacent one another to form a continuous structure on or defining at least a portion of a surface of the body,
  wherein the continuous structure of raised members is oriented such that the raised members are substantially aligned with a direction of localized flow on the body, and
  wherein the first outer portion and the second outer portion each have a shorter chordwise dimension than the central portion.

* * * * *